US008360857B2

(12) United States Patent
Walker et al.

(10) Patent No.: US 8,360,857 B2
(45) Date of Patent: Jan. 29, 2013

(54) SYSTEMS, METHODS AND APPARATUS FOR FACILITATING A FLAT RATE PLAY SESSION ON A GAMING DEVICE AND EXAMPLE PLAYER INTERFACES TO FACILITATE SUCH

(75) Inventors: Jay S. Walker, Ridgefield, CT (US); James A. Jorasch, New York, NY (US); Robert C. Tedesco, Fairfield, CT (US)

(73) Assignee: IGT, Reno, NV (US)

( * ) Notice: Subject to any disclaimer, the term of this patent is extended or adjusted under 35 U.S.C. 154(b) by 1532 days.

(21) Appl. No.: 11/270,016

(22) Filed: Nov. 9, 2005

(65) Prior Publication Data

US 2006/0040730 A1 Feb. 23, 2006

Related U.S. Application Data

(63) Continuation-in-part of application No. 10/001,089, filed on Nov. 2, 2001, now Pat. No. 7,140,964, and a continuation-in-part of application No. 09/518,760, filed on Mar. 3, 2000, now Pat. No. 6,319,127, which is a continuation of application No.08/880,838, filed on Jun. 23, 1997, now Pat. No. 6,077,163.

(Continued)

(51) Int. Cl.
*A63F 13/00* (2006.01)

(52) U.S. Cl. ............................... 463/25; 463/20; 463/29

(58) Field of Classification Search .................... 463/20, 463/25, 29

See application file for complete search history.

(56) References Cited

U.S. PATENT DOCUMENTS

| | | | | |
|---|---|---|---|---|
| 3,810,627 A * | 5/1974 | Levy | | 463/26 |
| 4,150,827 A | 4/1979 | Barnett | | |
| 4,309,030 A | 1/1982 | Goldfarb et al. | | |
| 4,363,485 A | 12/1982 | Edwall | | |
| 4,593,904 A | 6/1986 | Graves | | |
| 4,659,087 A | 4/1987 | Shen et al. | | |
| 4,669,731 A | 6/1987 | Clarke | | 273/143 R |
| 4,991,848 A | 2/1991 | Greenwood et al. | | 273/143 R |
| 5,018,737 A | 5/1991 | Okada | | |
| 5,042,809 A | 8/1991 | Richardson | | |

(Continued)

OTHER PUBLICATIONS

"Monte Carlo Simulation Basics," Vertex42, accessed Jan. 10, 2010, 4 pages, <http://www.vertex42.com/ExcelArticles/mc/MonteCarloSimulation.html>.*

(Continued)

*Primary Examiner* — David L Lewis
*Assistant Examiner* — William H McCulloch, Jr.
(74) *Attorney, Agent, or Firm* — Fincham Downs, LLC; Magdalena M. Fincham

(57) ABSTRACT

In accordance with some embodiments, there is provided a method, apparatus and article of manufacture for providing a flat rate play session using a gaming device. The flat rate play session may define a duration of, for example, a period of time, a number of game plays, and/or a number of qualifying events. In some embodiments, a flat rate play session may define a game and a wager amount per game play. In some embodiments, a player may be allowed to change the game and/or the wager amount per game play during the flat rate play session. In some embodiments, a retail price may be calculated for the flat rate play session based on a number of simulations of the flat rate play session and a desired profit margin. In some embodiments, various user interfaces (e.g., touch-screen menus) may be used to allow a player to select and purchase a flat rate play session. Various user interfaces (e.g., touch-screen menus) may also be used to allow a player to reconfigure a flat rate play session during the duration of the flat rate play session.

13 Claims, 46 Drawing Sheets

Related U.S. Application Data

(60) Provisional application No. 60/627,670, filed on Nov. 12, 2004, provisional application No. 60/637,338, filed on Dec. 17, 2004, provisional application No. 60/679,138, filed on May 9, 2005, provisional application No. 60/282,792, filed on Apr. 10, 2001.

(56) References Cited

U.S. PATENT DOCUMENTS 5,129,652 A 7/1992 Wilkinson
5,135,224 A 8/1992 Yamamoto et al.
5,178,389 A 1/1993 Bentley et al.
5,178,390 A 1/1993 Okada ........................ 273/143 R
5,257,179 A 10/1993 DeMar
5,275,400 A * 1/1994 Weingardt et al. .............. 463/12
5,287,269 A 2/1994 Dorrough et al. ............. 364/408
5,308,065 A 5/1994 Bridgeman
5,326,104 A 7/1994 Pease
5,331,546 A 7/1994 Webber
5,356,140 A 10/1994 Dabrowski et al.
5,401,023 A 3/1995 Wood .............................. 273/85
5,407,199 A 4/1995 Gumina
5,457,306 A 10/1995 Lucero
5,476,259 A * 12/1995 Weingardt ...................... 463/28
5,501,455 A * 3/1996 Hirata et al. .................... 463/61
5,511,781 A 4/1996 Wood et al. ..................... 273/85
5,531,441 A 7/1996 Dabrowski et al.
5,542,669 A * 8/1996 Charron et al. ................. 463/13
5,569,082 A 10/1996 Kaye
5,570,885 A 11/1996 Ornstein ......................... 463/27
5,601,488 A 2/1997 Kadlic
5,613,912 A 3/1997 Slater .............................. 463/25
5,638,443 A 6/1997 Stefik et al.
5,640,569 A 6/1997 Miller et al.
5,647,798 A 7/1997 Falciglia
5,653,635 A 8/1997 Breeding
5,715,403 A 2/1998 Stefik et al.
5,743,800 A 4/1998 Huard et al.
5,749,785 A * 5/1998 Rossides ......................... 463/25
5,766,075 A 6/1998 Cook
5,768,382 A 6/1998 Schneier et al. ................ 380/23
5,772,509 A 6/1998 Weiss .............................. 463/16
5,801,360 A 9/1998 Srichayaporn
5,816,917 A * 10/1998 Kelmer et al. .................. 463/16
5,816,918 A 10/1998 Kelly et al.
5,830,067 A 11/1998 Graves et al. ................... 463/40
5,833,538 A 11/1998 Weiss .............................. 463/21
5,851,010 A 12/1998 Feinberg
5,853,325 A 12/1998 Kadlic
5,855,515 A 1/1999 Pease et al.
5,873,781 A 2/1999 Keane
5,885,158 A 3/1999 Torango et al.
5,910,048 A 6/1999 Feinberg
5,957,776 A * 9/1999 Hoehne ........................... 463/25
5,970,143 A 10/1999 Schneier et al. ................ 380/23
5,984,779 A 11/1999 Bridgeman et al.
6,012,983 A 1/2000 Walker et al.
6,033,306 A 3/2000 De Souza
6,050,895 A 4/2000 Luciano et al.
6,077,163 A 6/2000 Walker et al. ................... 463/26
6,080,062 A 6/2000 Olson
6,142,870 A 11/2000 Wada et al.
6,142,872 A * 11/2000 Walker et al. ................... 463/16
6,146,270 A 11/2000 Huard
6,193,606 B1 2/2001 Walker et al. ................... 463/20
6,203,429 B1 3/2001 Demar et al.
6,206,782 B1 3/2001 Walker et al.
6,254,483 B1 7/2001 Acres
6,287,202 B1 9/2001 Pascal et al.
6,306,035 B1 10/2001 Kelly et al.
6,312,332 B1 11/2001 Walker et al.
6,315,662 B1 11/2001 Jorasch et al. .................. 463/20
6,319,127 B1 11/2001 Walker et al.
6,331,144 B1 12/2001 Walker et al. ................... 463/20
6,336,636 B1 1/2002 Smart
6,389,538 B1 5/2002 Gruse et al.
6,409,172 B1 * 6/2002 Vancura ........................ 273/256
6,443,843 B1 * 9/2002 Walker et al. ................... 463/42
6,527,638 B1 3/2003 Walker et al.
6,537,150 B1 * 3/2003 Luciano et al. ................. 463/16
6,589,115 B2 7/2003 Walker et al.
6,620,045 B2 9/2003 Berman et al.
6,634,942 B2 10/2003 Walker et al.
6,663,486 B2 12/2003 D'Aurora et al.
6,685,559 B2 2/2004 Luciano et al.
6,709,331 B2 3/2004 Berman .......................... 463/16
6,712,695 B2 * 3/2004 Mothwurf et al. .............. 463/25
6,793,578 B2 9/2004 Luccesi et al.
6,800,027 B2 10/2004 Giobbi et al.
6,916,245 B1 * 7/2005 Vancura et al. ................. 463/26
6,969,317 B2 11/2005 Walker et al.
6,984,175 B2 1/2006 Nguyen et al.
7,063,617 B2 6/2006 Brosnan et al.
7,094,149 B2 8/2006 Walker et al.
7,140,964 B2 * 11/2006 Walker et al. ................... 463/25
7,156,739 B2 1/2007 Walker et al.
7,210,141 B1 4/2007 Nathan
7,306,518 B2 12/2007 Hughs-Baird et al.
7,329,185 B2 2/2008 Conover et al.
7,393,279 B2 7/2008 Walker et al.
7,503,851 B2 * 3/2009 Walker et al. ................... 463/26
7,625,282 B2 12/2009 Baerlocher et al.
7,722,456 B2 5/2010 Walker et al.
7,722,458 B2 5/2010 Walker et al.
7,722,460 B2 5/2010 Walker et al.
7,727,066 B2 6/2010 Ikeya
7,815,503 B2 10/2010 Walker et al.
7,828,645 B2 11/2010 Walker et al.
7,833,101 B2 * 11/2010 Lutnick et al. .................. 463/42
7,841,936 B2 11/2010 Berman et al.
7,862,416 B2 * 1/2011 Walker et al. ................... 463/12
7,862,424 B2 1/2011 Walker et al.
7,871,327 B2 1/2011 Walker et al.
7,874,906 B2 1/2011 Tulley et al.
7,874,911 B2 * 1/2011 Walker et al. ................... 463/20
7,874,914 B2 * 1/2011 Walker et al. ................... 463/25
7,878,901 B2 2/2011 Walker et al.
7,887,414 B2 * 2/2011 Walker et al. ................... 463/26
7,914,374 B2 * 3/2011 Walker et al. ................... 463/25
7,914,375 B2 * 3/2011 Walker et al. ................... 463/25
7,934,990 B2 5/2011 Walker et al.
7,955,169 B2 * 6/2011 Walker et al. ................... 463/16
7,955,172 B2 6/2011 Walker et al.
7,962,844 B2 6/2011 Walker et al.
7,993,198 B2 8/2011 Walker et al.
7,997,973 B2 * 8/2011 Lutnick et al. .................. 463/16
7,997,974 B2 8/2011 Walker et al.
8,001,043 B1 8/2011 Walker et al.
8,007,361 B2 8/2011 Walker et al.
8,021,229 B2 9/2011 Walker et al.
8,062,122 B2 11/2011 Walker et al.
8,070,577 B2 12/2011 Walker et al.
8,070,582 B2 * 12/2011 Lutnick et al. .................. 463/16
8,075,388 B1 12/2011 Bennett
8,096,872 B2 1/2012 Walker et al.
8,133,112 B2 * 3/2012 Walker et al. ................... 463/25
8,142,272 B2 3/2012 Walker et al.
8,152,629 B2 4/2012 Dewaal et al.
8,172,671 B2 * 5/2012 Walker et al. ................... 463/25
2001/0009316 A1 * 7/2001 Krise et al. .................... 273/108
2001/0009317 A1 * 7/2001 Sines et al. ................ 273/121 B
2001/0009865 A1 * 7/2001 Demar et al. ................... 463/20
2001/0031654 A1 10/2001 Walker et al.
2001/0036857 A1 * 11/2001 Mothwurf et al. .............. 463/25
2001/0036864 A1 * 11/2001 Melas ............................ 463/42
2002/0014740 A1 * 2/2002 Ainsworth .................... 273/139
2002/0055381 A1 5/2002 Tarantino
2002/0094855 A1 * 7/2002 Berman .......................... 463/16
2002/0132660 A1 9/2002 Taylor
2002/0147040 A1 * 10/2002 Walker et al. ................... 463/25
2002/0188576 A1 12/2002 Peterson et al.
2002/0198044 A1 * 12/2002 Walker et al. ................... 463/25
2003/0013532 A1 1/2003 Rowe et al.
2003/0027629 A1 2/2003 Pimienta

| | | | | |
|---|---|---|---|---|
| 2003/0069071 | A1 | 4/2003 | Britt et al. | |
| 2003/0073494 | A1 | 4/2003 | Kalpakian et al. | |
| 2003/0096645 | A1 * | 5/2003 | Soltys et al. | 463/25 |
| 2003/0157998 | A1 | 8/2003 | Englman | |
| 2003/0220138 | A1 | 11/2003 | Walker et al. | |
| 2003/0232651 | A1 | 12/2003 | Huard et al. | |
| 2004/0036224 | A1 | 2/2004 | Crompton | |
| 2004/0102238 | A1 | 5/2004 | Taylor | |
| 2004/0147308 | A1 * | 7/2004 | Walker et al. | 463/25 |
| 2005/0059452 | A1 | 3/2005 | Hartl | |
| 2005/0181854 | A1 | 8/2005 | Moshal | |
| 2006/0100009 | A1 | 5/2006 | Walker et al. | |
| 2006/0217190 | A1 * | 9/2006 | Walker et al. | 463/25 |
| 2006/0223629 | A1 * | 10/2006 | Walker et al. | 463/25 |
| 2006/0247030 | A1 * | 11/2006 | Walker et al. | 463/25 |
| 2006/0247031 | A1 * | 11/2006 | Walker et al. | 463/25 |
| 2006/0248025 | A1 * | 11/2006 | Walker et al. | 705/400 |
| 2006/0252511 | A1 * | 11/2006 | Walker et al. | 463/25 |
| 2006/0252512 | A1 * | 11/2006 | Walker et al. | 463/25 |
| 2006/0252513 | A1 | 11/2006 | Walker et al. | |
| 2006/0252514 | A1 | 11/2006 | Walker et al. | |
| 2006/0252517 | A1 | 11/2006 | Walker et al. | |
| 2006/0252518 | A1 | 11/2006 | Walker et al. | |
| 2006/0287040 | A1 * | 12/2006 | Walker et al. | 463/16 |
| 2006/0287071 | A1 * | 12/2006 | Walker et al. | 463/25 |
| 2006/0287074 | A1 | 12/2006 | Walker et al. | |
| 2007/0004502 | A1 * | 1/2007 | Walker et al. | 463/25 |
| 2007/0004503 | A1 | 1/2007 | Walker et al. | |
| 2007/0004504 | A1 | 1/2007 | Walker et al. | |
| 2007/0015568 | A1 * | 1/2007 | Walker et al. | 463/25 |
| 2007/0072673 | A1 | 3/2007 | Bennett et al. | |
| 2007/0087818 | A1 | 4/2007 | Walker et al. | |
| 2007/0155483 | A1 * | 7/2007 | Walker et al. | 463/25 |
| 2007/0191094 | A1 | 8/2007 | Walker et al. | |
| 2007/0254732 | A1 * | 11/2007 | Walker et al. | 463/16 |
| 2007/0293306 | A1 | 12/2007 | Nee et al. | |
| 2008/0214286 | A1 * | 9/2008 | Lutnick et al. | 463/25 |
| 2008/0248849 | A1 * | 10/2008 | Lutnick et al. | 463/16 |
| 2008/0249879 | A1 * | 10/2008 | Walker et al. | 705/14 |
| 2008/0274792 | A1 | 11/2008 | Walker et al. | |
| 2008/0305862 | A1 * | 12/2008 | Walker et al. | 463/26 |
| 2009/0124351 | A1 * | 5/2009 | DeWaal et al. | 463/25 |
| 2011/0014963 | A1 | 1/2011 | Walker et al. | |

OTHER PUBLICATIONS

Grochowski, John, "Computers Help Players Learn Winning Strategy", Chicago Sun-Times, Jun. 30, 1995, Section: Weekend Plus, Gaming, p. 13, NC.
Pledger, Marcia, "Going for the gold at slot tournaments", Las Vegas Review-Journal, Dec. 24, 1995, p. 5.L.
Hawley, David, "Those one armed bandits; Slot-machine tournaments lure throngs to Midwest casinos", The Houston Chronicle, Apr. 9, 1996, Section: Houston, p. 3.
Grochowski, John, "Slot tourney prospers under Indiana rules", Chicago Sun-Times, Apr. 6, 1997, Section: SHO, Casinos, p. 15, NC.
"Station Announces formation of GameCast Live, LLC and Release of Remote Play eSlots for In-Room Gaming Applications", PR Newswire, Jun. 6, 2001, Financial News Section.
Website, "Extending the Casino Floor", GameCast Live, (http //www gamecastlive com/presentation/toronto_files/slide0012 htm), download date: Jun. 6, 2001.
"subset" Dictionary.com Unabridged, Random House, Apr. 8, 2010, 1 pg.
Fallstrom, Bob "Winter wonderland Symphony of Trees is sure to be a dazzling delight", Herald and Review, Nov. 17, 1992, 5 pp.
Office Action for U.S. Appl. No. 11/273,159 dated Sep. 2, 2011, 11 pp.
Office Action for U.S. Appl. No. 11/273,159 dated Mar. 29, 2011, 12 pp.
Office Action for U.S. Appl. No. 11/273,159 dated Jun. 16, 2010, 15 pp.
Office Action for U.S. Appl. No. 11/273,159 mailed Aug. 13, 2009, 10 pp.
Notice of Allowance for U.S. Appl. No. 11/273,534 mailed Dec. 1, 2010, 7 pp.
Office Action for U.S. Appl. No. 11/273,534 mailed Mar. 4, 2010, 7 pp.
Office Action for U.S. Appl. No. 11/273,534 mailed Jul. 8, 2009, 5 pp.
Office Action for U.S. Appl. No. 11/274,586 mailed Mar. 23, 2010, 13 pp.
Office Action for U.S. Appl. No. 11/273,799 mailed Jan. 5, 2009, 13 pp.
Office Action for U.S. Appl. No. 11/266,625 mailed Apr. 29, 2008, 16 pp.
Office Action for U.S. Appl. No. 11/273,510 mailed Aug. 31, 2010, 12 pp.
Office Action for U.S. Appl. No. 11/273,510 mailed Sep. 2, 2009, 12 pp.
Office Action for U.S. Appl. No. 11/456,758 mailed Jun. 12, 2008, 8 pp.
Office Action for U.S. Appl. No. 11/273,093 mailed Mar. 15, 2011, 10 pp.
Office Action for U.S. Appl. No. 11/273,093 mailed Oct. 6, 2010, 12 pp.
Office Action for U.S. Appl. No. 11/273,093 mailed Apr. 20, 2010, 13 pp.
Office Action for U.S. Appl. No. 11/273,093 mailed Aug. 12, 2009, 12 pp.
Office Action for U.S. Appl. No. 11/266,875 mailed May 7, 2008, 13 pp.
Notice of Allowability for U.S. Appl. No. 11/274,740, Sep. 7, 2010, 7 pp.
Office Action for U.S. Appl. No. 11/274,740 dated Apr. 14, 2010, 8 pp.
Office Action for U.S. Appl. No. 11/273,368 mailed May 13, 2008, 11 pp.
Office Action for U.S. Appl. No. 11/268,315 mailed May 21, 2010, 11 pp.
Office Action for U.S. Appl. No. 11/273,170 mailed Feb. 5, 2008, 9 pp.
Notice of Allowance for U.S. Appl. No. 11/423,486 dated Oct. 29, 2010, 4 pp.
Notice of Allowance for U.S. Appl. No. 11/423,486 dated Jul. 21, 2010, 11 pp.
Office Action for U.S. Appl. No. 11/423,486 mailed Nov. 6, 2009, 8 pp.
Notice of Allowance for U.S. Appl. No. 11/423,486 mailed Apr. 29, 2009, 4 pp.
Notice of Allowance for U.S. Appl. No. 11/423,486 mailed Oct. 20, 2008, 6 pp.
Office Action for U.S. Appl. No. 11/423,486 mailed Mar. 5, 2008, 11 pp.
Office Action for U.S. Appl. No. 11/423,486 mailed Sep. 5, 2007, 6 pp.
Notice of Allowance for U.S. Appl. No. 11/423,488 mailed Nov. 20, 2008, 4 pp.
Notice of Allowance for U.S. Appl. No. 11/423,488 mailed Jul. 9, 2008, 4 pp.
Office Action for U.S. Appl. No. 11/423,488 mailed Apr. 11, 2008, 6 pp.
Office Action for U.S. Appl. No. 11/423,488 mailed Sep. 5, 2007, 7 pp.
Notice of Allowance for U.S. Appl. No. 11/423,492 mailed Oct. 28, 2007, 4 pp.
Notice of Allowance for U.S. Appl. No. 11/423,492 mailed Jun. 10, 2007, 6 pp.
Office Action for U.S. Appl. No. 11/423,492 mailed Nov. 9, 2009, 8 pp.
Notice of Allowance for U.S. Appl. No. 11/423,492 mailed Oct. 9, 2008, 6 pp.
Office Action for U.S. Appl. No. 11/423,492 mailed Apr. 14, 2008, 6 pp.
Office Action for U.S. Appl. No. 11/423,492 mailed Sep. 13, 2007, 7 pp.
Office Action for U.S. Appl. No. 10/001,089 mailed Jul. 11, 2005, 22 pp.
Office Action for U.S. Appl. No. 10/001,089 mailed Apr. 6, 2005, 10 pp.

Office Action for U.S. Appl. No. 10/001,089 mailed Sep. 12, 2003, 8 pp.
Notice of Allowance for U.S. Appl. No. 10/985,131 mailed Nov. 3, 2005, 7 pp.
Notice of Allowance for U.S. Appl. No. 10/986,529 mailed Oct. 27, 2011, 6 pp.
Notice of Allowance for U.S. Appl. No. 10/986,529 mailed Jul. 22, 2011, 5 pp.
Office Action for U.S. Appl. No. 10/986,529 mailed Dec. 20, 2010, 8 pp.
Office Action for U.S. Appl. No. 10/986,529 mailed Feb. 2, 2009, 12 pp.

* cited by examiner

344

| PLAYER ID 410 | SOCIAL SECURITY NUMBER 412 | NAME 414 | ADDRESS 416 | PHONE NUMBER 418 | CREDIT CARD NUMBER 420 | CREDIT BALANCE 422 | (ACCUMULATED) COMP. POINTS 424 | HOTEL GUEST 426 | PLAYER RATING 428 | VALUE OF INTERVAL REMAINING 430 |
|---|---|---|---|---|---|---|---|---|---|---|
| 123456 | 123-45-7890 | BILL GREEN | 111 NORTH AVE. | (212) 555-1234 | 1111-2222-3333-4444 | $25.00 | 130 PTS. | NO | 4 | $30.00 |
| 876543 | 876-54-3210 | ROB BLUE | 423 SOUTH ST. | (812) 555-4321 | 2222-4444-6666-8888 | $17.50 | 240 PTS. | YES | 2 | $3.00 |
| 158595 | 555-12-6338 | KAREN RED | 64 WEST RD. | (315) 555-5954 | 1111-3333-5555-7777 | $0.00 | 350 PTS. | YES | 2 | $0.75 |

FIG. 4

246

| PLAYER ID NUMBER 510 | PLAYER SELECTED PRICE PARAMETERS 512 | FLAT RATE PRICE 514 | INTERVAL REMAINING 516 | TIME AUDIT DATA 518 | MACHINE ID NUMBER 520 |
|---|---|---|---|---|---|
| 123456 | TOP 3 JACKPOTS 90 MINUTES | $50.00 | 72 MINUTES | 6/21/97 10:30 AM | A846 |
| 876543 | ALL JACKPOTS 90 MINUTES | $200.00 | 3 MINUTES | 6/21/97 11:00 AM | B623 |
| 158595 | TOP JACKPOT 30 MINUTES | $30.00 | 15 MINUTES | 6/21/97 11:30 AM<br>6/21/97 11:45 AM | C103 |

FIG. 5

228

| PAY COMBINATION 610 | 1 COIN 620 | 2 COINS 630 | 3 COINS 640 | PAY COMBINATION STATUS 650 |
|---|---|---|---|---|
| DOUBLE JACKPOT | 400 | 800 | 1200 | ACTIVE |
| 5BAR-5BAR-5BAR | 50 | 100 | 150 | ACTIVE |
| SEVEN-SEVEN -SEVEN | 25 | 50 | 75 | INACTIVE |
| BAR-BAR-BAR | 20 | 40 | 60 | INACTIVE |
| CHERRY-CHERRY-CHERRY | 10 | 20 | 30 | INACTIVE |
| ANY PAIR-CHERRY | 5 | 10 | 15 | INACTIVE |
| ANY-ANY-CHERRY | 2 | 4 | 6 | INACTIVE |
| NON WINNING OUTCOMES | 0 | 0 | 0 | N/A |

FIG. 6

227

| MACHINE TYPE 710 | AMOUNT WAGERED PER PLAY 712 | PLAYER RATING 714 | TIME OF DAY 716 | DAY OF THE WEEK 718 | MACHINE USAGE 719 | ACTIVE PAY COMBINATIONS 720 | DURATION OF FLAT RATE PLAY SESSION 722 | FLAT RATE PRICE 724 |
|---|---|---|---|---|---|---|---|---|
| QUARTER DEUCES WILD | $0.25 | 2 | 2:00 AM | MONDAY | LOW | ALL | 30 MIN. | $15.00 |
| DOLLAR DOUBLE DIAMOND | $3 | 5 | 9:00 PM | SATURDAY | HEAVY | TOP 2 | 2 HRS. | $100.00 |
| DOLLAR SUPER SEVENS | $3 | 3 | 4:00 PM | FRIDAY | MODERATE | TOP 1 | 1 HR. | $30.00 |

FIG. 7

229

| PACKAGE NUMBER 1410 | INTERVAL 1412 | DURATION OF FLAT RATE PLAY SESSION 1414 | AMOUNT WAGERED PER PLAY 1416 | PAY COMBINATION STATUS 1418 | FLAT RATE PLAY SESSION PRICE 1420 |
|---|---|---|---|---|---|
| 1 | HANDLE PULLS | 100 PULLS | 3 COINS | ALL ACTIVE | $30.00 |
| 2 | HANDLE PULLS | 100 PULLS | 3 COINS | TOP 3 ACTIVE | $20.00 |
| 3 | HANDLE PULLS | 250 PULLS | 3 COINS | ALL ACTIVE | $75.00 |
| 4 | HANDLE PULLS | 250 PULLS | 3 COINS | TOP 3 ACTIVE | $50.00 |
| 5 | TIME | 30 MINUTES | 3 COINS | ALL ACTIVE | $40.00 |
| 6 | TIME | 30 MINUTES | 3 COINS | DYNAMIC | $30.00 |
| 7 | TIME | 60 MINUTES | 3 COINS | ALL ACTIVE | $80.00 |
| 8 | TIME | 60 MINUTES | 3 COINS | DYNAMIC | $60.00 |
| 9 | TIME | 90 MINUTES | 3 COINS | ALL ACTIVE | $120.00 |

FIG. 14

1720

| PLAYER IDENTIFIER 2105 | NAME 2110 | ADDRESS 2115 | FINANCIAL ACCOUNT IDENTIFIER 2120 | DEMOGRAPHIC 2125 | CREDITS 2130 | LIFETIME COIN IN 2135 |
|---|---|---|---|---|---|---|
| P11123 | SAM BROWN | ANYPLACE, USA | 1111-1111-1111-1111 | MALE, AGE 23 | 68 CREDITS, 25 CENTS PER CREDIT | $600 |
| P222234 | LINDA JONES | SOMEPLACE, USA | 2222-2222-2222-2222 | FEMALE, AGE 47 | 0 | $14400 |

FIG. 21

1725

| GAMING DEVICE IDENTIFIER 2205 | NAME 2210 | MANUFACTURER 2215 |
|---|---|---|
| G333333 | DIAMOND MINE | ABC CORP |
| G444444 | CRAZY DEUCES | XYZ CORP |

FIG. 22

1730

| CONTRACT IDENTIFIER 2305 | PLAYER IDENTIFIER 2310 | INITIAL PLAYER BANKROLL 2315 | DESCRIPTION 2320 | COST 2325 | RESULT 2330 | AMOUNT OWED THE PLAYER 2335 | AMOUNT OWED THE INSURER 2340 |
|---|---|---|---|---|---|---|---|
| C111 | P222333 | N/A | 2000 PULLS, 25 CENTS PER PULL, PLAYER KEEPS NET WINNINGS | $20 | CONTRACT ENDS WITH PLAYER AT MINUS $45 | 0 | $20 - $45= - $25 |
| C222 | P444555 | N/A | 1 HOUR OF PLAY, 1 DOLLAR PER PULL, PLAYER KEEPS GROSS WINNINGS | $100 | CONTRACT ENDS WITH PLAYER AT $97 | $97 | $100 |
| C333 | P666777 | $2000 | 100 PULLS PER WEEK, 2 DOLLARS PER PULL, OCCURRING BETWEEN 8-9PM TUESDAYS FOR 12 WEEKS, OR UNTIL PLAYER LOSES BANKROLL | N/A | PLAYER LOST BANKROLL | 0 | N/A |
| C444 | P888999 | $100 | 90 MINUTES OF PLAY, 50 CENTS PER PULL | N/A | PLAYER ENDS UP WITH $120 | $120 | N/A |
| C555 | P111000 | $200 | 63 CENTS PER PULL, DOUBLE BETS FOR TWO PULLS AFTER ANY WIN, STOP AFTER JACKPOT, LOSS INSURED BEYOND $200 | $20 | 2 MINUTES LEFT AND PLAYER IS AT $213 | UNDETER-MINED | UNDETER-MINED |
| TOTAL OWED THE INSURER: $75 | | | | | | | |

FIG. 23

SYSTEMS, METHODS AND APPARATUS FOR FACILITATING A FLAT RATE PLAY SESSION ON A GAMING DEVICE AND EXAMPLE PLAYER INTERFACES TO FACILITATE SUCH

CLAIM OF PRIORITY

The present application claims the benefit of the following three provisional applications:

(i) U.S. Provisional Application 60/627,670, filed on Nov. 12, 2004 and entitled GAMING DEVICE OFFERING A FLAT RATE PLAY SESSION AND METHODS THEREOF;

(ii) U.S. Provisional Application 60/637,338, filed on Dec. 17, 2004 and entitled GAMING DEVICE OFFERING A FLAT RATE PLAY SESSION AND METHODS THEREOF; and (iii) U.S. Provisional Application 60/679,138, filed on May 9, 2005 and entitled SYSTEMS, METHODS AND APPARATUS FOR FACILITATING A FLAT RATE PLAY SESSION ON A GAMING DEVICE.

The entirety of each of the above provisional applications is incorporated by reference herein for all purposes.

The present application is a continuation-in-part application of U.S. application Ser. No. 10/001,089, filed Nov. 2, 2001 now U.S. Pat. No. 7,140,964 in the name of Walker et al. and entitled GAMING DEVICE FOR A FLAT RATE PLAY SESSION AND A METHOD OF OPERATING SAME; which application claims the benefit of U.S. Provisional Application No. 60/282,792 filed Apr. 10, 2001 and is a continuation-in-part of U.S. application Ser. No. 09/518,760 filed Mar. 3, 2000 now U.S. Pat. No. 6,319,127; which latter application in turn is continuation application of U.S. application Ser. No. 08/880,838 filed Jun. 23, 1997 now U.S. Pat. No. 6,077,163. The entirety of each of these applications is incorporated by reference herein for all purposes.

BACKGROUND

Applicants have previously invented methods and apparatus for facilitating a flat rate play session. Commonly-owned U.S. application Ser. No. 10/001,089, filed Nov. 2, 2001 and entitled GAMING DEVICE FOR A FLAT RATE PLAY SESSION AND A METHOD OF OPERATING SAME, for example, describes various methods and systems for facilitating a flat rate play session. However, such flat rate play session methods and systems may be further enhanced and augmented, for the benefit of players, gaming system manufacturers, and casinos.

SUMMARY

In accordance with some embodiments, there is provided a method, apparatus and article of manufacture for providing a flat rate play session using a gaming device. In one embodiment, the method includes identifying at least one price parameter, determining a flat rate price based upon the at least one identified price parameter, and initiating a flat rate play session of the gaming device upon receiving an indication of payment of the flat rate price. The flat rate play session spans a pre-established duration. A duration may comprise a specified amount of time, a specified number of game plays (e.g. handle pulls of a slot machine), and/or a specified number of qualifying events (e.g., winning outcomes, occurrences of one or more predefined symbols, the achievement of a specified credit meter balance, an outcome of a live sporting event, etc.).

In accordance with some embodiments, a method provides for determining a duration of a flat rate play session and a value of a price parameter; simulating play of the flat rate play session for the duration of the flat rate play session, using the value of the price parameter; determining, based upon the simulation, a simulated payout amount; and adding a profit margin amount to the simulated payout amount.

In accordance with some embodiments, a method provides for determining a duration of a flat rate play session and a value of a price parameter; simulating play of the flat rate play session for the duration of the flat rate play session, using the value of the price parameter; determining, based upon the simulation, a simulated payout amount; and adding a profit margin amount to the simulated payout amount.

In accordance with some embodiments, a method provides for allowing a player to reconfigure a flat rate play session (e.g., change game and/or bet amount) during the flat rate play session. In some embodiments, a value of a parameter of the flat rate play session (e.g., remaining duration) may be adjusted to compensate for any changes to the flat rate play session that the player may make.

BRIEF DESCRIPTION OF THE DRAWINGS

Various embodiments of the present invention are described herein with reference to the accompanying drawings. In the drawings, like reference numerals indicate identical or functionally similar elements. The leftmost digit(s) of a reference numeral typically identifies the figure in which the reference numeral first appears. As will be understood by those skilled in the art, the drawings and accompanying descriptions presented herein indicate some exemplary arrangements. Similarly, the illustrated entries represent exemplary information, but those skilled in the art will understand that the number and content of the entries can be different from those illustrated herein. A brief description of the drawings follows.

FIG. 4 is a schematic view of a casino player database of the server of FIG. 3.

FIG. 5 is a schematic view of the flat rate database of the slot machine of FIG. 2.

FIG. 6 is a schematic view of the payout table of the slot machine of FIG. 2.

FIG. 7 is a schematic view of the calculation table of the slot machine of FIG. 2.

FIG. 14 is a schematic view of the flat rate price package database of the slot machine of FIG. 2.

FIG. 21 is a table illustrating an embodiment of the player database stored in the casino server of FIG. 17.

FIG. 22 is a table illustrating an embodiment of the gaming device database stored in the casino server of FIG. 17.

FIG. 23 is a table illustrating an embodiment of the contract database stored in the casino server of FIG. 17.

DETAILED DESCRIPTION

Figure 1:
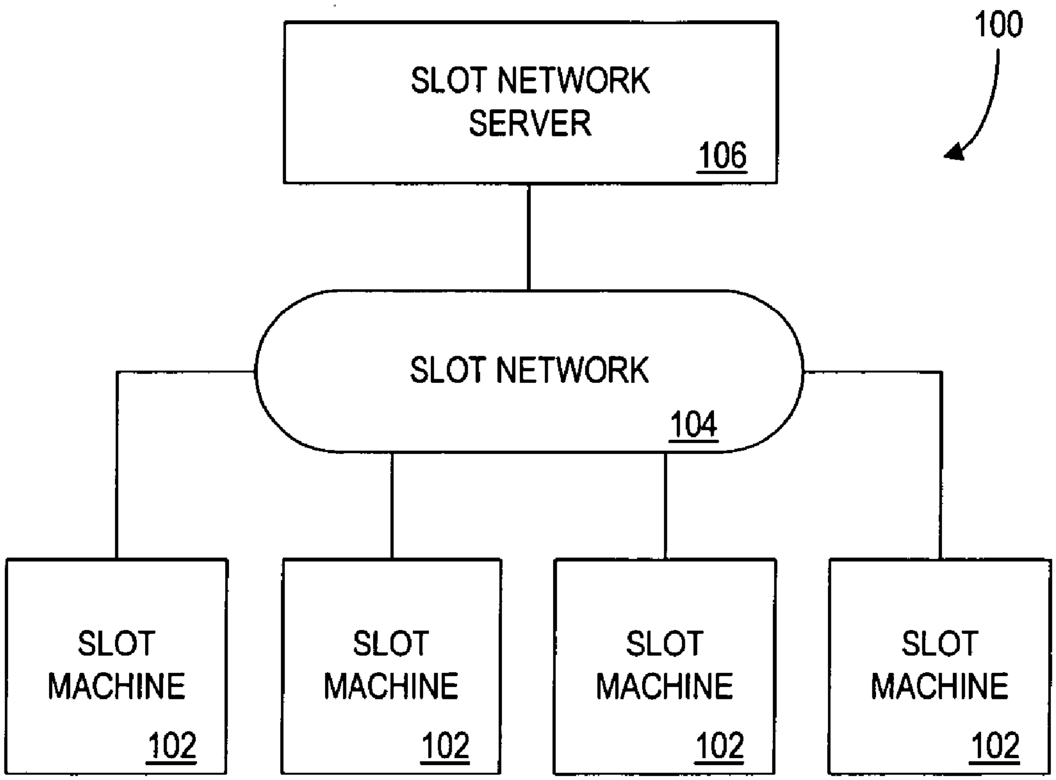
FIG. 1 is an overall schematic view of a system according to one embodiment of the present invention, including a slot machine and a slot network server.

Certain embodiments of the present invention will now be described in greater detail with reference to the drawings. Although the embodiments discussed herein are directed to reel slot machines, it should be understood that the present invention is equally applicable to other gaming devices, such as video poker machines, video blackjack machines, video roulette, video keno and the like.

The present invention is directed generally to a method and apparatus for operating a gaming device having a flat rate play session. As used herein, flat rate play session is defined as a period of play wherein the player need not make funds available for any play during the play session. The flat rate play session spans multiple plays of the gaming device. These multiple plays are aggregated into intervals or segments of play. It is to be understood that the term interval as used herein could be time, handle pulls, and any other segment in which slot machine play could be divided. For example, two hours, one hundred spins, fifty winning spins, etc. A player enters player identifying information and player selected price parameters at a gaming device. The price parameters define the flat rate play session, describing the duration of play, machine denomination, jackpots active, etc. The gaming device stores the player selected price parameters and proceeds to retrieve the flat rate price of playing the gaming device for the flat rate play session. The player selected price parameters, in combination with operator price parameters, determine the flat rate price. Should the player decide to pay the flat rate price, the player simply deposits that amount into the gaming device or makes a credit account available for the gaming device to debit. For example, it might cost twenty-five dollars to play for half an hour.

Once the player initiates play, the gaming device tracks the flat rate play session and stops the play when the session is completed, usually when a time limit has expired. During the play session, the player is not required to deposit any coins. Payouts are made either directly to the player in the form of coins or indirectly in the form of credits to the credit balance stored in the machine. It should be understood that the player balance could be stored in a number of mediums, such as smart cards, credit card accounts, debit cards, and hotel credit accounts.

It should be noted that, throughout the specification that follows, the term "video poker machine" includes, but is not limited to, the various programmable video-game apparatus including a video lottery terminal. In addition, the term "standard deck of playing cards" refers to a collection of fifty-two (52) cards comprising four (4) sets of cards identified by the characters 2 through 10, jack ("J"), queen ("Q"), king ("K"), and ace ("A"). Each of the four (4) sets of cards is differentiated by one of four (4) suits, namely, a spade ("s"), club ("c"), heart ("h"), or diamond ("d"). One or more jokers may also be included for use as the highest card or as a wild card. Reference to a deck of playing cards, unless specified otherwise, shall include one or more decks of playing cards. One or more decks can also be used in a single game. An "infinite" deck of playing cards refers to a deck wherein any single playing card can be dealt a repeated number of times.

With reference to FIG. 1, a system 100 according to one embodiment of the present invention is shown. In general, the system 100 comprises multiple slot machines 102 and a slot network server 106. In the present embodiment, each slot machine 102, which is uniquely identified by a machine identification (ID) number, communicates with the slot network server 106 via a slot network 104. The slot network 104 is preferably a conventional local area network controlled by the server 106. It is to be understood, however, that other arrangements in which the slot machines 102 communicate with the server 106 are within the scope of the present invention.

As will be described in greater detail below, in one embodiment, the slot machine 102 communicates player identifying information to the slot network server 106. The slot network server 106, in turn, verifies the player identifying information. The slot machine 102 also calculates a flat rate price based on both player selected and casino determined price parameters and displays the flat rate price to the player. The player may then accept the flat rate price and initiate play. In another embodiment, the present invention may be practiced without server 106, in an arrangement in which the slot machine 102 calculates the flat rate price.

Figure 2A:
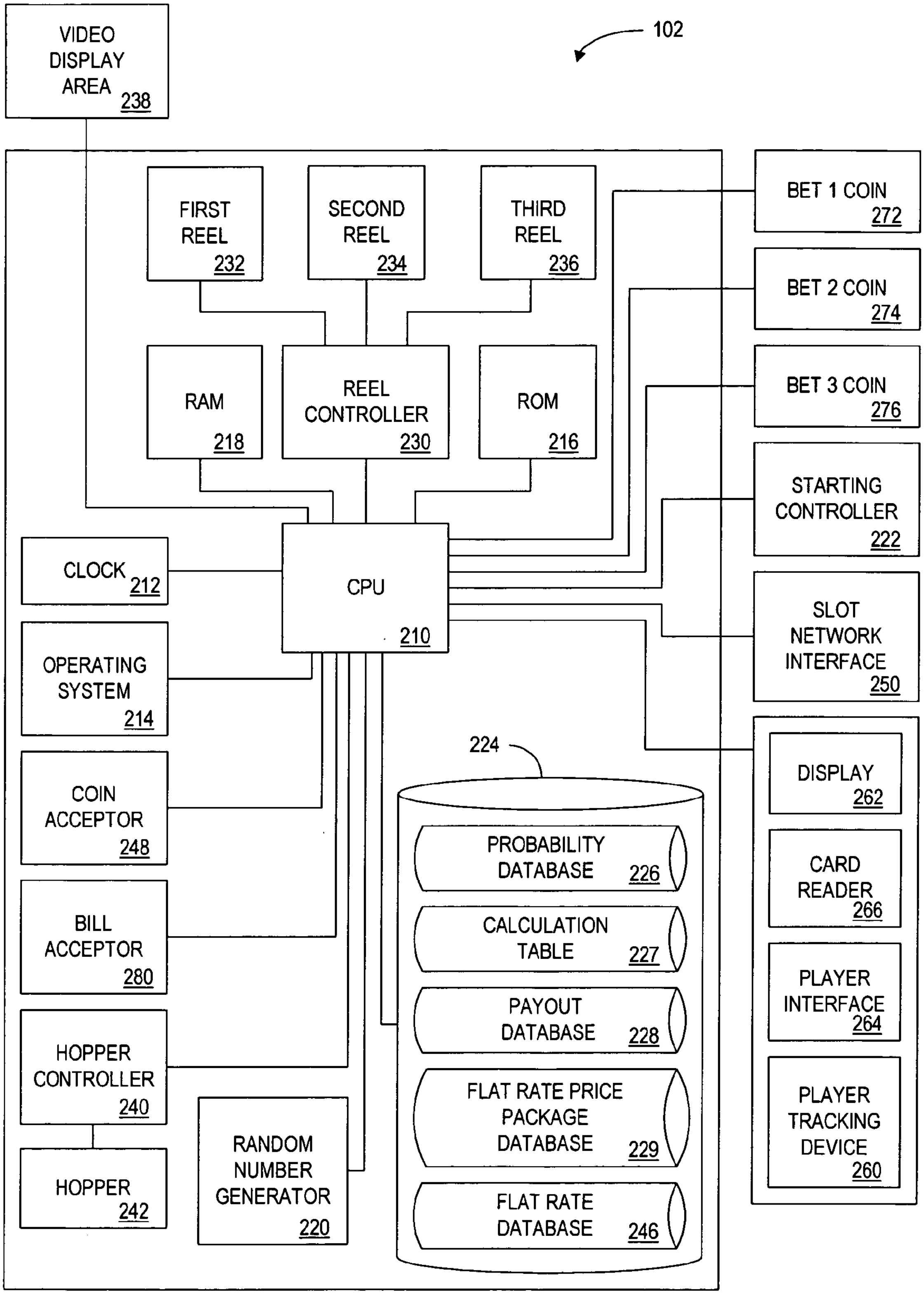
FIG. 2*a* is a schematic view of the slot machine of FIG. 1.

With reference to FIG. 2*a*, the slot machine 102 will now be described in greater detail. The slot machine 102 contains a Central Processing Unit (CPU) 210, a clock 212, and an operating system 214 (typically stored in memory as software). The CPU 210 executes instructions of a program stored in Read Only Memory (ROM) 216 for playing the slot machine 102. The Random Access Memory (RAM) 218 temporarily stores information passed to it by the CPU 210 during play. Also in communication with the CPU 210 is a Random Number Generator (RNG) 220.

With respect to gaming operations, the slot machine 102 operates in a conventional manner. The player starts the machine 102 by inserting a coin into coin acceptor 248, or using electronic credit, and pressing the starting controller 222. Under control of a program stored, for example in a data storage device 224 or ROM 216, the CPU 210 initiates the RNG 220 to generate a number. The CPU 210 looks up the generated random number in a stored probability table 226, which contains a list which matches random numbers to corresponding outcomes, and finds the appropriate outcome. Based on the identified outcome, the CPU 210 locates the appropriate payout in a stored payout table 228. The CPU 210 also directs a reel controller 230 to spin reels 232, 234, 236 and to stop them at a point when they display a combination of symbols corresponding to the appropriate payout. When the player wins, the machine stores the credits in RAM 218 and displays the current balance in video display area 238. In an alternate embodiment, the slot machine 102 dispenses the coins to a payout tray (not shown), and in another embodiment, the slot network server 106 stores the player credits.

A hopper controller 240 is connected to a hopper 242 for dispensing coins. When the player requests to cash out by pushing a cashout button (not shown) on the slot machine 102, the CPU 210 checks the RAM 218 to see if the player has any credit and, if so, signals the hopper controller 240 to release an appropriate number of coins into a payout tray (not shown). A coin acceptor 248 is also coupled to the CPU 210. Each coin received by the coin acceptor 248 is registered by the CPU 210.

In alternate embodiments, the slot machine 102 does not include the reel controller 230 and reels 232, 234 and 236. Instead, a video display area 238 graphically displays representations of objects contained in the selected game, such as graphical reels or playing cards. These representations are preferably animated to display playing of the selected game.

Also in communication with the CPU 210 is a player tracking device 260. The tracking device 260 comprises a card reader 266 for reading player identifying information stored on a player tracking card. As used herein, the term player identifying information denotes any information or compilation of information that uniquely identifies a player. In the present embodiment, the identifying information is a player identification (ID) number. Although not so limited, the player tracking card of the present embodiment stores the player ID on a magnetic strip located thereon. Such a magnetic strip and device to read the information stored on the magnetic strip are well known.

The player tracking device 260 also includes a display 262 and a player interface 264. The player interface 264 may include a keypad and/or a touchscreen display. In operation, as discussed below, the slot machine 102 displays a message prompting the player to enter player selected price parameters. In the present embodiment, a player may enter the player selected price parameters via the player interface 264. Because the player interface 264 is part of the tracking device 260, it is, therefore, in communication with the CPU 210. Alternatively, input of selected price parameters may be accomplished through video display area 238 if it is configured with touch screen capabilities.

The slot machine 102 also includes a series of bet buttons 272, 274, 276. The bet buttons include "Bet 1 coin" 272, "Bet 2 coins" 274, and "Bet 3 coins" 276. The bet buttons 272, 274, 276 are coupled to the CPU 210. Therefore, pressing one transmits a signal to the CPU 210 indicating how much a player is wagering on a given play.

The databases stored in the data storage device 224 include a probability table 226, a calculation table 227, a payout table 228, a flat rate price package database 229, and a flat rate database 246. As discussed in greater detail below, the flat rate database 246 and the calculation table 227 store information related to the flat rate play session and calculation of the flat rate price, respectively. The flat rate price package database 229 stores information describing different pre-established flat rate packages as custom designed by the casino.

Also connected to the CPU 210 is a slot network interface 250. The slot network interface 250 provides a communication path from the slot machine 102 to slot network server 106 through the slot network 104. Thus, as discussed in greater detail below, information is communicated among the player tracking card, player tracking device 260, slot machine 102, and slot network server 106.

Figure 2B:
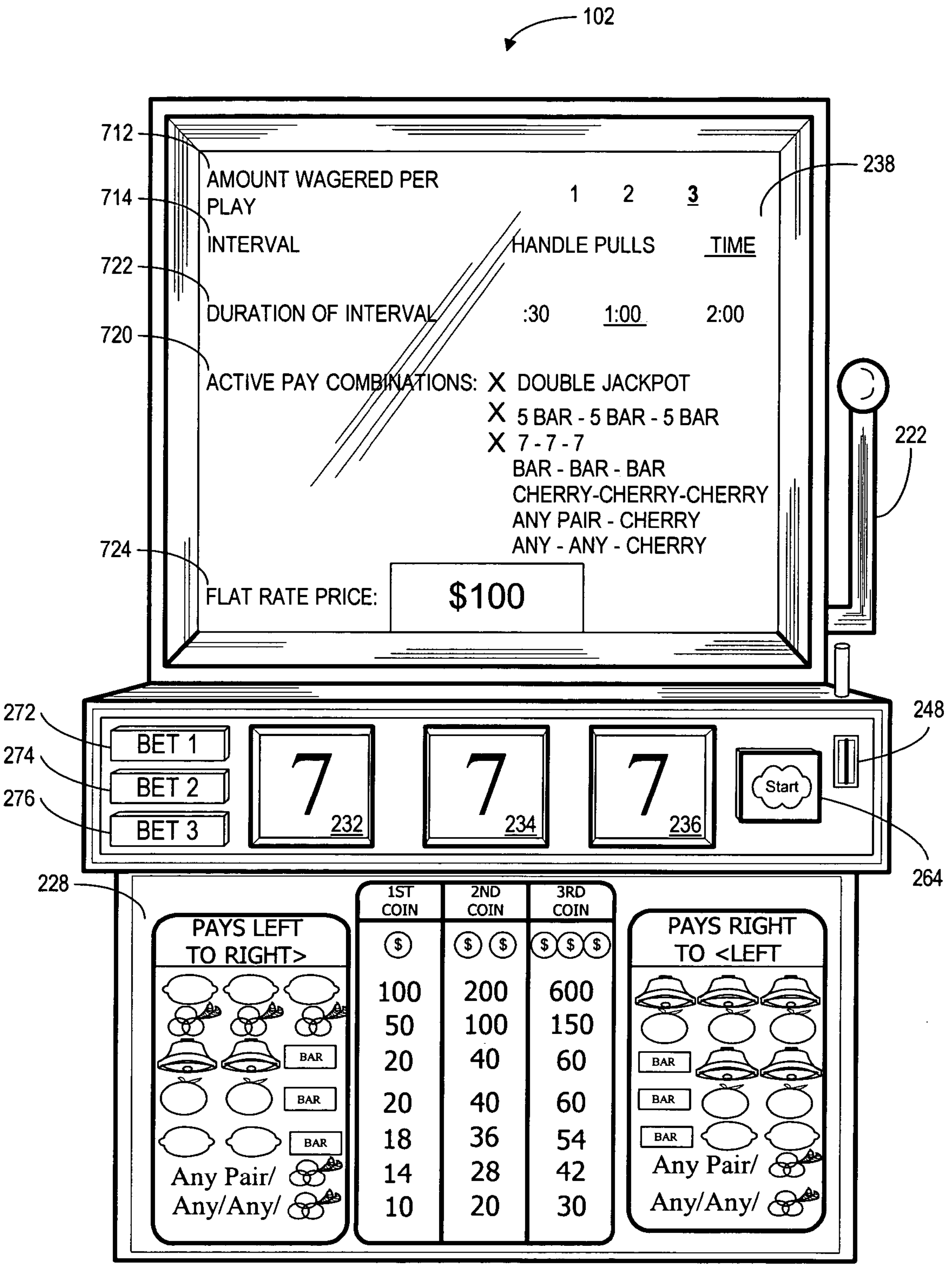
FIG. 2*b* is a plan view of the slot machine of FIG. 1.

With reference to FIG. 2*b*, the plan view of slot machine 102, will now be described below. FIG. 2*b* depicts slot machine 102 displaying player selected price parameter options on video display area 238. Included in the displayed parameters is amount wagered per play 712, interval 714, duration of interval 722, and active pay combinations 720. As will be described further below, after the player has selected the desired price parameters, the slot machine 102 displays a flat rate price 724. Once the player has accepted the flat rate price and made the appropriate funds available, play may commence.

Figure 3:
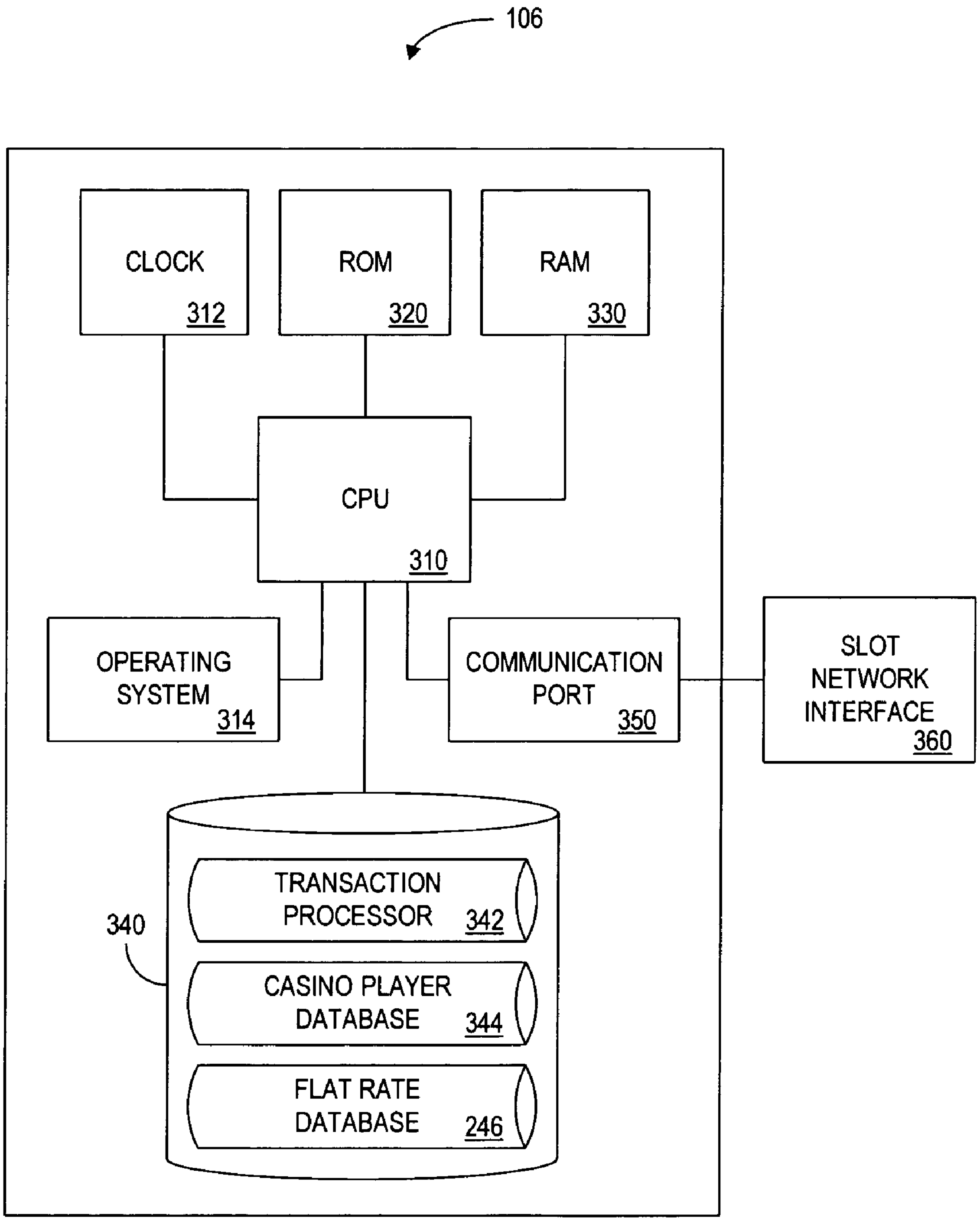
FIG. 3 is a schematic view of the slot network server of FIG. 1.

The slot network server 106 will now be described in greater detail with reference to FIG. 3. Like the slot machine 102 of FIG. 2, the slot network server 106 has a Central Processing Unit (CPU) 310. The CPU 310, which has a clock 312 associated therewith, executes instructions of a program stored in Read Only Memory (ROM) 320. During execution of the program instructions, the CPU 310 temporarily stores information in the Random Access Memory (RAM) 330.

Additionally, the CPU 310 is coupled to a data storage device 340, having a flat rate database 246, transaction processor 342 and a casino player database 344. In general, the transaction processor 342 manages the contents of the data storage devices 340. As discussed in detail below, the casino player database 344 stores information specific to each player, including player identifying information.

In order to communicate with the slot machines 102, the slot network server 106 also includes a communication port 350. The communication port 350 is coupled to the CPU 310 and a slot machine interface 360. Thus, the CPU 310 can control the communication port 350 to receive information from the data storage device 340 and RAM 330 and transmit the information to the slot machines 102 and vice versa.

It is to be understood that because the slot machines 102 are in communication with the slot network server 106, information stored in a slot machine 102 may be stored in the server 106 and vice versa. Thus, for example, in an alternate embodiment, the server 106 rather than the slot machine 102 includes the payout table 228, flat rate database 246, and/or calculation table 227.

The casino player database 344 of the present embodiment, as shown in FIG. 4, includes multiple records having multiple fields of information. Specifically, the casino player database 344 comprises multiple records, each record being associated with a particular player, as identified by a player identification (ID) number. The fields within each record include: player identification (ID) number 410, social security number 412, name 414, address 416, telephone number 418, credit card number 420, credit balance 422, complimentary information, such as total accumulated complimentary points 424, whether the player is a hotel guest 426, player status rating 428, and value of interval remaining 430. Having information related to one field, such as player ID 410, allows the slot network server 106 to retrieve all information stored in corresponding fields of that player record.

It is to be understood that not all of these identifying fields are necessary for operation of the present embodiment. For example, the name 414, social security number 412, address 416, telephone number 418, credit card number 420, and hotel guest 426 fields are merely representative of additional information that may be stored and used for other purposes. In one embodiment, credit card number 420 and hotel guest 426 are used for billing purposes and social security number 412 is used to generate tax forms when a player wins a jackpot over a given amount.

Complimentary points awarded 424 is further illustrative of additional information a casino may store in a player's record. As described below, a player's complimentary points are displayed to the player when a player tracking card is inserted into the slot machine 102. In an alternate embodiment, such points may be used in addition, or as an alternative to the credit balance 422 stored in RAM 218 of slot machine 102.

The player status rating 428 contains information representative of the particular player's relative importance to the casino, as based upon the frequency and duration of the player's visits, the amount of money wagered, and the like.

The value of interval remaining field 430 stores the value of interval remaining in a flat rate play session when a player terminates the play session prior to its expiration. This field will be described in greater detail below.

The flat rate database 246 will now be described in greater detail with reference to FIG. 5. The flat rate database 246 comprises multiple records, each record pertaining to the flat rate play session of a particular player, as identified by that player's ID number. Consequently, one field in flat rate database 246 is the player ID number field 510. Other fields include: player selected price parameters 512, flat rate price 514, interval remaining 516, time audit data 518, and machine identification (ID) number field 520. The machine ID number field 520 contains the machine ID number that uniquely identifies the slot machine 102. It is to be understood that since both the casino player database 244 and the flat rate database 246 include a player ID field, 410 and 510, respectively, the system 100 can correlate any player information stored in the casino player database 344, with any player information stored in the flat rate database 246.

The payout table 228 will now be described in greater detail with reference to FIG. 6. As shown in FIG. 6, the payout table 228 of the present embodiment can be logically represented by five fields of related information. The first field, a pay combination field 610, identifies the set of possible pay combinations for a given slot machine 102. Such possible pay combinations include winning pay combinations, or those in which a payout results, and non-winning pay combinations, in which the player receives no payout and consequently loses the amount wagered. Winning pay combinations include, for example, "DOUBLE JACKPOT-DOUBLE JACKPOT-DOUBLE JACKPOT" and "BAR-BAR-BAR." The pay combinations field 610 also includes a "NON-WINNING OUTCOMES" record, an entry representing the outcomes which result in no payout to the player, such as "PLUM-BELL-ORANGE."

The payout table 228 also includes three payout fields 620, 630, 640. Such payout fields 620, 630, 640 contain the payout information for each of the possible pay combinations identified in the pay combinations field 610. Each of the payout fields 620, 630, 640 is identified by the number of coins wagered on a particular play, as selected via the bet buttons 272, 274, 276. In the present embodiment, payout table 228 contains a "1 coin" payout field 620, which is accessed when one coin is wagered, a "2 coins" payout field 630, which is accessed when two coins are wagered, and a "3 coins" payout field 640, which is accessed when three coins are wagered. In other words, each field 620, 630, 640 corresponds to a bet button 272, 274, 276, respectively. The payout information provides the number of coins won upon the occurrence of a particular pay combination. Thus, "CHERRY-CHERRY-CHERRY" pays out ten coins when one coin is wagered.

Finally, the payout table 228 of the present embodiment includes a pay combination status field 650. The pay combination status field 650 includes an indication for each winning pay combination, identified in the pay combination field 610, of whether the player is eligible to win the payout for each outcome. As will be described below, the determination of whether a player is eligible to win a payout for a given outcome is made by the player as part of the player selected price parameters.

The calculation table 227 will now be described in greater detail with reference to FIG. 7. The calculation table 227 is used by the system 100 in determining the flat rate price 724 (field 514 in the flat rate database 246) charged to the player. Specifically, the calculation table 227 contains multiple price parameters which are correlated to a flat rate price 724. More specifically, these price parameters include player selected price parameters and operator selected price parameters. In general, player selected price parameters include any game related variable that defines the flat rate play session. Furthermore, operator selected price parameters are parameters which the operator of the slot machines 102 selects as affecting the flat rate price 724. Thus, in the present embodiment, the player selected price parameters in the calculation table 227 include machine type 710, amount wagered per play 712, active pay combinations 720, and length of the flat rate play session 722. The operator selected price parameters in the calculation table 227 include player status rating 714, time of day 716, day of the week 718, and machine usage 719. In the present embodiment the flat rate price 724 is predetermined based upon the aforementioned price parameters and stored in the calculation table 227, as will be described later in FIGS. 14 and 15. In an alternate embodiment the flat rate price 724 is calculated based upon these parameters as needed according to a price algorithm stored in memory. For example, the price algorithm may operate as follows:

Algorithm for Calculating a Flat Rate Price

The are any number of algorithms that could be used to calculate a flat rate price, and they can be generally described as calculating an expected value to the customer and then adding in a margin for the casino or adjusting the price to reflect the time of day, value of the customer, etc.

The first step is to determine a "base" flat rate price. This would be calculated as follows:

$$\text{Base Price}=[(\text{amount wagered})\times(\text{interval})]\times[(\text{expected coins awarded for all active pay combinations over a cycle}/\text{expected coin-in over a cycle})].$$

For example, the following Base Price calculation represents a player selecting three dollar coins per handle pull, an interval of 500 handle pulls, and the top three pay combinations active. For this example we will assume that a complete cycle of the slot machine is 10,648 unique outcomes and that the top three pay combinations would pay 2,160 coins over that cycle. Note also that the expected coins awarded for all active pay combinations over a cycle and the expected coin-in over the cycle should both reflect the same number of coins wagered. Essentially, this ratio reflects the expected monetary return to the payer on a per coin wagered basis. When multiplied by the amount wagered and the number of handle pulls the number reflects the amount of money that the player would be expected to receive from the machine over the interval specified. It should be notes that this amount of money is not necessarily the number of coins entered by the player but rather is the theoretical number of coins of play allowed by the flat rate session. Continuing with the calculation:

$$\begin{aligned}\text{Base Price} &= [(\$3)\times(500)]\times[(2{,}160/10{,}648)]\\ &= \$1{,}500\times.202855\\ &= \$304.28\end{aligned}$$

Note that if the player were to pay this Base Price he would be essentially getting a fair bet for his money. He would pay $304.28 for the session and expect (over the long run) to get $304.28 back in prize money from the top three active pay combinations. Of course in the short run his results could range from receiving no payouts over the interval to receiving thousands of dollars. Because this base price is a fair bet for the player the casino may want to add in margin for the house, perhaps by multiplying the base price by a predetermined margin factor such as 50%. In this example the Profit Adjusted Price would thus be:

$$\begin{aligned}\text{Profit Adjusted Price} &= \$304.28\times150\%\\ &= \$456.42\end{aligned}$$

Of course the casino might want to offer flat rate sessions to players without a casino markup under some circumstances, such as part of a promotional package or to reward a particularly loyal customer. In fact the casino might even decrease the base price in some circumstances.

The Base Price or (Profit Adjusted Price) could be further modified by various other operator price parameters such as the following:

1. Time of Day (TD).

Times of the day in which the casino traffic tends to be heavy should result in the player paying a premium for the flat rate session, while quiet times in the casino should offer the player a discount over normal rates.

| | |
|---|---|
| Midnight to 4 am | 70% |
| 4 am to 8 am | 80% |
| 8 am to 12 pm | 90% |
| 12 pm to 4 pm | 100% |
| 4 pm to 8 pm | 120% |
| 8 pm to Midnight | 140% |

2. Day of Week (DW).

With the heaviest volume of visitors falling on Fridays and Saturdays, these days will necessitate higher flat rate session costs. For example:

| | |
|---|---|
| Monday to Thursday | 80% |
| Friday | 120% |
| Saturday | 140% |
| Sunday | 100% |

3. Player Status Rating (PSR).

For top customers such as high rollers, the cost of a flat rate session may be reduced as a customer retention tool. For example:

| | | |
|---|---|---|
| 1 | (High Roller) | 80% |
| 2 | (Good customer) | 90% |
| 3 | (Average) | 100% |
| 4 | (Low) | 120% |

4. Slot Machine Usage (SMU).

When the majority of slot machines in the casino are being used, a premium is applied to the cost of the flat rate play session in order to more evenly distribute play. For example:

| | |
|---|---|
| Heavy | 120% |
| Moderate | 100% |
| Light | 80% |

Sample Calculation.

In addition to the above player selected price parameters, the following operator selected parameters are incorporated into the price: The player is in the casino at 2 am on a Wednesday, there is low slot machine usage, and the player has an average rating. The calculations below reflect these conditions:

Base Price=$304.28

$$\begin{aligned}\text{Final flat rate price} &= (\text{Base Price})\times TD\times DW\times PSR\times SMU\\ &= \$304.28\times 70\%\times 80\%\times 100\%\times 80\%\\ &= \$304.28\times 44.8\%\\ &= \$136.32\end{aligned}$$

The casino may round up this price to $137 to avoid the need for small change. In the above calculations, the casino might also incorporate floors which prevent the Base Price from going below a level that would be profitable for the house, regardless of the number of positive criterion that were applied to the base price.

Those of ordinary skill in the art will appreciate that modifications could be made to the formula to reflect different kinds of flat rate sessions. For a session with an interval of one hour (instead of a fixed number of handle pulls) the formula might reflect an expected number of handle pulls per hour for that particular game, perhaps even adjusted to reflect the type of player purchasing the flat rate session. For example, an experienced video poker player might be expected to reach 700 hands per hour while a beginner might only be expected to reach 300 hands per hour.

As will also be understood by those skilled in the art, the ultimate goal of many slot machine players is to hit a jackpot payout. The enjoyment of the play, as well as the ability to maximize the chance of hitting a large jackpot, is increased by more play. Play can be increased both by playing longer, and by playing faster. As will be appreciated from a consideration of the process described below, the present invention permits both increased duration, by providing for play at discounted prices, and speed of play, by providing for minimal time delays between plays.

The flat rate price package database 229 will now be described in greater detail with reference to FIG. 14. The flat rate price package database 229 is used by the system 100 in providing the player with different price package options for flat rate play of the slot machine 102. Specifically, the flat rate price package database 229 contains multiple combinations, or packages 1410, of price parameters which correspond to pre-established flat rate prices. More specifically, these price parameters include but are not limited to, interval 1412, duration of flat rate play 1414, amount wagered per play 1416, and pay combination status 1418. Each combination of price parameters has corresponding flat rate play session prices 1420. As will be described later in FIG. 15, the flat rate price package database 229 is accessed when the player determines he wishes to initiate a flat rate play session. Rather than let the player choose the price parameters, the slot machine 102 lists the different packages stored in the flat rate price package database 229. The player then chooses the package he likes the most and play commences.

Having thus described the components of the present embodiment, the operation of the system 100 will now be described in greater detail with reference to FIGS. 8-11, and continuing reference to FIGS. 1-7. It is to be understood that the programs stored in ROM 320 of the slot network server 106 and ROM 216 of the slot machine 102 provide the function described below.

Figure 8A:
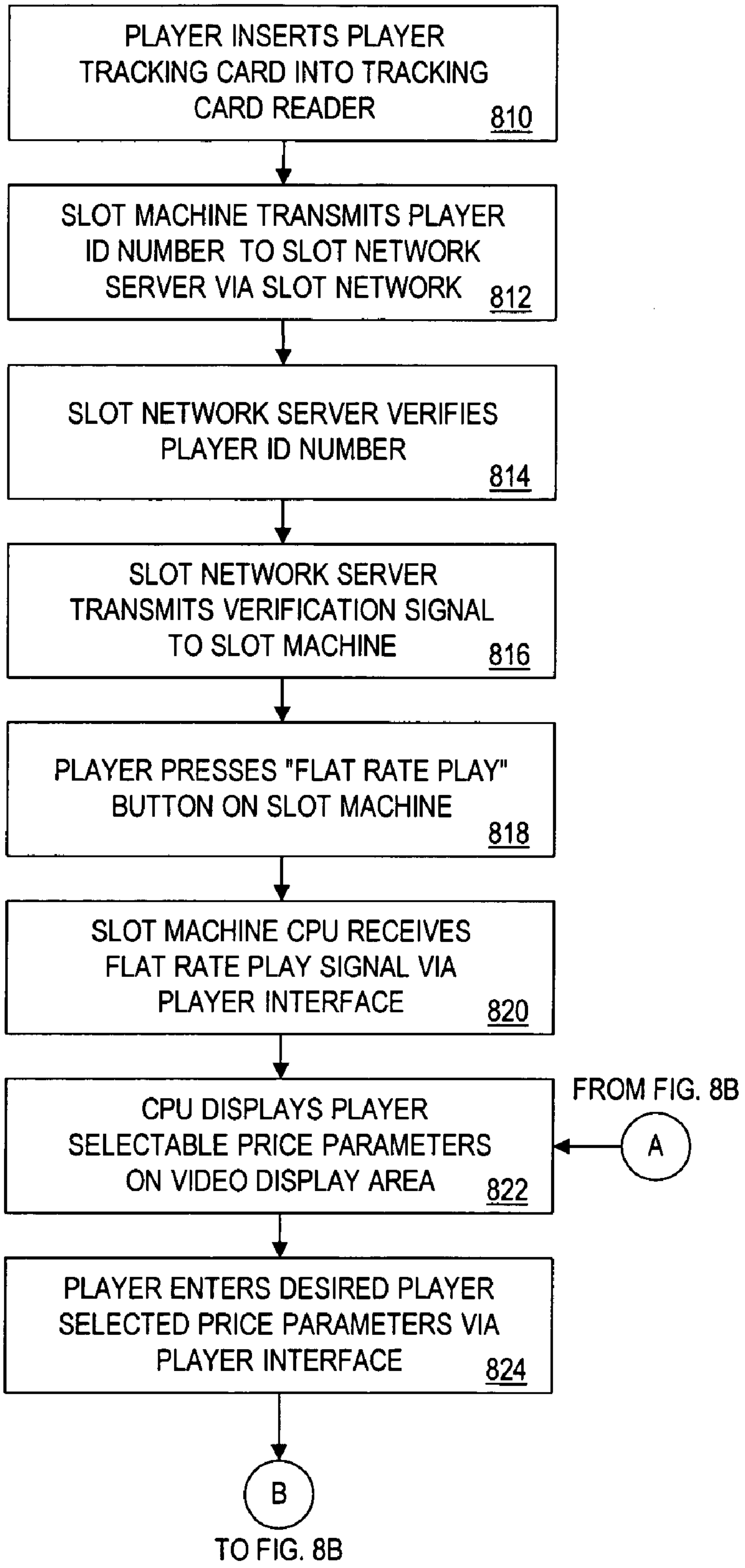
FIGS. 8*a* and 8*b* are overall flow diagrams of the operation of the system of FIG. 1.
Figure 8B:
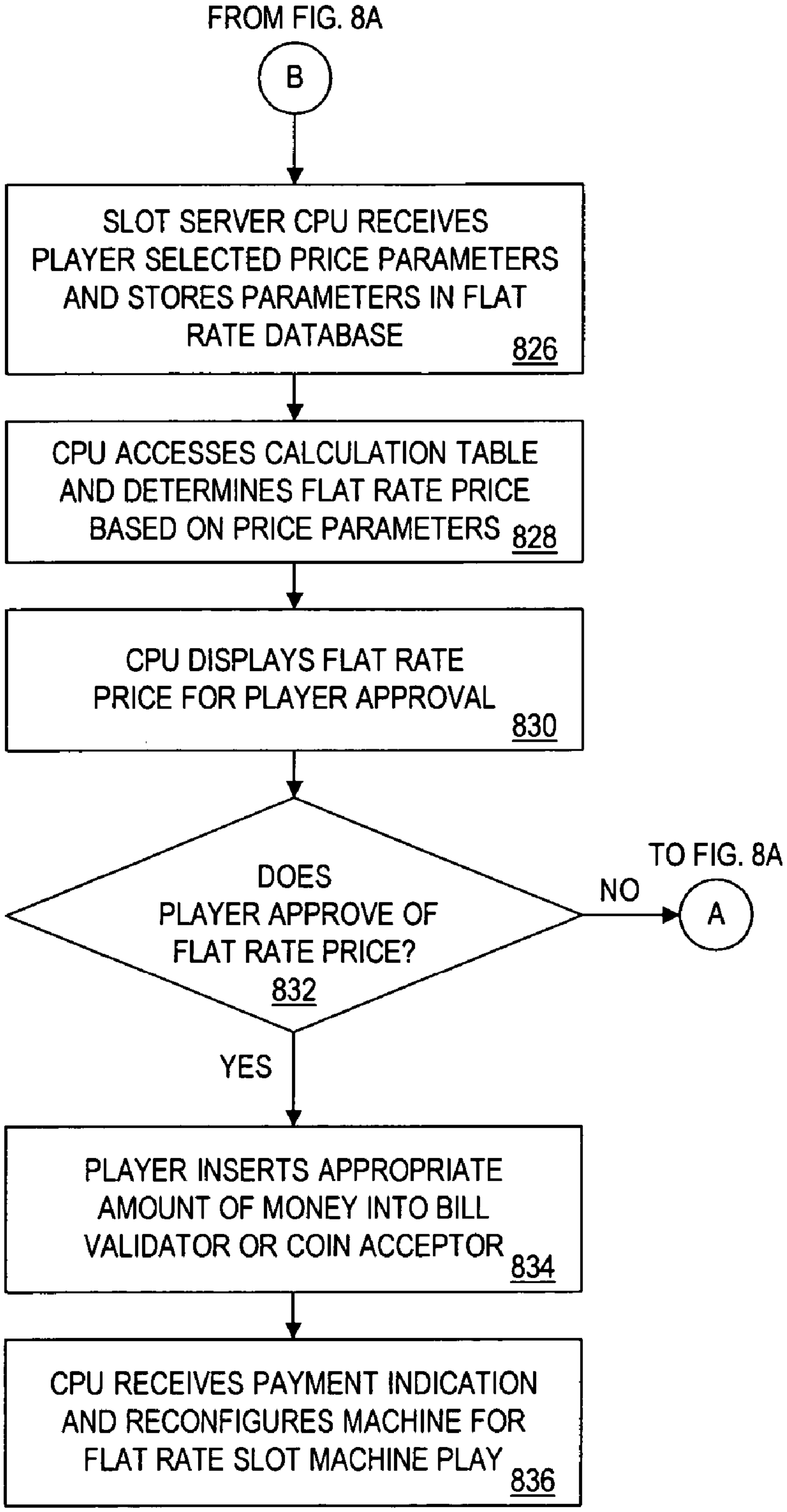

Turning first to FIGS. 8*a* and 8*b*, the general operation of the system 100 will be described. As shown in step 810, the slot machine player first inserts the player tracking card into the card reader 266. The card reader 266 then proceeds to read player identifying information from the tracking card. The player identifying information, namely the player ID number, is communicated from the slot machine 102 to the slot server 106 in step 812.

Upon receiving the player identifying information, the slot network server 106 verifies the information in step 814. Such verification includes the slot network server 106 searching the casino player database 344 for a record containing the received player ID number in the appropriate field 410. Once the slot network server 106 verifies the player identifying information, the server 106 transmits a signal to the slot machine 102 acknowledging such verification in step 816. In alternate embodiments, other information, such as the player's name 414, complimentary point total 424, and player status rating 428 are transmitted to the slot machine 102 for display.

In step 818, the player selects flat rate play via the player interface 264. The CPU 210 of slot machine 102, in step 820, then receives a signal from the player interface 264, indicating that the player has selected flat rate play. For example, there could be a button specifically for triggering a flat rate play session. The CPU 210, in response, accesses memory to retrieve player selectable price parameters. Player selectable price parameters are the choices available to a player for entering the player selected price parameters. These player selectable price parameters are controlled by a program stored in ROM 216. Such player selectable price parameters, in the present embodiment, include the amount wagered per play, (e.g. one, two, or three coins), the length of the flat rate play session, and possible jackpot structures, such as having only the "DOUBLE JACKPOT" and "5 BAR" jackpots active (as illustrated in the payout table 228 of FIG. 6). In an alternate embodiment, the player selectable price parameters are stored as part of the calculation table 227.

Then, as shown in step 822, the slot machine 102 displays the player selectable price parameters to the player. For example, the parameters could be listed on the video display area 238 for the player, as described previously in FIG. 2*b*. Once the parameters appear, the player simply selects his desired settings. Alternatively, the player may accept one or more default settings. Once the player selectable price parameters are displayed on the display 238, the player proceeds, in step 824, to enter player selected price parameters via the player interface 264. The player selected price parameters also include data which, although not directly inputted by the player, is selected by the player and identified by the slot machine 102. In the present embodiment, such additional player selected price parameters include type of machine, time of day, and day of the week.

It is to be understood that the casino operator of the slot machines 102 may define the scope of the player selectable price parameters, and therefore limit the player selected price parameters in any manner. For example, the length of flat rate play may be limited to periods above a minimum time or to periods that are multiples of thirty minute intervals. The jackpot structure may require that some jackpots remain active.

Referring now to FIG. 8*b*, the slot machine 102 CPU 210 receives the player selected price parameters in step 826. Having received the player selected parameters, the CPU 210 then stores the player selected price parameters, the player identifying information, and the slot machine's machine ID number in a record in the flat rate database 246. Specifically, the player ID number is stored in field 510, the machine ID number is stored in field 520, and the player selected price parameters are stored in field 512. Although the player selected price parameters are illustrated as being stored in a single field (512), it is to be understood that each player selected price parameter may be stored in a separate field. It is also to be understood that in alternate embodiments the player selected price parameters need not be stored in a database, but could be stored in RAM 218.

The slot machine 102 CPU 210 uses the player selected price parameters to determine the flat rate prices. Specifically, in step 828, the CPU 210 accesses the calculation table 227 and searches for the flat rate price 724 corresponding to the received player selected price parameters 512, which, in the present embodiment, include machine type 710, amount wagered per play 712, time of day 716, day of the week 718, active jackpots 720, and the length of the flat rate play session 722. The CPU 210 also incorporates operator selected price parameters for the flat rate price 724 such as player status rating 714 and machine availability 719. As will be appreciated by one skilled in the art, the player status rating 714 is received from the casino player database 344 at any time prior to determination of the flat rate price 724. Thus, in a embodiment, the slot network server 106 transmits the player status rating 428 to the slot machine 102 along with the verification signal in step 816.

By including the player status rating 714 in the calculation table 277, a casino may reward frequent players who wager relatively large amounts of money with a lower flat rate price 724. Thus, the system 100 rewards and encourages frequent play. By including active jackpots 720 in the calculation table 348, the system 100 allows a casino to discount the flat rate price 724 for those players who choose to enable relatively few winning outcomes in the payout table 228. Furthermore, by including the price parameters relating to time of day and day of the week in the calculation table 227, a casino may charge a lower flat rate price 724 for sessions during weekday afternoons or between 2:00 a.m. and 8:00 a.m. in the mornings, thereby encouraging play of the slot machines 102 when they are typically idle.

It is to be understood that the aforementioned price parameters in the calculation table 227 are merely representative of the type of variables that may be considered in determining a flat rate price. Thus, it is within the scope of the present invention to include only some of the price parameters, all of the parameters, or additional parameters in the calculation table 227.

As mentioned above, the flat rate price may be based partly upon the availability of slot machines 102. In such an embodiment, the server 106 tracks whether each slot machine 102 is being used by noting whether outcomes are currently being received from a given slot machine 102. In another embodiment, the server 106 tracks slot machine availability by tabulating the number of slot machines 102 for which flat rate play is currently enabled. In yet another embodiment, the server 106 tracks slot machine availability by identifying how many slot machines 102 have a player tracking card inserted therein.

Another price parameter which may be used is predicted or forecasted slot machine availability. Specifically, such a parameter accounts for anticipated availability of slot machines 102 based upon events at the casino. For example, the calculation table 227 correlates a lower flat rate price 724 to the time of day 716 corresponding to an event, such as a show which many casino players attend. On the other hand, the calculation table 227 correlates a higher flat rate price to the time of day 716 corresponding to the end of the event or heavier casino traffic. This enables a casino to effectively revenue manage their slot machines without resorting to a change in hold percentage which requires regulatory approval.

It is to be understood that accounting for slot machine availability need not be accomplished in the calculation table 227. Rather, in an alternate embodiment, a schedule of events is stored in RAM 218 which is accessed prior to transmitting the flat rate price 724 to the player. If the event schedule indicates that an event is ending during the requested flat rate play session, then the flat rate price 724 will be incremented accordingly.

In another embodiment, the flat rate price is based only on operator selected price parameters. A slot machine 102 according to such an embodiment could, for example, provide discounted flat rate play sessions based on player status rating, thereby offering 100 plays for the price of 90 or discounted timed sessions. To encourage repeat, high stakes play, higher player status ratings result in greater discounts.

Having determined the flat rate price 724, the slot machine 102, in step 830, displays the duration of the flat rate play session 722 and the flat rate price 724 and requests approval from the player. Once the player accepts the terms of the flat rate play session, flat rate play commences.

If the player does not approve the flat rate price 724, then the player indicates so via the player interface 264. As indicated by path A in FIGS. 8*a* and 8*b*, the slot machine 102 repeats its operation from step 822. On the other hand, if the player approves the flat rate price 724, the player indicates such approval via the player interface 264 in step 832. Following such approval, the slot machine 102 prompts the player to enter an appropriate amount of money in step 834. In the present embodiment, the player deposits coins into the coin acceptor 248. In one embodiment, the player deposits a casino token as payment for the flat rate session. Such tokens may be denominated in dollars, or represent a number of handle pulls. A casino could thus sell a fifty handle pull token, usable on a particular denomination and/or type of machine. Such a token may additionally serve to activate the flat rate session, eliminating the need for the player to select flat rate play via player interface 264. Alternatively, the player's credit balance 422 may be debited to pay for the flat rate play session.

In some embodiments a casino token may be associated with a particular set of pay combinations which are to be active during a flat rate play session activated via the token. In yet other embodiments a casino token may be associated with (i) a specified duration of time, (ii) a specified number of handle pulls or outcomes, (iii) a specified number of winning handle pulls or outcomes, and/or (iv) a flat rate price package as, for example, described with reference to the flat rate price package database 299 of FIG. 14. A gaming device may identify such a token and enter the appropriate flat rate play session by, for example, the size and/or weight of the token or by reading or receiving information from the token (e.g. via a computer chip embedded in the token or special markings on the token). Such a casino token may be, for example, purchased by a person and given to another person as a gift. The recipient may subsequently use the token by inserting it into an appropriate gaming device and essentially playing for "free" (since the person that gave the gift had prepaid for the token) for a specified duration.

Once the CPU 210 registers the receipt of money, the CPU 210 reconfigures the slot machine 201 for the flat rate play session in step 836. Specifically, the CPU 210 generates a signal, or a flag in memory, indicating that there is no need to accept the coins between plays. CPU 210 further sets the active field 650 in the payout table 228 according to the jackpot structure entered by the player.

Figure 9:
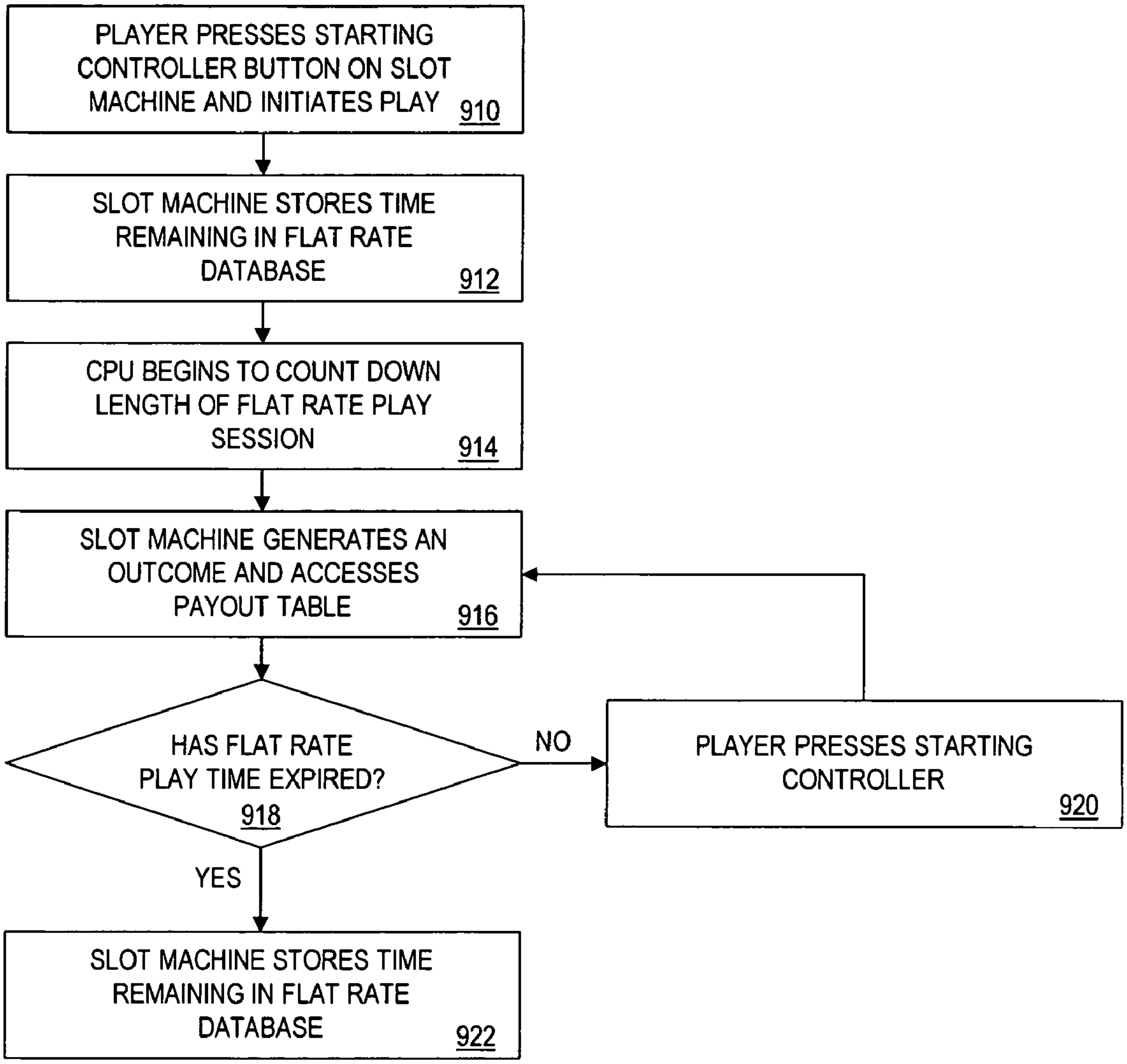
FIG. 9 is a detailed flow diagram of the operation of the system of FIG. 1.

The operation of the slot machine 102 during the flat rate play session will now be described with reference to FIG. 9 and continuing reference to FIGS. 1-7. During the flat rate play session, a slot machine 102 operates generally as described above with reference to FIG. 2. However, the slot machine 102 is reconfigured to operate according to the player selected price parameters, if such parameters affect play, and to operate continuously, without requiring payment between each play. Specifically, the flat rate play session begins when the player presses the starting controller 222 in step 910. The CPU 210 also initiates a countdown of the length of the flat rate play session as stored in the player selected parameters field 512 of the flat rate database 246. With the start of the session, the CPU 210 stores the start time of the flat rate play session in the flat rate database 246. Specifically, the start time is stored in the time audit data field 520 in step 912. In step 914, the CPU 210 begins to count down the duration of the flat rate play session. Next, in step 916, the slot machine 102 generates an outcome and accesses payout table 228 to determine the appropriate corresponding number of coins to be paid out.

Furthermore, in step 918, after each outcome is generated, the slot machine 102 determines whether the countdown of the interval remaining 516 has reached zero. It is to be understood that the countdown may be implemented in either software or hardware. Additionally, it is understood that the countdown process discussed herein may be replaced with any suitable means for tracking the duration of the flat rate play session. Interval remaining 516 may also represent the number of handle pulls remaining.

In the event that the countdown has not reached zero, the player presses the starting controller 222 in step 920, thereby initiating another play of the slot machine 102. In the event that the countdown has reached zero, the CPU 210 generates a signal indicating that the flat rate play session has concluded. The slot machine 102 displays a message indicating this to the player and, in step 922, stores the end time of the session in the time audit data field 518 of the flat rate database.

In an alternate embodiment, the player selected price parameters include the "time between plays." In this embodiment, the CPU 210 of slot machine 102 controls the time between generating outcomes of successive plays in the slot machine 102 to equal the received "time between plays" player selected price parameter. In another alternate embodiment, the slot machine 102 tracks the number of plays during the flat rate play session. If the number of plays exceeds a predetermined limit, the slot machine 102 automatically terminates the flat rate play session, regardless of the duration of the flat rate play session.

Figure 10:
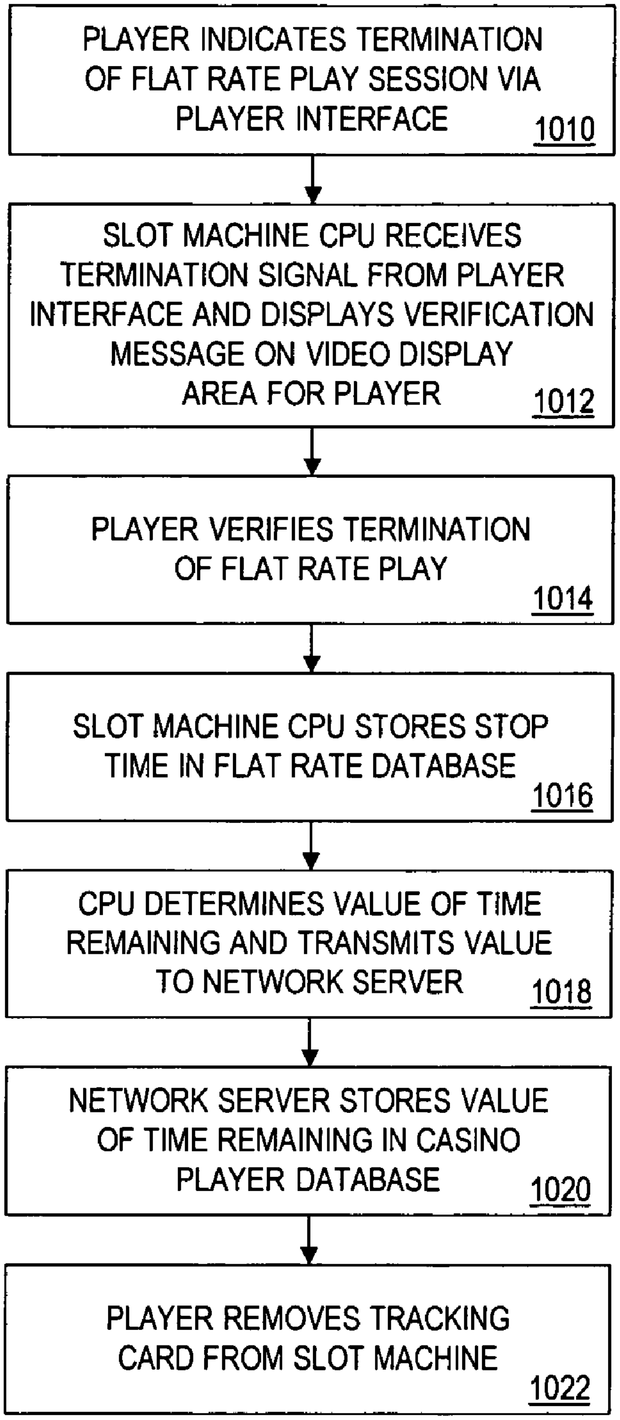
FIG. 10 is a flow diagram of the process of terminating play of the system of FIG. 1.

Turning now to FIG. 10, the operation of the system 100 when the player terminates the flat rate play session prior to the expiration of the session will be described. In step 1010, the player indicates a desire to terminate the flat rate play session via the player interface 264. Consequently, the slot machine 102 CPU 210 receives a termination signal and, in step 1012, displays a message to the player, asking the player to verify termination of the flat rate play session. If the player does not verify termination, then the session continues as described above with reference to FIG. 9. On the other hand, if the player verifies termination, shown as step 1014, the CPU 210 proceeds to store the stop time in the time audit data field 518 of the flat rate database 246 in step 1016.

It is to be understood that having both the start time and the stop time of the flat rate play sessions stored in the flat rate database 246 allows the casino to perform an audit of the session. Specifically, should a player allege that the flat rate play session was shorter than that which was paid for, the casino may access the flat rate database 246 and retrieve the actual start and stop time from the time audit data field 520. In the present embodiment, this time includes an indication of the day, hour, and minute of the play session.

Next, in step 1018, CPU 210 determines the value of the interval remaining in the flat rate play session and transmits the value to the server 106. In order to determine the value of the interval remaining, the CPU 210 accesses the calculation table 227. The value of interval remaining will equal the flat rate price 724 corresponding to the price parameters (i.e., the machine type 710, amount wagered per play 712, player status rating 714, time of day 716, etc.) used to determine the original flat rate price charged to the player. When determining the value of the interval remaining, however, the value in the length of flat rate play session field 722 is not the original length of the session, but rather is equal to the actual interval remaining in the flat rate play session. Stated succinctly, the slot machine 102 identifies the flat rate price 724 corresponding to the actual interval remaining in the flat rate play session.

Once the value of interval remaining is determined, the slot machine 102 transmits the value to the slot network server 106. Upon receiving the value of interval remaining, the server 106 stores the value in field 430 of the casino player database 344 in the player's record, as identified by the player ID number 410. Storing the value is shown as step 1020. Finally, in step 1022, the player removes the player tracking card.

Figure 11A:
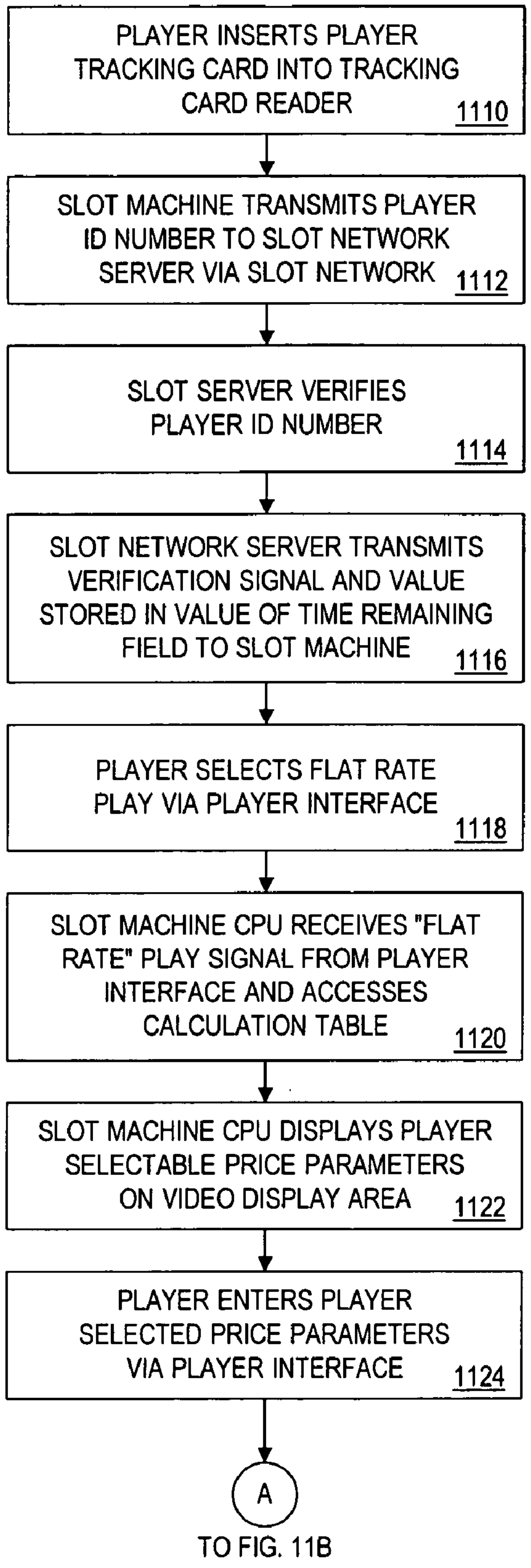
FIGS. 11*a* and 11*b* are flow diagrams of the process of resuming play of the system of FIG. 1.
Figure 11B:
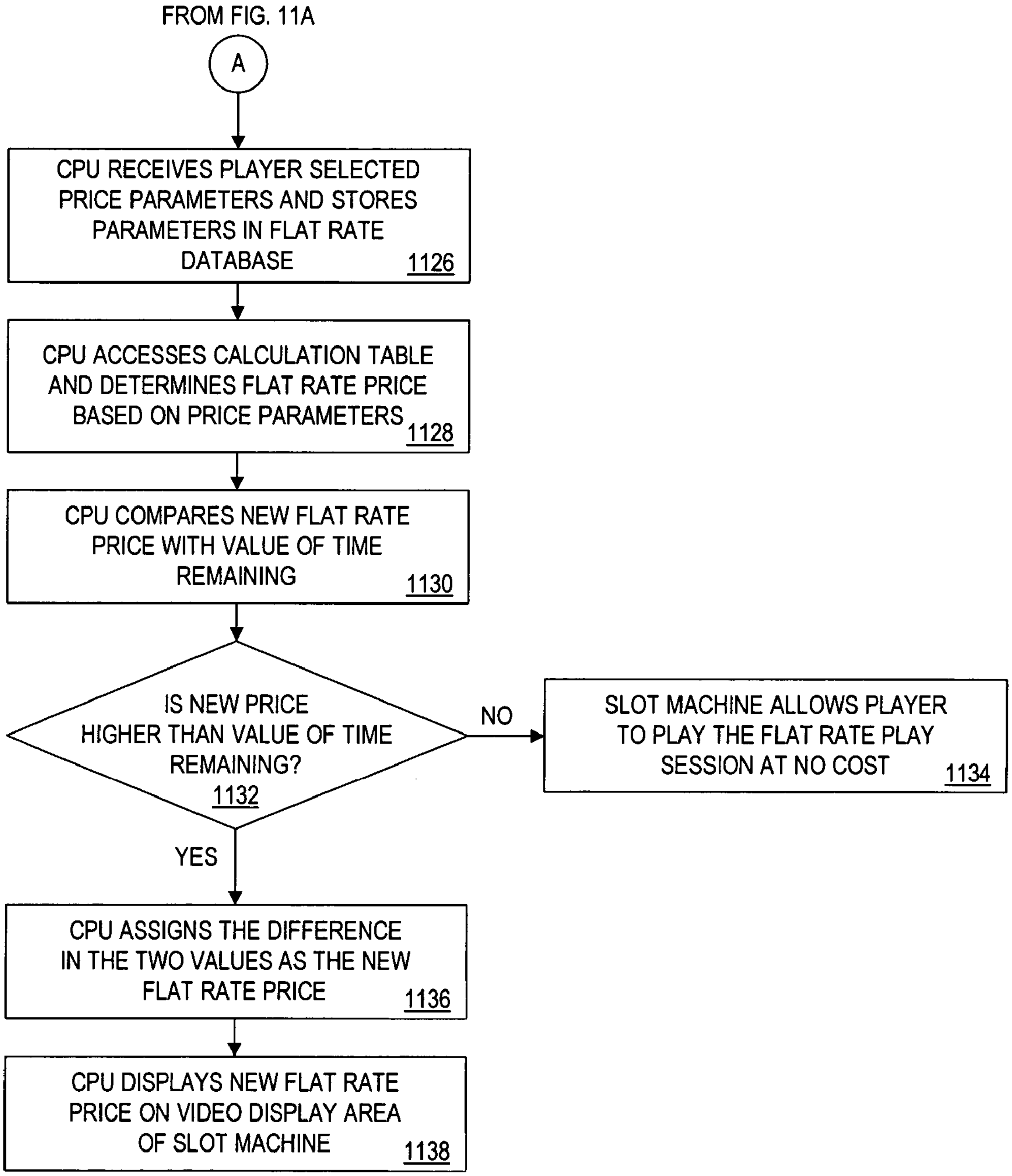

The process of resuming play at another slot machine 102 will now be described with reference to FIGS. 11*a* and 11*b*. The initial operation of the system 100, as indicated by steps 1110-1128, proceeds generally as described above with reference to steps 810-828 of FIGS. 8*a* and 8*b*.

However, once the CPU 210 of slot machine 102 determines a new flat rate price based on the relevant price parameters, the CPU 210 determines whether the player must deposit additional funds.

Specifically, in step 1130, the CPU 210 compares the new flat rate price 724 with the value of interval remaining 430. The server 106 transmits the value of interval remaining 430, as stored in the casino player database 344, to the slot machine 102 in step 1116 so that the comparison may be performed. As indicated by step 1132, the comparison involves determining whether the new flat rate price 724 is higher than the value of interval remaining 430.

If the new price 724 is not higher than the value of interval remaining 430, then, in step 1134, the slot machine allows the player to play the flat rate session at no cost. However, if the new flat rate price 724 is higher than the value of interval remaining 430, then, in step 1136, the CPU 210 assigns the difference in the two values as the new flat rate price. Thus, in step 1138, the CPU 210 displays the new flat rate price on the video display area 238 of the slot machine 102. Thereafter, operation of the system continues as described above with reference to steps 832-836 of FIG. 8*b*.

In an alternate embodiment, when a player terminates the flat rate session early, the value of the interval remaining is added to the player's credit balance, as stored in field 422 of the casino player database 344.

Figure 12A:
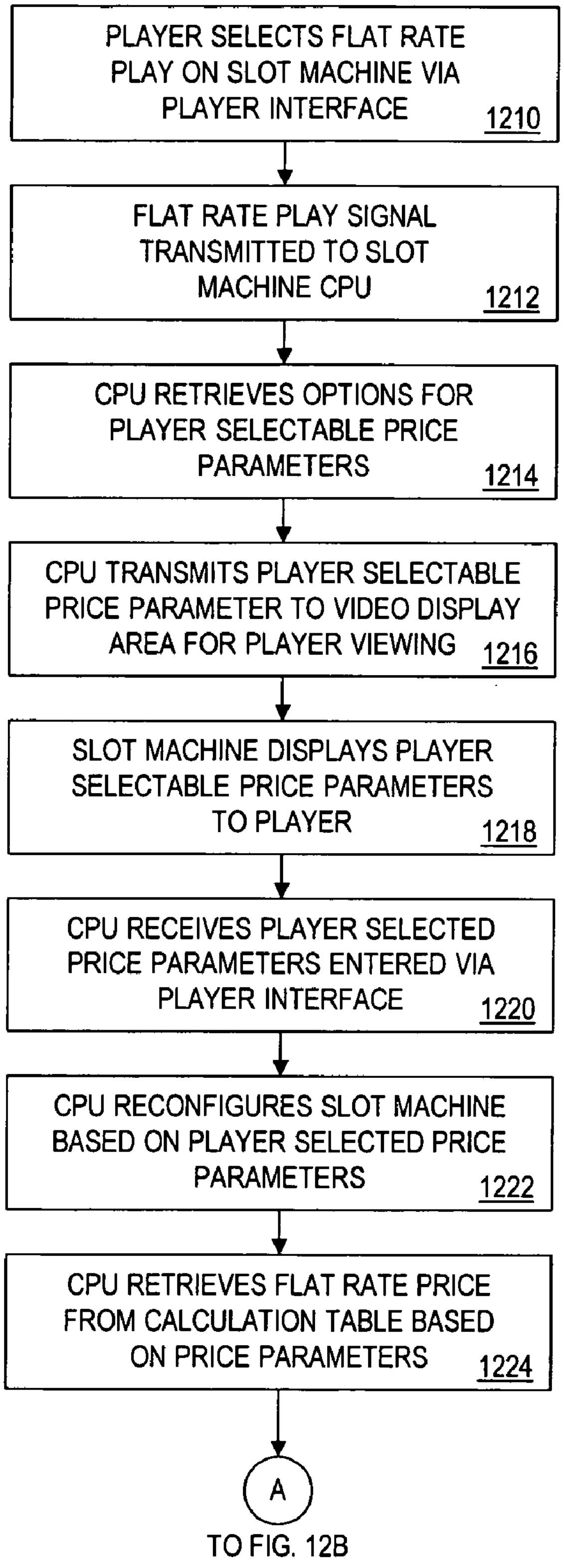
FIGS. 12*a* and 12*b* are overall flow diagrams of the operation of another embodiment of the present invention.
Figure 12B:
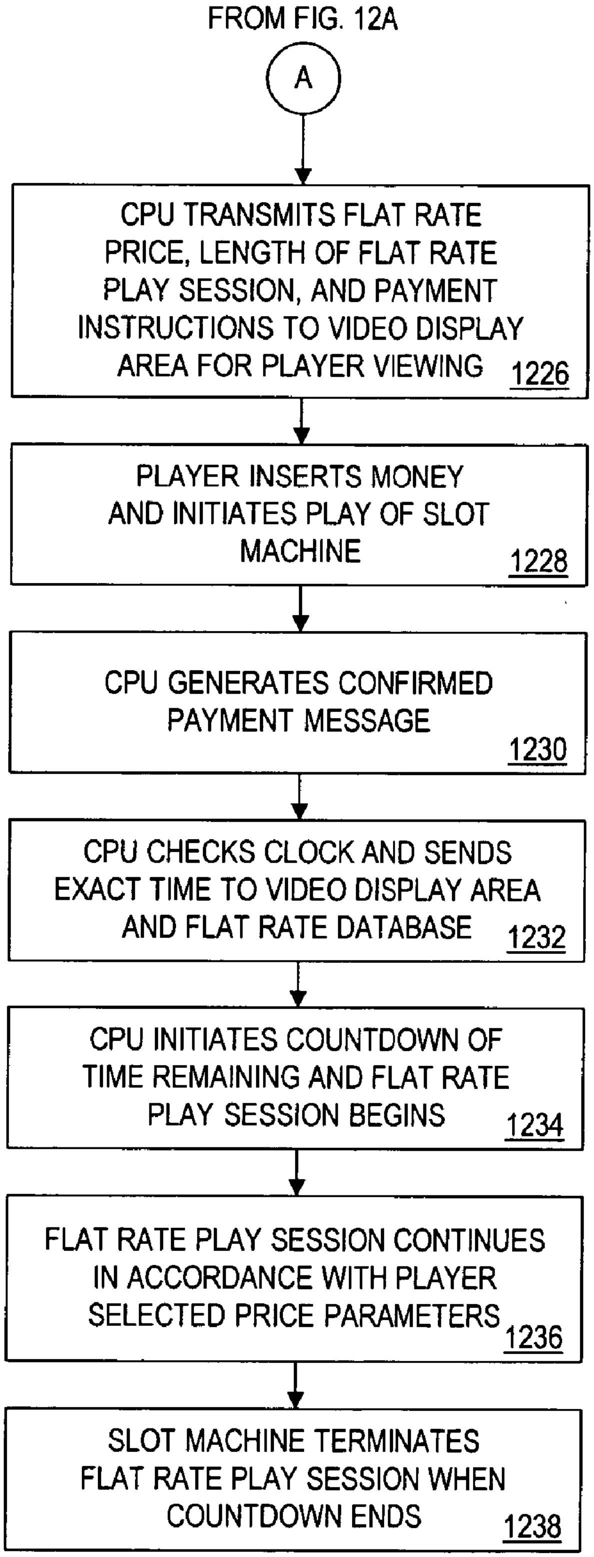

It is to be understood that an embodiment of the present invention need not include both a slot machine and slot network server. For example, an embodiment employing only a slot machine 102 is within the scope of the present invention. Such an embodiment will now be described with reference to FIGS. 12*a*, 12*b*, and 13, and continuing reference to FIGS. 2, 5, and 7. Such an embodiment utilizes the slot machine 102 of FIG. 2.

Initially, the player selects flat rate play on the slot machine 102 in step 1210. Once the player selects flat rate play, the flat rate play signal is transmitted from the player interface 264 to the CPU 210 in step 1212. The CPU 210 then proceeds, in step 1214, to retrieve the player options for selectable price parameters. Then, in step 1216, the CPU 210 transmits the player selectable price parameter options to the video display area 238 for viewing.

Once the player selectable price parameter options have been displayed to the player, the player inputs the player selected price parameters through the player interface 264. Then, in step 1220, the CPU 210 receives the player selected price parameters from the player interface 264.

Once the CPU 210 receives the player selected price parameters, the CPU 210 reconfigures the slot machine 102. Specifically, the CPU 210 generates a signal, or a flag in memory, indicating that there is no need to accept the coins between plays. CPU 210 further sets the pay combination status field 650 in the payout table 228 according to the jackpot structure entered by the player. In an alternate embodiment in which the player selectable price parameters include the time between the handle pulls, the CPU 210 sets an internal timer.

Furthermore, once the slot machine 102 CPU 210 receives the player selected price parameters, it proceeds to access the calculation table 227. By accessing the calculation table 227, the CPU 210 retrieves the flat rate price for the flat rate play session. Retrieving the flat rate price is shown as step 1224. Once the CPU 210 retrieves the flat rate price, it proceeds to transmit the price, the length of the flat rate play session, and payment instructions to the video display area 238 for player viewing in step 1226.

In step 1228, the player reads the data and instructions on the video display area 238 and inserts money into the coin acceptor 248 or a bill acceptor (not shown) in order to initiate play of the slot machine 102. In an alternate embodiment, the player enters a stored value card such as a "smart card" into the card reader 266. Such a smart card has the players credit balance stored thereon. Payment using a smart card further entails the CPU 210 debiting the player's balance on the smart card by the amount of the flat rate price. Further, the player may enter a credit card into the card reader 266.

In step 1230, the CPU 210 generates a confirmed payment message indicating that the player has deposited sufficient funds to cover the flat rate price. Consequently, the CPU 210, in step 1232, sends the current time to both the video display area 238 and the time audit field 518 of flat rate database 246. Next, in step 1234, the CPU 210 initiates the countdown of the interval remaining in the flat rate play session as stored in field 516. The length of the flat rate play session received from the player is initially stored in field 516. The slot machine 102 decrements, or counts down, this value as the flat rate play session begins.

As shown in step 1236, the flat rate play session continues in accordance with the player selected price parameters, if such parameters affect play, in step 1236. During such play, the CPU 210 stores and updates the player's accumulated credits in RAM 218. In an alternate embodiment, the slot machine pays out jackpots as they occur. Finally, in step 1238, the CPU 210 terminates the flat rate play session when the countdown ends.

In an alternate embodiment, the interval of the flat rate play session is not a time period, but rather is a maximum number of plays. In such an embodiment, the slot machine 102 stores the number of plays in the flat rate database 246, as described previously in FIG. 9, and, in step 916, increments a counter for each outcome generated. The counter may be implemented in either software or hardware. Furthermore, in step 918, the slot machine 102 compares the number of plays stored in the flat rate database 246 to the value of the counter. If the value of the counter equals the stored number of plays, then the flat rate play session is terminated.

Figure 13:
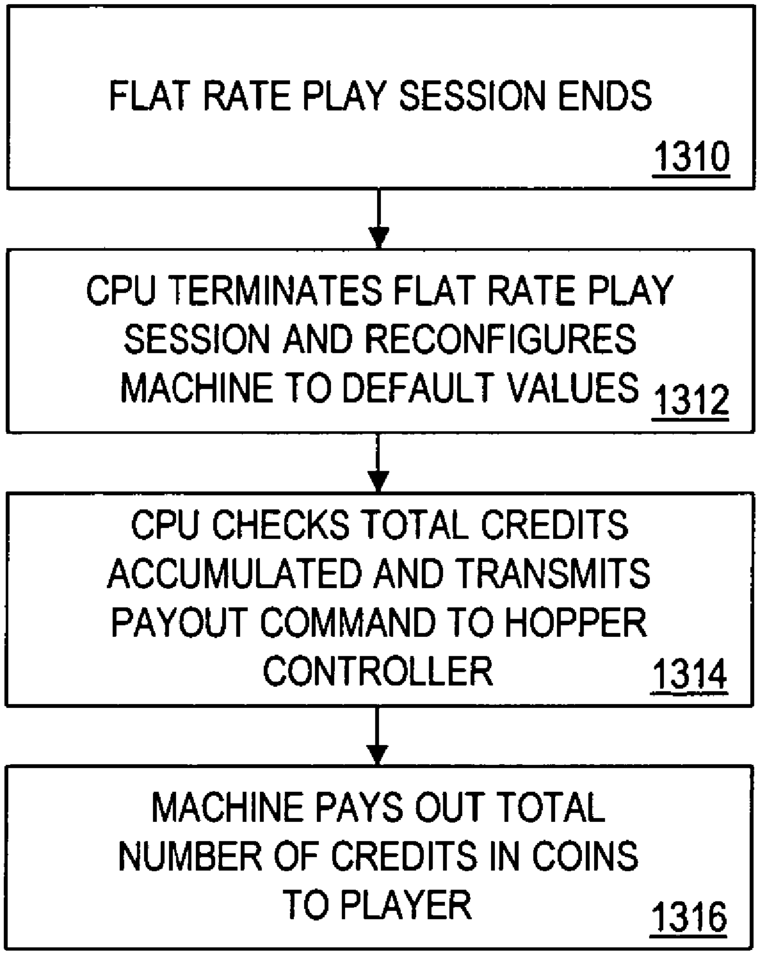
FIG. 13 is a flow diagram of the process of receiving a payout in the embodiment of FIG. 12.

Turning now to FIG. 13, the process of receiving a payout from the present embodiment will be described. As shown as step 1310, the flat rate play session ends upon the termination of the countdown. Specifically, as shown in step 1312, the slot machine 102 CPU 210 terminates the flat rate play session by reconfiguring the slot machine 102 to its default values. For example, the CPU 210 resets the pay combination status field 650 in the payout table 228 to reflect the original jackpot structure. The CPU 210 also generates a signal indicating that coins must be received for each play. In short, the player selected price parameters are no longer in effect.

In step 1314, the CPU 210 checks the total credits accumulated, as stored in the RAM 218, and transmits a payout command to the hopper controller 240. Consequently, in step 1316, the slot machine 102 pays out the total number of credits to the player.

Figure 15:
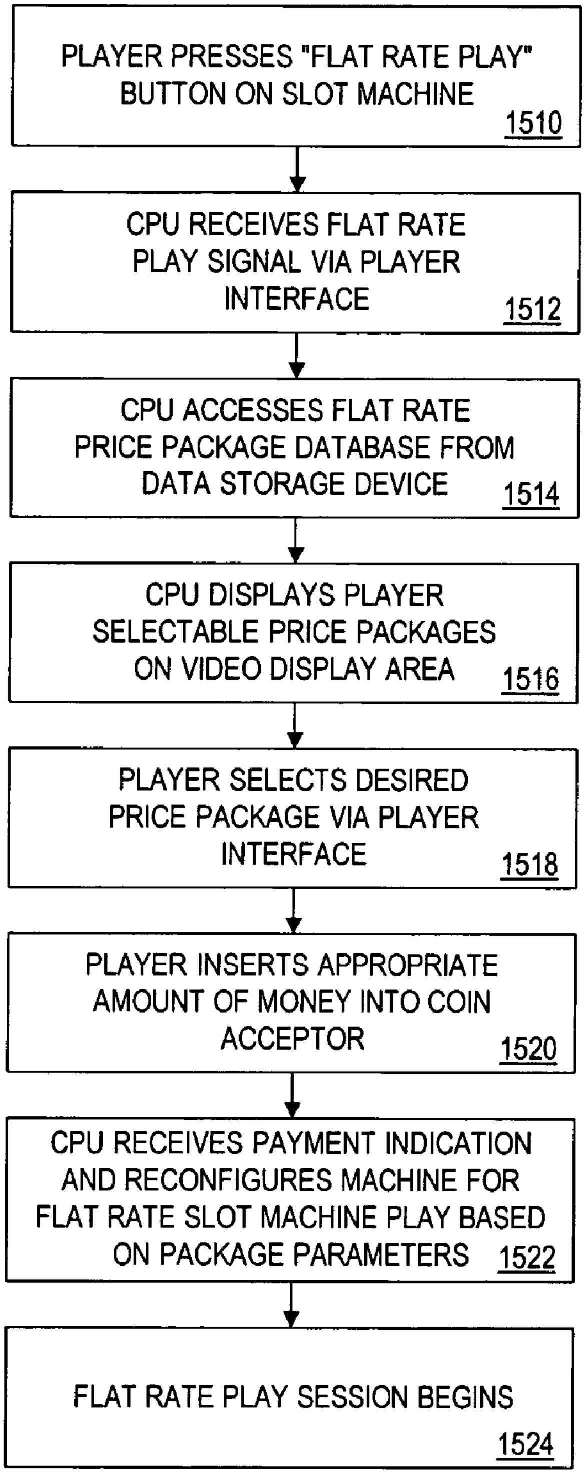
FIG. 15 is an overall flow diagram of the operation of another embodiment of the present invention.

An alternate embodiment of the present invention will now be described with reference to FIG. 15. The operation of slot machine 102, as indicated by steps 1510-1524 below, proceeds generally as described with reference to FIG. 14. In this embodiment, the player selects from a list of casino determined price packages, rather than choosing individual price parameters. Each price package, as stored in the flat rate price package database 229 described above, is a combination of different price parameters which correspond to a flat rate play session price.

In step 1510, the player presses a "flat rate play" button on the slot machine 102. The slot machine 102 CPU 210 receives flat rate play signal from the player interface 264 in step 1512. In this case, the player interface is an actual "flat rate play" button located on the outside of the slot machine 102. Next, in step 1514, the CPU 210 access flat rate price package database 229 from data storage device 224. The CPU 210 then displays the player selectable price packages on video display area 238 in step 1516. It is to be understood that the CPU 210 need not display the packages on the video display area 238, as those package options could be displayed elsewhere on the body of the slot machine 102. Alternatively, player interface 264 could incorporate several "flat rate play" buttons, each representing a different flat rate price package.

Next, in step 1518, the player selects the desired price package via the player interface 264. Having already seen what the price of the selected package is, the player then deposits the appropriate amount of money into coin acceptor 248 in step 1520. For example, the player may have chosen price package four which costs fifty dollars. In return for fifty dollars deposited into the slot machine, the player receives two hundred and fifty handle pulls, with three coins wagered per pull, and with the top three jackpots active in his flat rate play session. These parameters are specified in the flat rate price package database 229.

In step 1522, the CPU 210 receives an indication of payment from the coin acceptor 248 and reconfigures the parameters of slot machine 102 to meet the specifications of the flat rate price package selected by the player. Finally, in step 1524, flat rate play begins.

It is noted that the flat rate price package database 229 could be located at the slot network server 106 and not at each individual slot machine 102. When it is located at the server, certain casino or operator selected parameters could be used to determine the price. For example, there could be different flat rate price packages for different times during the day which are based on projected or actual casino traffic and/or slot machine usage.

As will be appreciated by one of ordinary skill in the art, the key step in getting players to wager money on gaming devices, such as slot machines, is to bring the players to the casino floor. One way in which casinos can bring additional players to the casino floor, and thereby increase total revenues, is by giving away free samples or rewards with a minimum displacement of traditional pay-per-play players. The present invention may be employed for such a purpose.

In one embodiment, for example, the casino could declare a free-play period. During the free-play period, likely chosen by the casino to correspond to down time, when most gaming devices are idle, players insert their player tracking cards into the gaming devices and initiate play without being charged. Specifically, the casino programs the calculation table 227 so that the flat rate price 724 is zero for a given time of day 716 and day of the week 718. It is anticipated that during such a free-play period, the casino will alter the jackpot structure, causing only a selected jackpot to be active. Thus, the lure of free jackpots will bring additional players to the casino floor who will likely continue playing after the free-play period ends. A further benefit of this embodiment is that it would encourage players to become slot club members. This would result in an increase of players who return to the casino and the customer base which the casino markets to through mailings.

It is also to be understood that play of the slot machines during the free-play period need not occur as described above. Thus, in an alternate embodiment, the reels 232, 234, 236 of the slot machines 102 continuously spin, regardless of whether a player has inserted a tracking card, with the server 106 periodically signaling a jackpot on a random machine. Only when a player has inserted a player tracking card is the jackpot awarded. The server 106 randomly selects a machine ID number and, if the machine 102 is not being played by a pay-per-play player, the server 106 transmits a signal to that slot machine 102 directing it to produce a winning outcome.

In an alternate embodiment that achieves substantially the same result of attracting additional players to the floor during down times, the casino issues guests a player tracking card or a smart card having a predetermined free credit balance associated therewith. The casino could then restrict the day and time in which the players could use the free card in a flat rate play session. In another embodiment, the cards provided to guests contain an indication of time, rather than money, for use during a flat rate play session.

Although the foregoing embodiments employ static jackpot structure, which stay the same throughout the flat rate play session, it is within the scope of the present invention to employ dynamic jackpot structures, which change during the flat rate play session. In one such embodiment, the dynamic jackpot structure starts with a given number of active jackpots, as indicated in the pay combination status field 650 of the payout table 228. As the flat rate play session progresses, the number of active jackpots changes. Specifically, as the interval remaining in the flat rate play session decreases, fewer pay combinations are made active. In other words, the slot machine 102 CPU 210 monitors the time and, every fifteen minutes, for example, causes the pay combination status field 650 to change from "active" to "inactive" for a given pay combination 610. Alternatively, the CPU 210 changes the pay combination status field 650 after a predetermined number of plays. In a further variation of this embodiment, individual jackpots may be decreased instead of or in addition to being eliminated (e.g. the jackpot for a particular outcome may decrease from 10 coins to 8 coins as the play session progresses).

As will be appreciated by those skilled in the art, a dynamic jackpot structure based on the time progression of the flat rate play session can increase the revenue generated by the slot machines 102. Specifically, such a dynamic jackpot structure could be used with a flat rate play session whose duration is not a fixed time, but rather a given number of plays. Because fewer jackpots will be active as time progresses, players have an incentive to use their fixed number of plays within a short time period. Stated succinctly, the present invention increases speed of play.

In another embodiment, the jackpot structure is dynamic based not on the progression of the flat rate play session, but rather on the outcomes generated by the slot machine 102. One such embodiment involves changing a particular jackpot from "active" to "inactive" upon a player hitting the outcome corresponding to that pay combination. For example, a player may begin the flat rate play session with all jackpots active. On one play, the slot machine 102 generates a "CHERRY-CHERRY-CHERRY" outcome 610. Upon accessing the payout table 228, the CPU 210 determines that ten coins are to be paid out, credits the player's accumulated credits accordingly, and causes the pay combination status field 650 corresponding to the "CHERRY-CHERRY-CHERRY" outcome 610 to change from "active" to "inactive". Thus, a player can only hit a given jackpot once. As will be appreciated by those skilled in the art, such a dynamic jackpot structure will allow slot machine operators to further discount the flat rate price to attract additional players. Furthermore, it is anticipated that players will be willing to forego hitting the same jackpot multiple times because their focus is typically on hitting the highest jackpot once.

These and other dynamic jackpot structures may be implemented as either a player selected price parameter or an operator selected price parameter. When implemented as a player selected price parameter, the dynamic jackpot structure is displayed to the player as a player selectable price parameter option. The player, in turn, selects it via the player interface 264. When implemented as an operator selected price parameter, the dynamic jackpot structure is displayed for player viewing prior to player approval of the flat rate price. Whether the price parameters are selected by the player or the casino operator, the dynamic jackpot structure affects the flat rate price generally as described above, namely, as a field in the calculation table 227 or as a variable in the price algorithm.

In some embodiments of the present invention, an individual may purchase a flat rate play session as a gift for another person. For example, an individual may purchase one of the available flat rate price packages of FIG. 14. In such an embodiment the individual purchasing a flat rate play session may be provided with a flat rate play session identifier, which the purchase in turn provides to the gift recipient. The flat rate play session identifier may be stored by the casino in association with the price parameters defining the flat rate play session. Thus, when the gift recipient inserts the flat rate play session identifier into a gaming device, the gaming device may communicate with the casino server to determine the parameters of the flat rate play session and set itself to such parameters. A flat rate play session identifier may be provided on, for example, a gift card that is magnetically or optically encoded with the flat rate play session identifier such that it may be read by a gaming device.

Contract Embodiment

In accordance with some embodiments of the present invention a flat rate play session may be purchased by means of a contract. According to such embodiments a player at a casino may purchase a contract (e.g. from an insurer, such as the casino or another entity) or similar agreement to use a gaming device, such as a slot machine. Costing a fixed amount, the contract insures the player against the possibility of potentially large losses at the slot machine. In accordance with one such embodiment, upon purchasing the contract, a player credit account is set up at the slot machine. The account may begin with zero credits but may begin with another balance in other embodiments. The player is then allowed a fixed number of handle pulls at the slot machine without requiring the player to insert any money. Each handle pull decreases the player account, typically by decreasing the player account by a predetermined amount (e.g. one credit) for each handle pull. This may cause the number of credits to be negative, but play may still continue. If the player achieves a winning outcome, credits can be added to the player account in accordance with the payout for the winning outcome. If, after the fixed number of handle pulls, there are a positive number of credits in the player account, then these may be paid out to the player in the form of cash. If, however, there are less than a predetermined amount of credits (e.g. zero credits) in the player account, then the player receives nothing. The insurer, however, could compensate the casino for, e.g., an amount in the player's account that is less than a predetermined number.

In such an embodiment, the player enjoys the fixed number of pulls without the risk of any loss. The only loss for the player comes from the cost of the contract.

One aspect of this invention is a way to price a contract for a block of pulls to be sold to a player. Pricing a contract may involve calculating the expected amount that would have to be paid a player upon the completion of the pulls. The price of the contract would then typically be greater than this expected amount so as to result in an expected profit possibly to be divided amongst the casino and, if it is a separate entity, an insurer. For example, if a player could be expected to receive $30 upon the completion of 1000 pulls, then the contract for the block of 1000 pulls could be sold for $35.

The following terms are related to flat rate gaming sessions and contracts. These definitions may serve as definitions for some, but not necessarily all, embodiments described herein.

Contract indicator—an object or information by which a gaming device may recognize a contract in order to execute the contract. For example, a player purchases a contract at casino desk and receives a token that serves as a contract indicator. When the player deposits the token in a gaming device, the gaming device recognizes the contract the player has signed up for and executes the contract accordingly.

Execute a contract—to carry out the terms of a contract. A gaming device executes a contract for 200 pulls by generating the 200 outcomes, incrementing and decrementing player credits in accordance with the outcomes, and paying the player, if necessary, at the end of the contract.

Gambling contract—An agreement between a player, an insurer, and sometimes a casino (e.g. if different than the insurer) with the following exemplary provisions:

The player pays the insurer a fixed amount up front.

The player is able to make a predetermined number of handle pulls as specified in the contract.

The player need not pay any additional money after purchasing the contract.

The player keeps any net winnings after all handle pulls have been completed.

If the player has a net loss after the handle pulls have been completed, then the loss is paid to the casino by the insurer (or, if the insurer is the casino, the losses are "forgiven" by the casino such that the player need not pay the losses to the casino).

There are many variants of these provisions, and additional provisions are possible. As can be seen, the contract insures a player against excessive losses, and may give the player more handle pulls than would otherwise be possible for the price of the contract. Also, since there may be no additional player decisions required after the player has purchased the contract, the player need not be present for the execution of the contract and may therefore experience the feeling of remote gambling.

Gaming Device—Any electrical, mechanical, or electromechanical device that accepts wagers, steps through a process to determine an outcome, and pays winnings based on the outcome. The outcome may be randomly generated, as with a slot machine; may be generated through a combination of randomness and player skill, as with video poker; or may be generated entirely through player skill. Gaming devices may include slot machines, video poker machines, video blackjack machines, video roulette machines, video keno machines, video bingo machines, and the like.

Gross winnings—the total of a player's winnings during the execution of a contract without regard to wagers made by the player. For example, if, after five pulls of a contract, a player has attained one winning outcome with a payout of 4 coins, and one winning outcome with a payout of 20 coins, then the player's gross winnings thus far are 24 coins. Since gross winnings does not account for wagers a player makes, gross winnings will always be larger than or equal to net winnings.

Handle pull—a single play at a gaming device, including video poker, video blackjack, video roulette, video keno, video bingo, and other devices. The definition is intended to be flexible in that a single play might constitute a single complete game, or a single wager. For example, in video blackjack, a player might play a single game in which he splits a pair of sevens, requiring an additional wager. This one game might thereby constitute either one or two handle pulls.

Net winnings—the total of a player's winnings during the execution of a contract minus the amount spent by the player on wagers. In the example cited under the definition of "gross winnings," the net winnings are 19 coins since the player has won 24 coins but used one coin as a wager on each of the five pulls.

Turning now to a detailed description of the contract embodiments of the present invention, various aspects of such embodiments are set forth below.

Description of the Contract

A typical contract is an agreement between the insurer and a player. The player agrees to pay a fixed amount of money up front. In return, the player may (or must) gamble at a gaming device for a designated amount of time or for a designated number of outcomes. After the player has gambled the requisite amount, the player has the right to keep any winnings that exceed a certain threshold. The player does not, however, pay any losses. Thus, one function of the contract is to insure the player against losses at a gaming device. There are many variations of the contract and a portion of these are described below.

Another function of the contract is to allow a player to play a large number of handle pulls without the need of a large bankroll. For example, a player wishing to make 600 pulls at a quarter slot machine would ordinarily require $150 (25 cents×600) in order to assure himself the ability of completing the 600 pulls. However, a contract might allow a player to make 600 pulls by paying only $20.

In some embodiments, the contract does not involve an insurer. The function of the contract may be to allow outcomes to be generated for the player while the player is not physically present at the gaming device. In these embodiments, the contract may consist mainly of instructions from the player as to how the slot machine should gamble on the player's behalf. For example, the instructions will tell the machine how fast to gamble, when to quit, and then where to send winnings.

Amount of Play

A contract may place one or more of the following exemplary restrictions on play covered by the contract:

- The player must make a minimum number of handle pulls.
- The player may not make more than a maximum number of handle pulls.
- The player must play for a certain minimum time period.
- The player must play for less than a certain maximum time period.
- The player must maintain a minimum rate of play.
- The player may not exceed a maximum rate of play.
- The total coin in over the course of the contract must exceed a certain minimum amount.
- The total coin in over the course of the contract must not exceed a certain amount.
- The player must play until obtaining a specified outcome.

Coin Denomination

A contract may specify the size of the wager for each pull. The wager size may be the same as that typically used by the gaming device. For example, if a player signs up for a contract at a quarter slot machine, the wager for each pull of the contract might be a quarter. If the slot machine offers multiple coin bets, the wager for each pull might be a quarter, 50 cents, 75 cents etc. The contract may allow or may force the player to vary the wager from pull to pull.

One aspect of a contract may allow all play to occur in "credit mode." That is, the player need not physically insert money into the gaming device prior to each pull, and money needn't come out of the gaming device after a player win. Rather, a player's credit balance may be stored in a player database either in the gaming device or at the casino server. Every time the player then makes a handle pull, credits are deducted from the player's balance. Every time the player wins, credits are added to the player's balance. The player's credit balance can be displayed on the device so that the player may track his progress.

Since play may occur in credit mode, each wager might consist of coin denominations that are not standard for the gaming device. For example, a device that typically handles quarters may accept wagers of a nickel, of 40 cents, or even of 12½ cents.

Winnings Threshold

A contract may describe some threshold of gross winnings, net winnings, or accumulated player credits above which the player keeps any excess. Gross winnings describes the accumulated player wins from each pull of the contract. Thus, a player who makes 600 pulls on a $1 slot machine as part of a contract and wins $3 on each of 100 pulls has gross winnings of $300 ($3/pull×100 pulls). Net winnings are the gross winnings less the accumulated costs of wagering. In the above example, the accumulated costs of wagering are $600 ($1/pull×600 pulls). Thus, in the above example, the player's net winnings would be negative $300 ($300-$600). Accumulated player credits may mirror a running tally of a player's net winnings. For example, a player may begin with zero credits, with credits deducted in the amount of any wager, and added in the amount of any winnings. Accumulated player credits may also mirror a running tally of gross winnings, or any other statistic about a player's performance.

At the end of a contract, a player's accumulated credits may be compared to a threshold. The player may then receive a payout of any excess accumulated credits above the threshold. For example, if the threshold is zero, and the player has 44 credits, each credit representing 25 cents, then the player receives a payout of $11 (44 credits×25 cents/credit). If the player had −12 credits, indicating a net loss of 12 credits, then the player receives nothing. The player does not owe $3 because the contract does not make the player responsible for any losses.

The threshold might be at 10 credits, in which case a player with accumulated credits of 30 would receive a payout equivalent to 20 credits at the end of a contract, and a player with 6 credits would receive nothing. A threshold might be at −10 credits, in which case a player with accumulated credits of −6 would receive the equivalent of 4 credits, while a player with −100 credits would receive nothing.

Rather than insuring against all of a player's losses, a contract might insure all losses up to a point and not beyond. Therefore, a contract may have multiple thresholds, each with different functions. A player may, for example, be responsible for any losses beyond a threshold loss of 100 credits. The same player might receive any winnings beyond a threshold of 10 accumulated credits. Thus, if, at the end of the contract, the player has accumulated −125 credits, then the player must pay 25 credits. If the player has accumulated 33 credits, then the player receives a 23 credit payout. If the player has accumulated −49 credits, then the player neither owes nor receives anything.

In some embodiments, a threshold delineates a change in the percentage of a player's winnings or losses between credit tallies above and below the threshold. For example, a player might keep any credits won beyond a threshold of 50. Below 50 credits, the player only keeps 80% of his winnings. Therefore, if a player has 70 credits remaining at the end of a contract, he keeps all 20 credits above 50, and he keeps an additional 40 credits, representing 80% of the first 50 credits. Therefore, the player keeps 60 credits in total.

A player may also be responsible for a percentage of losses above or below a certain threshold. For example, a player may be responsible for 50% of losses over 10 credits. Thus, a player who finishes a contract with minus 20 credits owes nothing for the first 10 credits of loss, but owes 5 credits for the next 10 credits of loss. The player therefore owes 5 credits.

In the most general sense, a contract specifies a functional relationship between what a player's accumulated credits are at the end of the contracted number of pulls, and what the player either owes or is due. The function may be piece-wise linear, or may be rather non-linear and convoluted.

Where there is potential for a player to owe money at the end of a contract, the player may be required to deposit money into the gaming device in advance so as to prevent the player from walking away when he owes money. The advance payment may later be returned if the player turns out to owe nothing at the end of the contract.

In many embodiments, a contract is transparent to the casino. In other words, if the player makes a certain number of pulls, the casino makes the same amount of money whether or not the player happened to be involved in a contract. In these embodiments, however, a casino may collect money that it makes (and the player has lost) from the insurer, rather than from the player. The casino may also act as an intermediary in transactions between the player and the insurer. For example, the casino may collect from the player money that is meant to pay for a contract. The casino may then transfer an equivalent amount of money to the insurer.

In other embodiments, a contract is not completely transparent to the casino. That is, the amount of money a casino receives after a certain number of the player's handle pulls may depend on whether or not the player was in a contract. In one example, a casino agrees that if a player's accumulated credits at the end of a contract are less than −200, then the casino will only collect 200 credits for the contract's handle pulls. This example may benefit the insurer, since the insurer doesn't have to worry about covering player losses in excess of 200 credits. In another example, the casino configures a gaming device to give different odds to a player in contract play versus a player not in contract play.

Player Decisions

As mentioned previously, players may have some restrictions on the play covered by the contract. For example, a contract may cover an hour's play at a gaming device, but require the player to make between 600 and 800 pulls in that hour. In some embodiments, however, contracts may allow players to quit early or to play more than is otherwise covered by the contract. For example, a contract might cover an hour's worth of play. After the first half-hour, the player may be ahead by $100 and wish to quit without risking the loss of the $100 in the subsequent half-hour. He may therefore opt to pay $20 in order to be released from the obligation of continuing the contract. He may then collect his $100 in winnings.

A player at a gaming device may reach the end of a contract with accumulated credits just short of an amount necessary to collect winnings. However, the last 17 out of 20 pulls may have been wins for the player. The player may feel as if he has some momentum going for him and therefore may not wish that the contract be finished. In some embodiments, the player may extend the contract. For example, the gaming device might prompt the player, saying, "For only $5 more, we'll give you another 200 spins added to your contract." If the player accepts, then the casino or insurer has made a new sale with potential profitability. In some embodiments, the player may be allowed to extend a contract for free, or may even be paid to extend the contract. For example, the player may have winnings of $100 at the end of a contract. The casino, or insurer, may figure that if the player were to keep pulling, he would be likely to lose some of that $100. So the casino may pay the player $5 to take another 200 pulls.

In a related embodiment, a player may carry over the accumulated credits from a first contract to a second contract. Thus, a player with 40 accumulated credits at the end of a first contract may begin a second contract with 40 accumulated credits. The player may pay or be paid for carrying over credits.

Price

In many embodiments, the player pays a fixed sum to buy the contract. In exchange for that fixed sum, the player can then gamble a significant amount with little or no risk of losses. In many embodiments, the insurer takes the risk of the player's loss. The insurer must therefore price the contract so as to be compensated for the risk it takes. In other embodiments, the casino and the insurer share the profits and losses associated with a contract. To ensure a profit to be divided amongst the two, a contract may be priced in excess of a player's average win. Note that a player's loss would count as zero in figuring out the player's average win, since the player does not have to pay for losses.

One method of pricing the contract involves first figuring out what the insurer might expect to pay, on average, to cover a player's losses. Another method of pricing a contract involves first figuring out what the casino/insurer combination might expect to pay, on average, to compensate a player for his winnings. Both methods involve similar computations. Therefore, computations will be described below with respect to only one or the other method of pricing a contract.

Exemplary Price Computations

The insurer obtains the gaming device or a component of the gaming device containing significant information about the operation of the gaming device (e.g. the CPU). The insurer then operates the gaming device as a player would when under contract. For example, if the insurer is to sell contracts for 600 pulls, the insurer would make 600 handle pulls at the gaming device and record the number of accumulated credits at the end of the 600 pulls. The insurer may repeat this process of testing contracts at the device for a large number of trials. The insurer may then average what its payments would be over all the trials. Note that while it might take a player days or years to complete, say, 100,000 contracts at a gaming device; the process may be sped up for the insurer by giving the gaming device special instructions to generate outcomes more rapidly. The performance of large number of trials in the manner described above is often called a Monte-Carlo simulation.

The following is an example of pricing a contract. Using the method of pricing described above, an insurer simulates the execution of a 600-pull contract. The insurer repeats the simulation four more times. After the first simulation, the player has won $10. After the second, the player has lost $5. After the third, the player has lost $17. After the fourth, the player has lost $8. After the fifth, the player has won $3. To figure out what the insurer must pay, on average, the insurer adds the three losses to get: $5+$17+$8=$30. The insurer then divides by five, the number of simulations, to get: $30/5=$6. The insurer doesn't care, for the purposes of this calculation, how much the player won when he did win, since the casino is the one paying the player his winnings. Now, in order to obtain an average $4 profit, the insurer might charge $10 for each contract.

The insurer obtains or creates software that mirrors or models the operation of the gaming device. For example, the software is configured to generate the same outcomes as does the gaming device with the same frequency as the gaming device. For each outcome generated, the software tracks what a player's accumulated credits would be. As before, the insurer may simulate many contracts and average what its payments would be over all the trials.

The insurer mathematically models potential outcomes of one handle pull of the gaming device using a random variable with a probability mass function (PMF) or probability density function (PDF). With these functions, the x-axis may represent potential winnings, such as −$1 or $3, which can occur from a single handle pull. The example of −$1 indicates the player has paid $1 for the pull but has won nothing. The example of $3 indicates that the player has paid $1 for the pull and won $4. The y-axis of these functions represents the probability or probability density of each outcome occurring. The probability of the player getting −$1 on a pull might be 0.8, while the probability of the player getting $3 might be 0.2. A PMF for the number of accumulated credits at the end of a contract can then be created by summing the random variables representing individual handle pulls. If each pull is independent with an identical PMF, as is common with slot machines, then the PMF for the results of the entire contract can be created using repeated convolutions of the PMF's for individual handle pulls. If, for example, 600 pulls are involved, then the PMF for single a handle pull may be convolved with itself 599 times to generate a PMF for the entire contract. Using this resultant PMF, the insurer can easily calculate how much it would expect to pay to cover a player's losses on each contract. If the resultant random variable is denoted by w, and the insurer would by required to pay for any player losses, then the insurer's expected payment is given by $\Sigma_{-\infty}^{0} w * \text{probability}(w)$.

In the method described above, Fourier Transforms, Z transforms, Laplace Transforms, or other transforms can be used to aid in the calculation of the repeated convolutions. Such a use of transforms is well known in the art.

As is well known in the art, with many classes of random variables, repeated summation results in a Gaussian probability distribution. This distribution has the shape of the familiar bell curve. The Gaussian distribution has the advantage of being fully described by only two parameters, a mean and a standard deviation. If a Gaussian probability distribution is used to approximate the sum of a large number of independent, identically distributed random variables, such as those that often describe handle pulls, then the mean and standard deviation of the Gaussian distribution is very easily calculated based on the mean and standard deviation of a random variable describing an individual pull. Such calculations are well known in the art. Thus, a Gaussian distribution can easily be generated to approximate the PMF of a player's accumulated credits at the end of a contract. Using this distribution, the insurer can calculate the amount it would be required to pay, on average, to cover a player's losses. The method of calculation is similar to that described in 3). If a Gaussian PDF is used as an approximation, then an integral sign replaces the summation sign, and "probability" is replaced by "probability density."

The following is an example of using a Gaussian probability density function to approximate the amount a casino would be required to pay, on average, to compensate a player for his winnings at the end of a contract. The contract may then be priced in excess of this amount to ensure an average profit for the casino/insurer combination. A Gaussian function is given by the formula, $f(x)=1/\sqrt{(2\pi\sigma)}\exp(-(x-\mu)^2/(2\sigma^2))$. In this formula, $\sigma$ is the standard deviation, and $\mu$ is the mean. Now, let us suppose that a single handle pull of a slot machine results in a required payout to the player described by a probability mass function with mean $\mu_0$ and standard deviation $\sigma_0$. Then, assuming each handle pull is independent, n handle pulls of the slot machine may be described by a function with mean $\mu=\mu_0 n$ and standard deviation $\sigma=\sigma_0\sqrt{n}$. Furthermore, if n is large, then the function describing a casino's aggregate payout after n handle pulls may be approximated by the Gaussian function f(x), whose formula is given above.

To calculate what a casino would have to pay to compensate a player for his winnings, on average, we note that the casino pays when the player wins, but receives nothing when a player loses. Therefore, the expected payment of the casino is given by:

$$\int_{-\infty}^{0} 0 * f(x)dx + \int_0^{\infty} x * f(x)dx = \int_0^{\infty} x * f(x)dx.$$

We proceed to solve the integral:

$$\begin{aligned}
\int_0^{\infty} x^* f(x)dx &= \int_0^{\infty} x^* 1/\sqrt{(2\pi\sigma)}\exp(-(x-\mu)^2/(2\sigma^2))dx \\
&= 1/\sqrt{(2\pi\sigma)}\int_0^{\infty} x^* \exp(-(x-\mu)^2/(2\sigma^2))dx \\
&= 1/\sqrt{(2\pi\sigma)}\int_0^{\infty} [(x-\mu)^* \exp(-(x-\mu)^2/(2\sigma^2)) + \\
&\quad \mu^* \exp(-(x-\mu)^2/(2\sigma^2))]dx \\
&= 2\sigma^2/\sqrt{(2\pi\sigma)}^*(-1/2)^* \\
&\quad [\exp(-(x-\mu)^2/(2\sigma^2))]_0^{\infty} +
\end{aligned}$$

-continued $$\mu\int_0^{\infty} 1/\sqrt{(2\pi\sigma)}\exp(-(x-\mu)^2/(2\sigma^2))dx$$

We deal with the two terms separately:

$$\begin{aligned}
2\sigma^2/\sqrt{(2\pi\sigma)}^*(-1/2)^* [\exp(-(x-\mu)^2/(2\sigma^2))]_0^{\infty} &= -\sigma^2/\sqrt{(2\pi\sigma)}^*[0-(-\mu^2/(2\sigma^2))] \\
&= \sigma^2\exp(-\mu^2/(2\sigma^2))\sqrt{(2\pi\sigma)} \\
&= n\sigma_0^2\exp(-n^2\mu_0^2/(2n\sigma_0^2))/\sqrt{\left(2\pi\sqrt{n}\sigma_0\right)} \\
&= n^{3/4}\sigma_0^{3/2}\exp(-n\mu_0^2/(2\sigma_0^2))/\sqrt{(2\pi)}
\end{aligned}$$

and $$\mu\int_0^{\infty} 1/\sqrt{(2\pi\sigma)}\exp(-(x-\mu)^2/(2\sigma^2))\,dx = \mu\int_{-\mu/\sigma}^{\infty} 1/\sqrt{(2\pi\sigma)}\exp(-y^2/2)\sigma dy$$

(where $y=(x-\mu)/\sigma$)

$$\begin{aligned}
&= \mu\sqrt{\sigma}\int_{-\mu/\sigma}^{\infty} 1/\sqrt{(2\pi)}\exp(-y^2/2)dy \\
&= \mu\sqrt{\sigma}\left[1-\int_{-\infty}^{-\mu/\sigma} 1/\sqrt{(2\pi)}\exp(-y^2/2)dy\right]
\end{aligned}$$

The integral is the cumulative distribution function for a zero mean, unit standard deviation Gaussian, for which tables exist. We denote it by $N(-\mu/\sigma)$. Continuing:

$$\begin{aligned}
\mu\int_0^{\infty} 1/\sqrt{(2\pi\sigma)} \exp(-(x-\mu)^2/(2\sigma^2))\,dx &= \mu\sqrt{\sigma}[1-N(-\mu/\sigma)] \\
&= n\mu_0 n^{1/4}\sqrt{\sigma_0}\left[1-N\left(-n\mu_0/(\sqrt{n}\sigma_0)\right)\right] \\
&= n^{5/4}\mu_0\sqrt{\sigma_0}\left[1-N\left(-\sqrt{n}\mu_0/\sigma_0\right)\right]
\end{aligned}$$

Recombining the two terms we get:

$$\int_0^{\infty} x * f(x)dx = n^{3/4}\sigma_0^{3/2}\exp(-n\mu_0^2/(2\sigma_0^2))/\sqrt{(2\pi)} + n^{5/4}\mu_0\sqrt{\sigma_0}[1-N(-\sqrt{n}\mu_0/\sigma_0)]$$

Automatic Play

A contract may require certain behaviors of the player. As mentioned, these behaviors may include maintaining a certain rate of play, or performing a minimum number of handle pulls. The gaming device on which a contract is executed may take various steps to ensure that the behaviors are performed. To this end, the gaming device may initiate handle pulls automatically or may fail to register handle pulls that the player attempts to initiate. For example, if the player must make at least one handle pull every 10 seconds, and the player has failed to make any handle pulls in 9 seconds, then the gaming device may automatically initiate a handle pull for the player on the tenth second. As another example, a player may be restricted from making more than one pull every 10 seconds. If in the same 10-second interval, the player attempts to make more than one handle pull, the second handle pull may not be initiated, at least until the next 10-second interval.

As can be seen from the above two examples, the player may maintain some control over his gambling behavior even while the gaming device forces him to comply with the contract. So a player who must make a pull every 10 seconds still has control over whether the pull occurs on the first second of an interval or the eighth second of an interval. Such control can be psychologically important, because many players feel that the exact moment at which the handle pull is initiated has an important effect on the ultimate outcome.

In some cases, a player may not desire to make any active decisions once a contract has been initiated and may simply put a gaming device into "automatic play." The player may later have the option of taking the gaming device out of automatic play and of manually initiating handle pulls.

Offering the Contract

A contract may be offered to a player in a number of ways. A gaming device may use text or synthesized voice to ask a person whether or not he would like to sign up for a contract. A casino attendant may offer a contract to a player, or signs at a casino may point a player towards a casino desk where he may then purchase a contract.

A number of circumstances may trigger the casino or an insurer to offer a contract to the player. For example, the player may have lost most of an initial stake deposited into a gaming device. A player may be slowing his play, or may no longer be inserting coins into the machine. The time of day may be a player's typical lunch time or departure time. A player may have the opportunity to enter into a contract only if he also agrees to do business with a particular merchant or group of merchants. The player may have the opportunity to enter into a contract if the casino or insurer deems him a good, valuable, or loyal customer.

Agreeing to the Contract

A player may specify a desired contract in a number of ways. At a gaming device, a player may use a touch screen to indicate his desire to enter into a specific contract. Using the touch screen, the player may select from a menu of possible contracts. For example, the menu might list several contracts with different time durations or different prices. In one embodiment, a contract made available may define benefits to be provided to the player or made available to the player upon purchase of the contract. For example, a first contract may be associated with a first number of comp points and/or a first rate of earning comp points while a second contract may be associated with a second number of comp points and/or a second rate of earning comp points. For example, if the player purchases the first contract, the first number of comp points may be added to an account of comp points associated with the player. In another example, if the player purchases the first contract, the player may earn comp points at the first rate during execution of plays under the terms of the contract. The first rate of play may comprise, for example, a rate that is greater than a rate at which the player would earn comp points for game play executed not under the terms of the contract. In one embodiment, the player may be enabled to select a contract by touching an area of the screen that is associated with his desired contract.

The player might use menus to customize a contract for himself. The player might use a first menu to select a duration of the contract (e.g. 600 pulls, or ½ hour). A second menu might be used to select a rate of play. A third menu might be used for coin denomination. Many other menus are possible for other contract features. Once the player has selected several contract features, the gaming device may select the remaining feature so as to make the contract profitable for the insurer. For example, once the player has chosen a number of pulls and a coin denomination, the gaming device might choose the price of the contract.

Rather than a touch screen, a player may use special buttons, keys, or voice input to specify a desired contract or contract terms.

In some embodiments, a player chooses a contract prior to approaching the gaming device or even the casino. A player might select a contract on the Internet. On the Internet, the player might specify terms of the contract, such as the number of pulls, the rate of play, the cost, the payout tables, the winning symbol combinations, etc. The player may then print out a code or a document describing or otherwise identifying the terms of the contract. The player then brings the code or document to a gaming device that then recognizes what contract the player has chosen. When the player signs up for a contract, a description of the contract might be sent electronically directly to the gaming device. The player might then only identify himself at the gaming device in order to initiate contract play.

Other terms of a contract a player may agree to or specify include: the font size of the machine, the noise level of the machine's sound effects, the particular game (e.g. number of reels, number of pay lines), the brightness of the display, etc.

Signature

To confirm entry into a contract, a player might sign a document that may contain the terms of the contract. The document may be printed from a gaming device or from the Internet, or may be obtained from a counter at a casino. The signed document may then be deposited into an opening in the gaming device, may be returned to a casino counter, or may be kept by the player. The player might also sign an area on a touch screen or other sensing device.

A player might also confirm entry into a contract simply by paying for it. The player might pay be depositing tokens, coins or other currency into the gaming device. The player might pay using a credit or debit card. The player might also pay from a player credit account established with the casino. The player might pay at a counter of the casino and might receive a contract or a contract indicator to bring to a gaming device. The gaming device might then recognize the contract indicator by, for example, a bar code, and then execute the contract.

Instruction Sets

A typical contract may cover and/or require a large number of handle pulls by the player. Now ordinarily, when a player is gambling at a gaming device for a long period of time, the player makes a number of decisions related to his gambling. Should the player play more quickly or more slowly? Should the player double his bet after a loss? Should the player quit after a sizable win? Should the player take a short break to use the restroom?

Since the contract covers a large number of pulls, it is possible for the some player decisions to be made beforehand and included in the contract. A gaming device may then act on the decisions specified in the contract without further input from the player. For example, while negotiating a contract for an hour of play at 10 pulls per minute, a player might decide he'd like a 15 minute break between the first ½ hour and the second ½ hour of pulls. The gaming device might then execute the contract for the first half hour by automatically spinning and generating outcomes for the first ½ hour. The gaming device might then freeze for 15 minutes, preventing other players from stepping in and allowing the contract holding player to take his 15 minute break. The device can then unlock after 15 minutes, perhaps with the entry of a password, and resume the generation of outcomes.

One important aspect of having a player's decisions spelled out before hand in the contract is that the player need not even be present at the gaming device. A player can sign up for a contract at a casino in Las Vegas, and then have the contract executed automatically by a gaming device. The player can then view a running tally of his accumulated credits over the Internet while in Virginia, for example.

In general, player instructions built into a contract will include some action to be performed as well as some triggering condition for the action. As an example, a player instruction may be to increase the rate of handle pulls provided accumulated player credits exceed 100. In this example, the action is to increase the rate of handle pulls, and the triggering condition is whether accumulated player credits exceed 100. The following player actions may, in some embodiments, be part of a player's instructions:

Increase or decrease a wager amount on one or more handle pulls.

Increase or decrease a rate of wagering.

Cease gambling.

Change the way outcomes are displayed.

The following conditions, in some embodiments, may trigger the above actions

The player has just won or lost on one or more handle pulls.

The player has just won a certain amount on one or more handle pulls.

Any player defined sequence of wins and losses has occurred on prior handle pulls.

The player has approached or left the vicinity of the gaming device.

The current time has reached a particular time of day.

One advantage of contracts executed by the gaming device is that a gaming device can gamble at speeds a human is incapable of achieving. For example a player is on a winning streak, but must soon join his family for lunch. Rather than cash out and leave, he decides to accelerate his play to 2 pulls per second. He therefore enters a into a contract which is to be executed by the machine at 2 pulls per second for the next 8 minutes. In this contract, an insurer is not involved. The contract simply serves as a means of increasing the rate of play. As it happens, the player loses all his money in 6 minutes, and so the contract ends.

Player instructions may tell the slot machine to play faster when the player is present or is observing in some way, and to play more slowly while the player is asleep. For example, the rate of pulls may be twice as fast during the day as at night. The rate of play may likewise be faster when an infrared detector in the slot machine senses the heat of the player's presence.

Player instructions may also tell a gaming device how to play certain games involving player decisions. For example, a player may leave instructions to use basic strategy in a game of video blackjack, or to play according to published theory in a game of video poker. The player may add instructions to always draw to a four card open-ended straight flush.

Times of Execution

A contract may be executed over a range of different time periods. The outcomes, the accumulated player credits, and the player winnings may or may not be displayed to the player at the same time at which the outcomes are being generated.

In one embodiment, all the outcomes needed for a contract are generated very rapidly by a gaming device, perhaps all in less than a second. The outcomes may then be displayed to the player over a much longer time frame so as to give the player a more exciting gaming experience.

In another embodiment, outcomes may be continuously generated at a rate comparable to that with which a player might make handle pulls on his own. This embodiment might be entertaining for a player if the player is sitting at the gaming device or watching the outcomes being generated from a home computer.

In another embodiment, outcomes are generated on a periodic basis at fixed times every day, week, hour, etc. For example, outcomes for a 600-pull contract may be generated 100 outcomes at a time, each block being generated from 8 pm-9 pm on Sunday. Thus, it would take just under six weeks for the entire contract to be executed. This method of execution may be ideal if a player has a schedule as to when he enjoys watching outcomes being generated. For example, the player might enjoy seeing outcomes generated while he watches his favorite show on Sundays from 8 pm to 9 pm. This method of execution might also be ideal for the casino if slow business periods occur on a periodic basis where the entire contract cannot be executed in a single period.

In still another embodiment, outcomes are generated on a flexible basis, either when it is convenient for the casino or for the player. In this embodiment, the casino may wait for a gaming device to be free of use before using it to generate the next couple of outcomes of a contract. Alternatively, the player may signal the gaming device any time he is ready to have the next few outcomes generated Viewing the Contract's Execution As discussed, a player may enjoy watching from a remote location as the outcomes of his contracts are generated. Since the player is not physically at the slot machine, the outcomes must be presented to the player via some graphical representation. In one embodiment, a camera simply films the gaming device generating the player's outcomes. The image from the camera is transmitted to the player device via the Internet, the cable system, satellite, etc. The player device might be, for example, a TV or a personal computer. In another embodiment, the generated outcomes are recorded either by the gaming device, by a camera watching the device, or by a casino employee. The generation of the outcomes is then graphically recreated for the player in a manner not necessarily consistent with the physical appearance of the gaming device that generated the outcomes. For example, a gaming device generates the outcome: cherry-orange-lemon. The gaming device then transmits, via the casino server and the Internet, a bit sequence indicating the outcomes cherry-orange-lemon. Perhaps the bits "0000" represent cherry, "0011" represent orange, and "1111" represent lemon. The bit sequence is transmitted to a player's home computer, where a software program displays a cartoon representation of a slot machine. The cartoon shows the reels spinning and stopping with the outcome: cherry-orange-lemon. The cartoon representation of the slot machine may not look anything like the slot machine that originally generated the outcomes. In some embodiments, a player views a combination of the actual image of his gaming device, and a computer-rendered version of a gaming device. For example, a cartoon of the reels spinning might be displayed within the frame of an actual image of the slot machine, without the reels.

In some embodiments, the player does not view a graphical representation of the outcomes, but sees the outcomes as text, such as "seven-bar-bar," "s-b-b," "7-b-b," etc. The player may not even see the outcomes, just how much he has won or lost on every pull. Thus, the player may view a periodically updated tally of his accumulated credits. He may only view his total accumulated credits, or his take home winnings, after all outcomes have been generated.

Any graphical or textual representation of the player's outcomes, accumulated credits, or other contract information may be displayed either on an entire portion of a computer or TV screen, or on a smaller portion of the screen. For example, a small cartoon slot machine may reside in a box in the upper right hand corner of a TV screen that simultaneously displays a regular TV show. A player watching television need then only glance up at the corner of his screen to follow the progress of his contract. Representation of outcomes may also be place in an email message to the player.

Of course, the various representations of outcomes may be used just as well with a player physically present at the gaming device or at the casino.

In some embodiments, the player calls up a number to monitor the progress of his contract. He may enter a code or password when prompted by a voice response unit (VRU) and thereby access the outcomes from his particular contract.

A player may be sent updates on his contract only when certain triggering conditions are met. For example, a player may only wish for updates when he wins more than 100 credits on a spin, or when the contract terminates.

Revenue Management

As discussed previously, the pricing of a contract will often take into account the expected amount an insurer must pay to a casino to cover a player's losses, or the expected amount that a casino and insurer in combination can expect to pay to compensate the player for his winnings. Pricing of contracts may account for additional factors such as, for example:

Times or dates on which the contract is to be executed.

The gaming device on which the contract is to be executed

Flexibility in the contract's execution.

A player's playing history.

The importance of the player as a customer of the casino.

For example, a contract which is to be executed during a period of low customer activity at a casino may be priced at a discount. This is because a casino would like to encourage the use of gaming devices that are otherwise empty. Alternatively, a casino may want to discourage the purchase of contracts during times of high customer traffic, and so contracts may be higher priced at such times.

If a contract has flexibility as to when it may be executed, then this allows the casino to execute contracts only during times when gaming devices would not otherwise be in use. Therefore, such a contract might be priced more favorably.

A contract that is executed at an unpopular gaming device, for example, might be priced more favorably for the player so as to encourage the use of that device.

If a player shows signs of nearing the end of his gambling session, a contract might be priced at a discount for that player. For example, a player might be slowing his rate of play, indicating boredom. A player might be lowering his wager size, indicating a decreasing bankroll. A player might simply have been at a gaming device for such a long time that he would almost necessarily be hungry enough to leave at any moment. Providing a discount on a contract to such players would encourage them to remain gambling for at least the time it takes to execute the contract.

Settlement

In some embodiments, the casino acts as the intermediary in transactions between a player and the insurer. The casino is an intermediary, for example, when its gaming devices collect a player's payment for a contract, even though that payment is meant to go to the insurer. The casino is also an intermediary when it does not collect losses from a player, but from an insurer.

Since the casino may engage in many transactions with the insurer, it would potentially be inefficient for the casino to transfer money to the insurer, or vice versa, after every transaction. Therefore, the casino or the insurer may maintain records of how much one owes the other. The casino and the insurer may then settle their accounts periodically. If the casino owes the insurer money, then the casino may wire money to the insurer. If the insurer owes the casino, then the insurer may wire money. Of course, many other methods of settlement are possible.

In cases where a contract has resulted in a net win for the player, the player must be paid. If the player is at the casino, he may enter into a gaming device a password or other identifier of himself or of his contract. The gaming device may then access a database in the casino server containing the details of the contract, including the amount owed to the player. The gaming device may then payout the amount owed in the form of cash, tokens, paper receipts or vouchers, digital cash, digital receipts, etc. The player may also collect his winnings at a casino desk, perhaps after presenting identification.

If a player is remote from a casino when his contract has finished executing, then the player may be sent his winnings either by the insurer or the casino. If the insurer provides the winnings, then the casino may later reimburse the insurer in the amount of the winnings. The winnings may be sent in the form of cash, check, money order, etc. The winnings may be sent by postal mail, by wire transfer, by direct deposit, by email as digital cash, etc.

In some embodiments, the casino may simply keep the player's winnings in a player account at a casino, to be accessed by the player next time he visits the casino. The winnings may, in the meantime, accumulate interest. The casino (or insurer) may also alert the player that his contract has finished executing and that he has winnings. The player may be instructed to come to the casino and pick them up.

In some embodiments, the player may have left instructions to take any winnings from a first contract and purchase a second contract. This allows for the notion of a meta-contract. Just as a contract may specify how to allocate money for pulls, a meta-contract would describe how to allocate money for contracts. There could then be meta-meta-contracts, and so on.

Numerous variations on the above-described contract embodiments of the present invention may be practiced without departing from the spirit and scope of the present invention. For example, a player may be halfway through a contract and have negative 200 accumulated credits. The player might therefore lose all hope of winning enough to overcome the 200-credit deficit, and so lose interest in the contract. Therefore, in one embodiment, a player who is well below a threshold number of accumulated credits for winning may play for an altered pay table. Low paying outcomes may be eliminated, while the likelihood of achieving high paying outcomes may increase. This is because a player with a 200-credit deficit probably doesn't care about a win of ten credits, but does care about a win of 500 credits. The overall hold percentage of the machine may remain constant. In some embodiments, the alteration of the pay tables is an automatic function of the number of pulls remaining and the credit deficit of the player. In other embodiments, the player must request an alteration of the pay tables. As an example, a player may select an option that says, "Let me play just for the jackpot. Eliminate everything else and make the jackpot more likely." The player may or may not have to pay for an alteration of the pay tables. In a more general sense, the pay tables may change such that the standard deviation of the payout for a particular handle pull changes even as hold percentage may remain constant.

In another embodiment, a player might purchase a contract at a casino desk and receive a token that indicates the type of contract. The player might then deposit the token into a gaming device. The gaming device would then recognize the token and be able to execute the contract.

A player may have the privilege of entering into favorable contracts after a fixed amount of initial betting. For example, if the player wagers for an hour, he may be able to enter into a contract where each pull is at true odds. That is each pull pays back, on average, the same amount that was put in. Typically the pull pays back less. In yet another embodiment, a player may receive better odds on contract play when he is recommended to the casino by a friend.

In some embodiments, certain results of a pull may terminate a contract early. For example, if a player hits the jackpot, the contract may terminate. In other embodiments a player's accumulated credits can be displayed to a player as a function of time in the form of a graph. The graph may look much like graphs used to plot the price of a stock market index as a function of time. In some embodiments, a player wins money or some other prize if the graph takes on a certain shape. For example, if the line of the graph is such that it slips between several sets of markers (much like a skier on a slalom course), then the player may win a large prize.

In some embodiments, a player's winnings on each pull of the contract are reinvested into the contract, whereas in other embodiments they are not. In one example, a player purchases a contract for $100. The player instructs the gaming device to gamble the $100 until it is all gone. However, any winnings are not to be used to gamble, they are to be sent directly to the player. In a second example, the player purchases a contract for $100 and instructs the gaming device to gamble the $100 until it is gone or until it has become $200. Here, the player elects to reinvest winnings, using the winnings to pay for new handle pulls even after $100 worth of handle pulls has been made already.

A contract may reward a player based on any second order data, or meta-data about one or more outcomes. Examples include rewarding the player if three like outcomes occur in a row, if 20 cherries come up in 10 sequential spins, if the players accumulated credits ever reach 100, etc. An example previously mentioned is rewarding a player based on the pattern of a graph of accumulated winnings as a function of time. A player might choose the "meta-outcomes" on which he desires to be rewarded, and the gaming device may figure the corresponding odds and the size of the reward should the meta-outcome occur.

A player may be rewarded with the downside of a sequence of outcomes much as buying insurance gives him the upside. For example, a player pays a fixed sum of money, and collects winnings for every dollar in the negative the contract finishes at. Thus, if a contract ends with the player having minus 20 accumulated credits, then the player collects 20 credits.

A contract may apply to a "best 100" sequence of a larger sequence of pulls. For example, the player pays $100 for a contract of 1000 pulls. From those 1000 pulls, the player gets to choose any 100 consecutive outcomes to determine his winnings, and can disregard the rest of the outcomes. Thus the player can say he wants to use outcomes 506 through 605. Perhaps there was a hot streak during that sequence. The player's winnings are then determined solely based on what happened between pulls 506 and 605. This might result in winnings of $200, whereas having counted all 1000 pulls would have resulted in a net loss for the player. Of course, the gaming device may automatically choose the most favorable sequence for the player.

A player may choose his favorite outcome and receive higher payouts for that outcome, special privileges for receiving that outcome (e.g. the ability to terminate a contract), etc.

Figure 16:
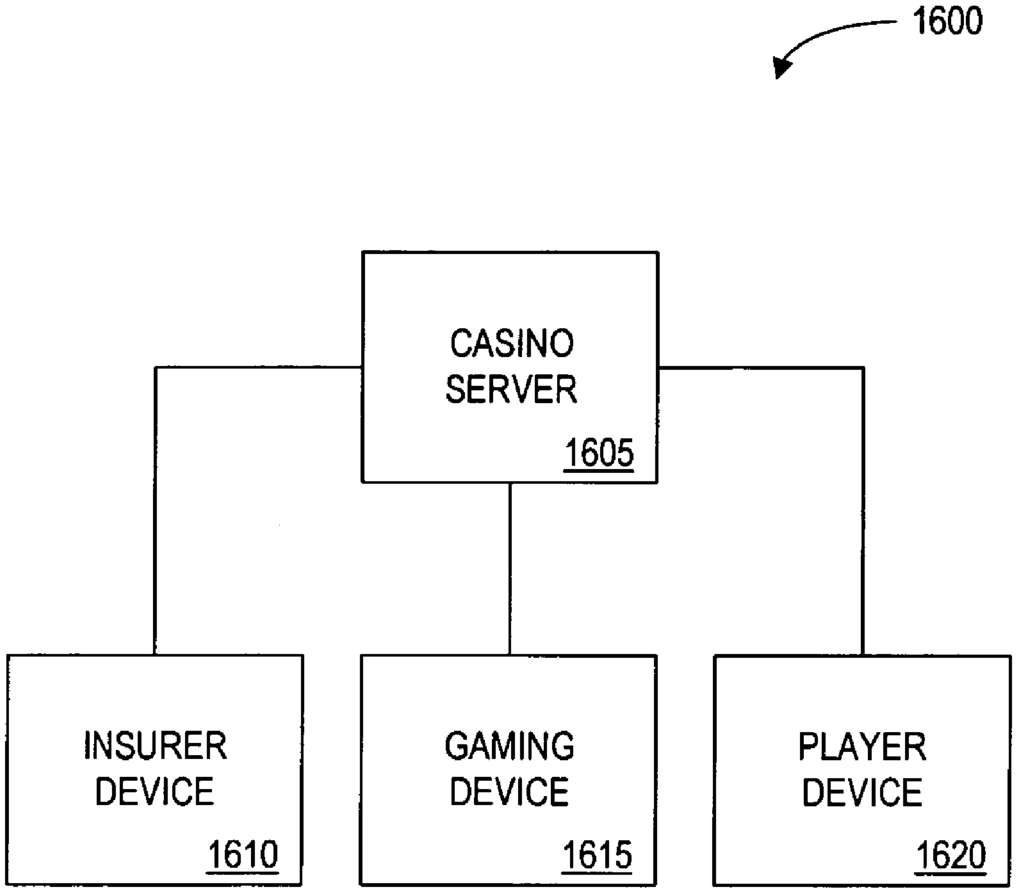
FIG. 16 is an overall schematic view of a system according to another embodiment of the present invention.

Returning now to the figures, FIG. 16 is a schematic representation of an embodiment of a system configured to carry out the contract embodiments described above. The system 1600 comprises a casino server 1605 in communication with insurer device 1610, a gaming device 1615, and a player device 1620. As used herein, a device (including the casino server 1605, the insurer device 1610, the gaming device 1615 and/or the player device 1620) may communicate, for example, through a communication network such as a Local Area Network (LAN), a Wide Area Network (WAN), a Metropolitan Area Network (MAN), a Public Switched Telephone Network (PSTN), a proprietary network, a Wireless Access Protocol (WAP) network, or an Internet Protocol (IP) network such as the Internet, an intranet or an extranet. Moreover, as used herein, a communication network includes those enabled by wired or wireless technology.

It should be understood that any number of gaming devices and any number of player devices can be used in system 1600. Although system 1600 includes both a casino server 1605 and an insurer device 1610 as illustrated, one or the other of these elements may be omitted (for example, the insurer device may be omitted in embodiments that do not include an insurer or where the casino acts as the insurer). Similarly, although system 1600 includes both a gaming device 1615 and a player device 1620 as illustrated, one or more of these embodiments may be omitted (for example, the player device may be omitted if the casino has not implemented remote gaming). Further, some or all of the functionality of a casino server 1605 may be carried out by insurer device 1610 and vice versa. Similarly, some or all of the functionality of casino server 1605 and/or insurer device 1610 may be carried out by gaming device 1615 and vice versa. In one embodiment, the casino server 1605 comprises one or more computers that are connected to a remote database server.

Figure 17:
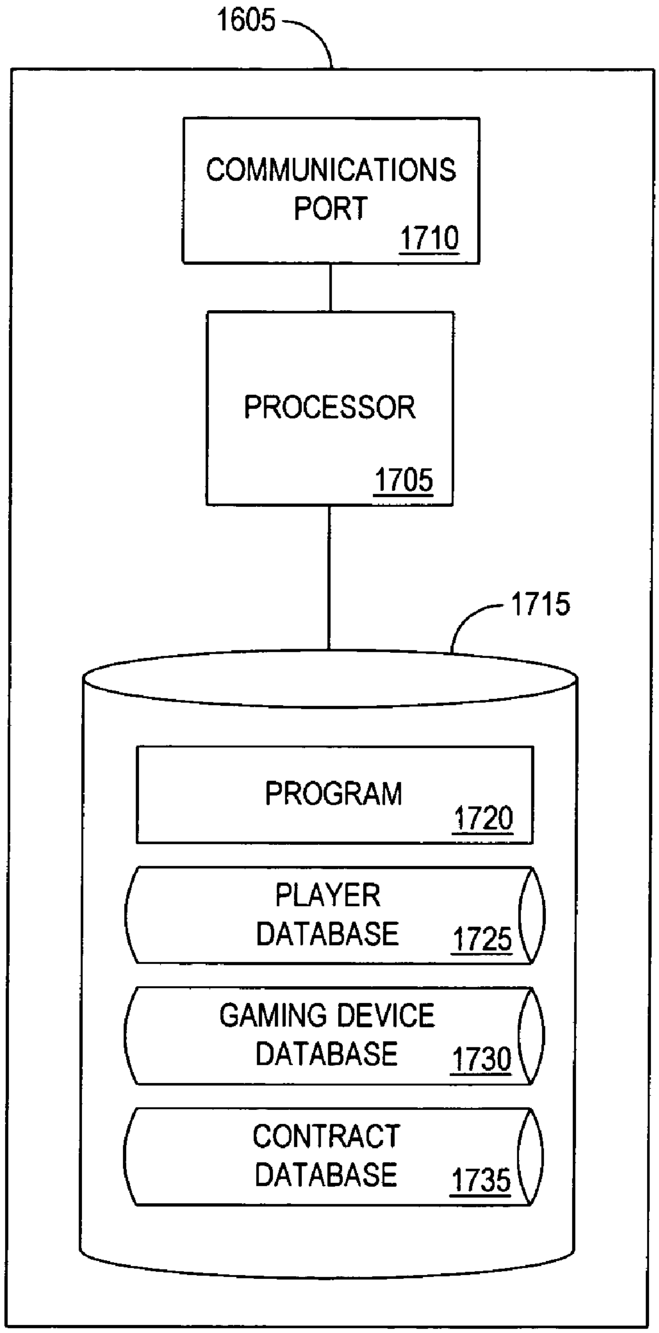
FIG. 17 is a schematic view of the casino server of FIG. 16.

Turning now to FIG. 17, therein depicted is schematic illustration of a casino server 1605. Casino server 1605 is an illustration of an embodiment of the casino server of the same number in FIG. 16. Casino server 1605 comprises a processor 1705 in communication with a communications port 1710 and storage device 1715. Contained in storage device 1715 is a program 1720, a player database 1725, a gaming device database 1725, and a contracts database 1730. Each of these databases will be described in detail below. The processor 1705 performs instructions of the program 1720, and thereby operates in accordance with the present invention. The program 1720 may be stored in a compressed, uncompiled and/or encrypted format. The program 1720 furthermore includes program elements that may be necessary, such as an operating system, a database management system, and "device drivers" used by the processor 210 to interface with peripheral devices. Appropriate program elements are known to those skilled in the art.

Note that the processor 1705 and the storage device 1715 may be, for example, located entirely within a single computer or other computing device or located in separate devices coupled through a communication channel.

Figure 18:
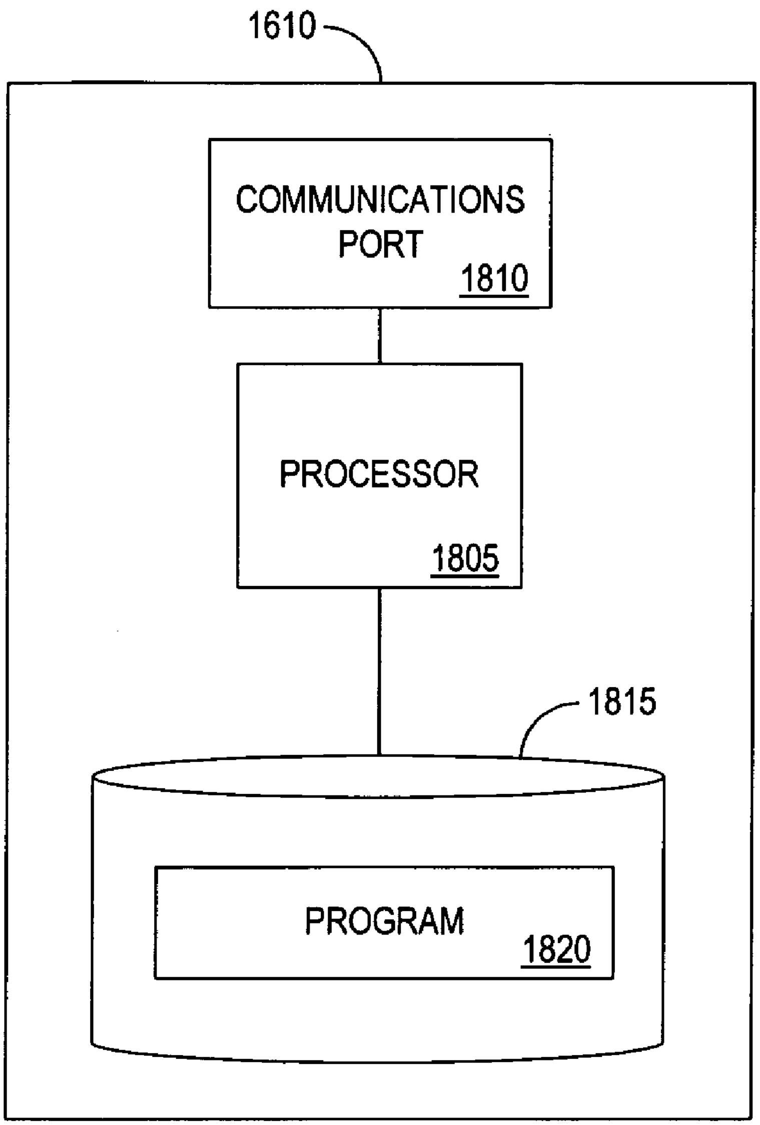
FIG. 18 is a schematic view of the insurer device of FIG. 16.

Turning now to FIG. 18, therein depicted is a schematic illustration of an insurer device 1610. Insurer device 1610 is an illustration of an embodiment of the insurer device 1610 of the same number in FIG. 16. Insurer device comprises a processor 1805 in communication with a communications port 1810 and a storage device 1815. Storage device 1815 stores a program 1820. The processor 1805 performs instructions of the program 1820, and thereby operates in accordance with the present invention. The program 1820 may be stored in a compressed, uncompiled and/or encrypted format. The program 1820 furthermore includes program elements that may be necessary, such as an operating system, a database management system, and "device drivers" used by the processor 1805 to interface with peripheral devices. Appropriate program elements are known to those skilled in the art. Note that the processor 1805 and the storage device 1815 may be, for example, located entirely within a single computer or other computing device or located in separate devices coupled through a communication channel.

Figure 19:
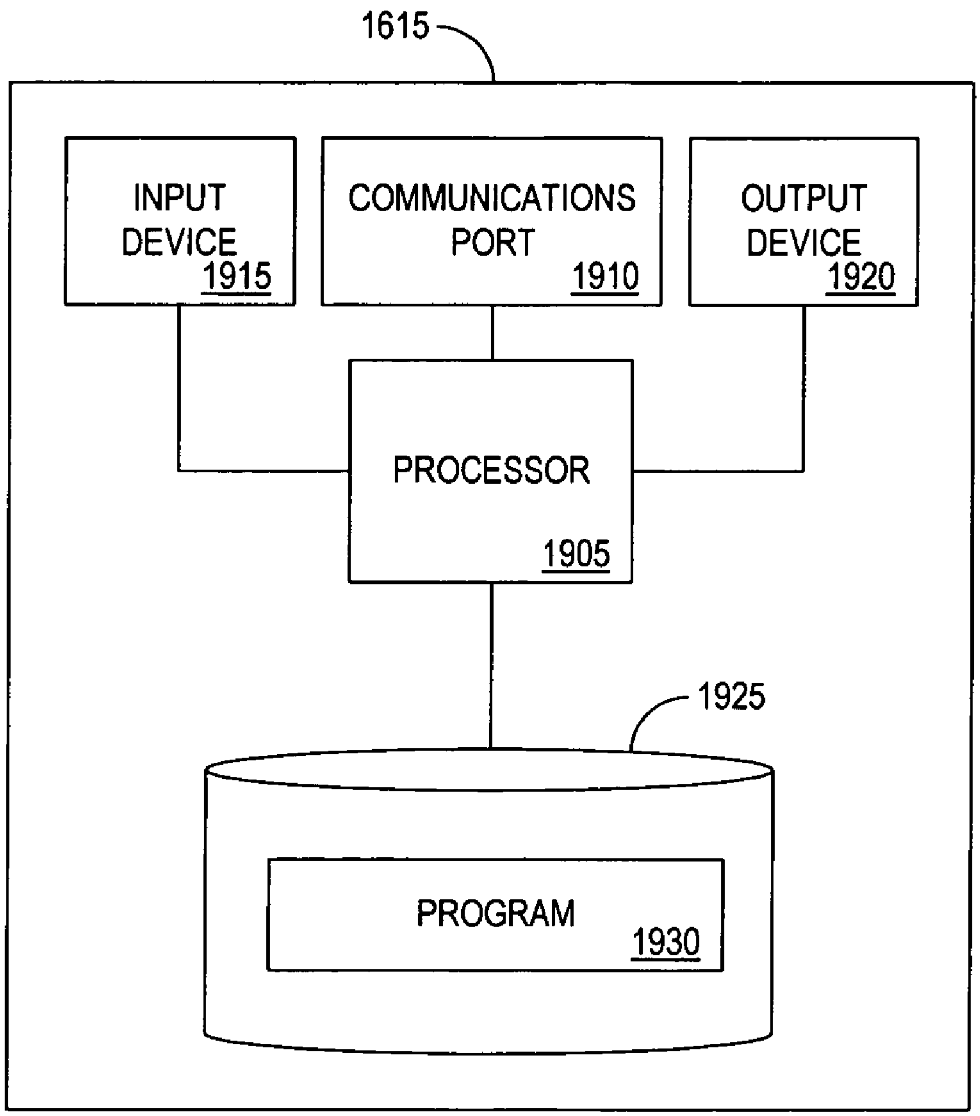
FIG. 19 is schematic view of the gaming device of FIG. 16.

Turning now to FIG. 19, therein depicted is a schematic illustration of a gaming device 1615. Gaming device 1615 is an illustration of an embodiment of the gaming device of the same number depicted in FIG. 16. Gaming device 1615 comprises a processor 1905 in communication with a communications port 1910, an input device 1915, an output device 1920, and a storage device 1925. Storage device 1925 stores a program 1930. The processor 1905 performs instructions of the program 1930, and thereby operates in accordance with the present invention. The program 1930 may be stored in a compressed, uncompiled and/or encrypted format. The program 1930 furthermore includes program elements that may be necessary, such as an operating system, a database management system, and "device drivers" used by the processor 1905 to interface with peripheral devices. Appropriate program elements are known to those skilled in the art.

Note that the processor 1905 and the storage device 1925 may be, for example, located entirely within a single computer or other computing device or located in separate devices coupled through a communication channel.

Input device 1915 may comprise, for example, a player slot card interface, a keypad, a touch-screen, a microphone and/or any other device which allows a player to input information into gaming device 1615. Output device 1920 may comprise, for example, a display area, a microphone, and/or any other device that allows gaming device 1615 to output information to a player. Gaming device 1615 may comprise, for example, a slot machine, video poker machine, video keno machine, or a video blackjack machine. A combination of these type of machines may be used in embodiments where casino server 1605 is in communication with more than one gaming device 1615.

Figure 20:
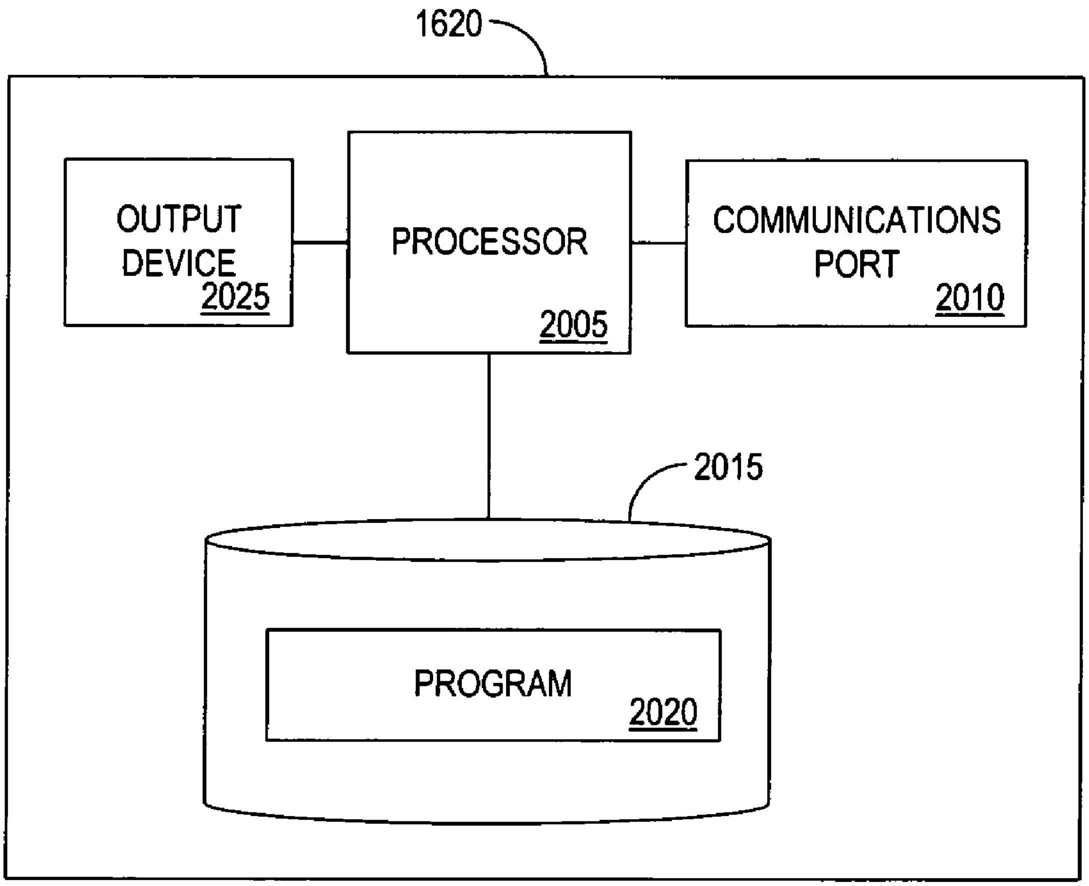
FIG. 20 is a schematic view of the player device of FIG. 16.

Turning now to FIG. 20, therein depicted is a schematic illustration of a player device 1620. Player device 1620 is an illustration of an embodiment of the player device of the same number depicted in FIG. 16. Player device 1620 may be, for example, a personal computer (PC), laptop, personal digital assistant, a cellular telephone, a pager, and/or any other device that allows a player to remotely monitor and participate in play of a gaming device in accordance with the present invention. Player device 1620 comprises a processor 2005 in communication with a communications port 2010 and a storage device 2015. Storage device 2015 stores a program 2020. The processor 2005 performs instructions of the program 2020, and thereby operates in accordance with the present invention. The program 2020 may be stored in a compressed, uncompiled and/or encrypted format. The program 2020 furthermore includes program elements that may be necessary, such as an operating system, a database management system, and "device drivers" used by the processor 2005 to interface with peripheral devices. Appropriate program elements are known to those skilled in the art. Note that the processor 2005 and the storage device 2015 may be, for example, located entirely within a single computer or other computing device or located in separate devices coupled through a communication channel.

It should be noted that any and all of the processors 1705, 1805, 1905, and 2005 may comprise one or more microprocessors such as one or more INTEL® Pentium® processors. Further, any and all of the storage devices 1720, 1815, 1925, and 2015 may comprise any appropriate storage device, including combinations of magnetic storage devices (e.g., magnetic tape and hard disk drives), optical storage devices and semiconductor memory devices, such as Random Access Memory (RAM) devices and Read Only Memory (ROM) devices.

Examples of databases that may be used in connection with the system 1600 will now be described in detail with respect to FIGS. 21 through 23. Each figure depicts a database in which the data is organized according to a data structure in accordance with embodiments of the present invention. The data may be stored, for example, on a computer readable medium and be accessible by a program executed on a data processing system. The schematic illustrations and accompanying descriptions of the databases presented herein are exemplary, and any number of other database arrangements could be employed besides those suggested by the figures.

Player Database

Referring to FIG. 21, a table represents one embodiment of the player database 1720 that may be stored at the casino server 1605 shown in FIG. 16 according to an embodiment of the present invention. The table includes entries identifying players that may be participating in contracts for flat rate play sessions with system 1600. The table also defines fields 2105, 2110, 2115, 2120, 2125, 2130, and 2135 for each of the entries. The fields specify (i) a player identifier 2105 that uniquely identifies a player; (ii) a name 2110 associated with the player; (iii) an address 2115 that facilitates communications with the player; (iv) a financial account identifier 2120, such as a credit or debit card account, associated with the player through which payment may be obtained and to which player winnings may be credited; (v) demographic information 2125 that may be utilized to determine a price or other terms for a contract; (vi) credits 2130 that represent the amount of casino credits associated with the player; and (vii) a lifetime coin in 2135 that represents the amount of coin in wagered by the player over the course of his or her relationship with the casino and/or insurer.

Gaming Device Database

Referring to FIG. 22, a table represents one embodiment of the gaming device database 1725 that may be stored at the casino server 1605 shown in FIG. 16 according to an embodiment of the present invention. The table includes entries identifying gaming devices operated by the casino. The table also defines fields 2205, 2210, and 2215 for each of the entries. The fields specify a (i) a gaming device identifier 2205 that identifies a gaming device; (ii) a name 2210 associated with the gaming devices, such as, for example, Diamond Mine®; and (iii) a manufacturer 2215 of the gaming device.

Contract Database

Referring to FIG. 23, a table represents one embodiment of the contract database 1730 that may be stored at the casino server 1605 shown in FIG. 16 according to an embodiment of the present invention. The table includes entries identifying contracts that may or have been purchased via the system 1600. The table also defines fields 2305, 2310, 2315, 2320, 2325, 2330, 2335, 2340, and 2345 for each of the entries. The fields specify (i) a contract identifier 2305 that identifies a contract that has been purchased or is available for purchase by a player; (ii) a player identifier 2310 that identifies a player, if any, that may be associated with the contract; (iii) an initial bankroll 2315; (iv) a description 2320 that describes the terms of the contract; (v) a cost 2325 of the contract; (vi) a result 2330 that indicates the current status of the contract; (vii) an amount owed the player 2335; (viii) an amount owed the insurer 2340; and (ix) a total amount owed the insurer 2345.

Figure 24:
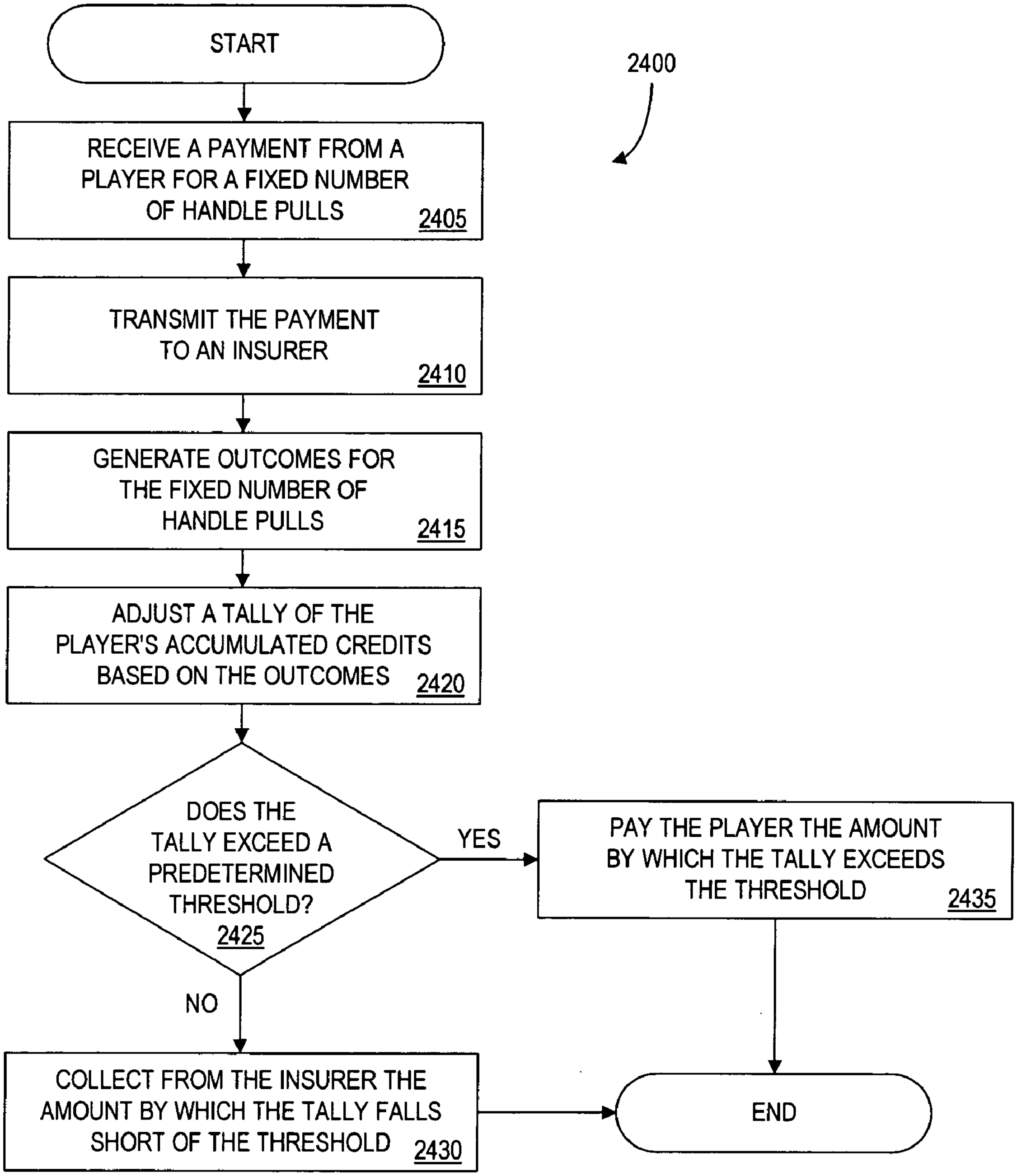
FIG. 24 is a flowchart illustrating a process in accordance with one embodiment of the present invention, the process corresponding to the system illustrated in FIG. 16.

A method that may be used in connection with the system 1600 according to an embodiment of the present invention will now be described in detail with respect to FIG. 24. The method shown in FIG. 24 may be performed, for example, by a casino server 1605 in response to a player's request to purchase a contract and after determining the price and terms of the contract the player wishes to purchase. This flow chart does not imply a fixed order to the steps, and embodiments of the present invention may be practiced in other orders.

The method 2400 begins upon receipt of payment from a player for a fixed number of pulls in step 2405. In other embodiments this step may comprise receipt of payment for a fixed duration of time during which the player may play. Receipt of payment may comprise, for example, receipt of a monetary input into a gaming device 1615 or receipt of (and, e.g. approval of a charge on) a financial account identifier. The received payment, or an indication of it, is then transmitted to an insurer in step 2410. Outcomes are then generated for a fixed number of pulls in step 2415. An adjustment of a tally of the player's accumulated credits based on the outcomes is performed in step 2420.

In step 2425 it is determined whether the adjusted tally exceeds a predetermined threshold. If it does, the method 2400 proceeds to step 2435 where the player is paid the amount by which the tally exceeds the threshold. Payment to the player may be achieved by, for example, outputting a monetary amount comprising the payment to the player at the gaming device or by crediting the amount of the payment to a financial account identifier associated with the player. If it is determined in step 2425 that the adjusted tally does not exceed the predetermined threshold then the method 2400 proceeds to step 2430 in which the amount by which the tally falls short of the threshold is collected from the insurer.

Additional Direction of Various Embodiments

As further illustration of what has been described herein, additional descriptions of some embodiments of the present invention will now be set forth. Specifically, various examples of embodiments comprising a video poker gaming device will now be described. It should be noted that, as used herein, the terms "contract," "gaming contract," "session," "gaming session," "play session," "flat rate session" and "flat rate play session" may be used interchangeably to describe flat rate session play of the present invention, wherein players provide a flat price and in exchange execute a plurality of game plays administered by a gaming device. For example, if a gaming device is described as storing a number of gaming contracts with operator-specified parameters, it may be understood that such contracts are in essence pricing arrangements that allow for players to execute one or more gaming sessions by providing a flat rate price.

As described, prices of various flat rate sessions or contracts may be determined based on a variety of associated parameters, such as the duration of the contract, the wager amount per game play, the starting balance of the contract, active payouts associated with the contract, and so on.

For example, as described, in one or more embodiments, an operator may calculate (e.g., by way of repeated mathematical simulation) the average amount paid out to a player of a gaming contract when the contract comprises various parameters. For example, it may be determined that the average "contract cost" (e.g., the average amount paid out to players upon resolution of a gaming contract) is $10.03 for a draw video poker contract characterized by the following parameters:

Contract duration/interval: 30 minutes or 250 hands of draw poker

Wager amount per hand: $0.25

Starting balance: 0 credits (each wager deducts one credit, such that the player's balance can be negative)

Active pay combinations: Royal Flush pays 4,000 credits, Straight Flush pays 50 credits, Four of a Kind pays 25 credits, Full House pays 9 credits, Flush pays 6 credits, Straight pays 4 credits, Three of a Kind pays 3 credits, Two Pair pays 2 credits, Jacks or Better pay 1 credit Threshold above which player may collect winnings: 0 credits Thus, after simulating play of a gaming contract with the above parameters, it may be determined that the following expression is true:

(Total number of players finishing with a positive balance×Average amount won by players with a positive balance)=$10.03 Total number of players Accordingly, as described, this contract cost (or base price) may be used to calculate a retail price (e.g., a flat rate price to be paid by players when purchasing a gaming session). For example, an operator may multiply the contract cost by a desired margin to arrive at a retail price (e.g., $10.03×1.5=$15.05, establishing a 50% profit margin). In other embodiments, an operator may calculate a retail price by adding a fixed amount to a contract cost (e.g., each contract should be priced $10 above the contract cost).

Thus, in some embodiments, an operator or other party may set retail prices in association with a number of gaming contracts before such contracts are made available to players, such that the prices may remain fixed so long as the contracts are offered (e.g., before a video poker machine offering a "Play by the Hour" feature is released to the public, it is determined that 30 minutes of video poker play, wherein players wager $0.25 per hand, may cost the player $20, yielding approximately $10 in profit per contract).

In other embodiments, prices associated with one or more gaming contracts may be adjusted on a periodic, non-periodic (e.g., upon an occurrence of a predetermined condition) and/or continuous basis (e.g., by an operator). Thus, a gaming device and/or server of the present invention may comprise means for determining a retail price associated with a gaming contract.

For example, in one or more embodiments, a contract cost associated with each of several predefined gaming contracts (e.g., contracts with operator-specified parameters) may be stored within a memory of a gaming device and/or server of the present invention. Using an interface of a gaming device, server and/or a computing device in communication with a gaming device and/or server, an operator may then set retail prices as some function of the contract cost (e.g., an operator uses a touch-sensitive screen of a gaming device or any of various available input means of a computer device in communication therewith to input such price settings, such that retail prices associated with one or more gaming contracts offered by a gaming device are updated, changed or otherwise programmed into the memory of a gaming device and/or server).

In one such example, an operator may periodically or non-periodically adjust a desired "hourly profit rate" associated with one or more contracts offered by one or more gaming devices (e.g., an amount a profit per unit time an operator desires to realize when one or more contracts are executed using one or more gaming devices).

For example, an operator may program a desired hourly profit rate for a particular gaming device, such that if any contract is executed using the device, the same amount of profit per unit time will be realized. As stated, the prices of various contracts may then be adjusted to reflect the desired profit rate. For example, in some embodiments, the price of each contract is a function of the desired hourly profit rate, the contract cost, and contract duration. For example, if an operator desires a profit rate of $15/hour, and the contract cost of a 30-minute contract is $40.12, then the contract may be priced at $47.62. In another example, if an operator desires a profit rate of $22/hour, and the contract cost of a two-hour contract is $102.35, then the contract may be priced at $146.35. Of course, it should be noted that various rounding rules may be utilized such that contracts are priced at even amounts of money (e.g., whole dollar amounts), in a manner that is convenient to customers.

In another example, an operator may program a desired income rate in association with a particular game offered by a plurality of gaming devices (e.g., an operator desires $11/hour from Crazy Deuces Poker, $12/hour from Bonus Action Power Poker).

It should be further noted that, in some embodiments, an operator may wish to set arbitrary prices (e.g., prices that are not determined based on some function of contract cost). Accordingly, using an interface of a gaming device, server and/or a computing device in communication with a gaming device and/or server, an operator may then set such retail prices (e.g., an operator simply enters a desired price associated with one or more contracts).

Further, as stated, in some embodiments, players may establish various contract parameters (e.g., indicate which payouts are active, and so on). Accordingly, a gaming device and/or server of the present invention may comprise means for determining a contract cost based on the requested parameters. For example, one or more algorithms stored within the gaming device and/or server may enable that contract costs are calculated based on received parameters. Thus, a gaming device may comprise the flexibility to allow players to identify a variety of contract parameters, and to allow operators to specify hourly income rates or other profit rules such that contracts may be priced dynamically based on the player-identified parameters.

Further still, an operator or other party may specify one or more criteria for determining a price of a session. For example, an operator or other party may specify different hourly profit rates for different periods of time. For example, as described, an operator may desire a higher hourly profit rate during a peak period when gaming device utilization is typically high, and settle for a lower profit rate during an off-peak period when machine usage is typically low.

In another embodiment, a gaming device and/or server may determine a current level of machine usage in association with one or more gaming devices. For example, it may be determined that a certain percentage of all gaming devices among a common network are currently being utilized (e.g., 47% of all gaming devices have a credit balance other than zero). A gaming device may then be configured such that an hourly profit rate is associated with a utilization percentage or range of utilization percentages (e.g., an hourly profit rate of "$11 per hour" is desired between "11-20% utilization"; an hourly profit rate of "$18 per hour" is desired between "51-60% utilization"; and so forth). Thus, the present invention may comprise automatically adjusting a profit rate in association with a determined level of utilization. Thus, in some embodiments, the price of a contract may be adjusted based upon the occurrence of a predefined condition (e.g., a change in machine utilization). It should be noted that, in some embodiments, the present invention may comprise determining a utilization percentage or range of utilization percentages associated with various types of gaming devices (e.g., a utilization percentage of all video poker machines).

It should be noted that, as the duration of gaming contracts may be measured by time or by game plays, operators may similarly configure a gaming device to generate a particular "profit rate per number of game plays." For example, an operator may specify a desired profit rate of $32 per 1,000 game plays. Thus, if the contract cost of offering 250 hands of a particular video poker contract is $8, then the contract may be priced at $16 to reflect the desired profit rate.

Thus, as it is known for operators to increase and decrease the "hold percentages" of various existing gaming devices (e.g., operators increase a hold percentage by decreasing the probability associated with achieving one or more outcomes and/or decreasing the payout amounts associated with those outcomes), operators may similarly control the rates at which gaming devices earn profit when such devices administer flat rate session play or contracts for such play.

In one or more embodiments, aspects of the present invention, such as determining or otherwise offering contract pricing, may be practiced by replacing and/or augmenting one or more components (e.g., hardware and/or software components) of an existing gaming device. Thus, in one or more embodiments, the invention may be applied as a retrofit to existing gaming devices currently available for play within various casinos.

For example, a memory (e.g., computer chip) of the gaming device may be replaced or added, the replacement or additional memory storing a program for instructing the processor of the gaming device to operate in accordance with one or more embodiments of the present invention. In another example, data output via the gaming device (e.g., graphical and/or textual data displayed on the gaming device) may be replaced or added, the replacement or additional data indicating to a player information relevant to one or more aspects of the present invention.

In a specific example, a gaming device may comprise various electronic components mounted to one or more printed circuit boards (PCBs). Such components may include various hardware described herein, such as a communications port and various controllers of peripheral devices (e.g., a display controller), as well as a memory for storing programming instructions (software) and a processor for carrying out such instructions. Forms of memory commonly found gaming devices include electronically erasable programmable read-only memory (EEPROM) and erasable programmable read-only memory (EPROM). Thus, in one or more embodiments of the present invention, an EEPROM storing contract pricing instructions (as well as instructions for carrying out other functions performed by the gaming device) may replace an EEPROM previously installed in a gaming device, such that the gaming device may be configured to operate in accordance with various processes of the present invention.

For example, a "pricing module" may be made available for purchase to various casino operators. The module, which may comprise various hardware and software (e.g., an EEPROM storing software instructions), may be installed in an existing gaming device (e.g., a video-reel slot machine, a video poker machine, etc.), such that when the module is installed, players of the device may elect (i) to play a game offered by the gaming device without purchasing a flat rate session or contract, or (ii) to play a game offered by the gaming device by means of purchasing a flat rate session or contract. Thus, players who are familiar with the games offered by various gaming devices may elect to pay for them in a different or similar manner as they are accustomed to. It should be noted that one advantage of flat rate session play and gaming contracts (which may be enabled by the installation of the pricing module) lies in the ability to offer players discounts or perceived discounts for agreeing to play and/or pre-paying for a large number of game plays, for a long period of time, etc.

Accordingly, as described above, a gaming device may be configured to allow a player to select one of two "modes" of the gaming device, and to enable the selected mode. If a player selects a "standard" mode in which a flat rate price will not be received for a plurality of game plays, the gaming device may be configured to operate in a manner similar to how it operated before the installation of the pricing module (e.g., players make funds available for each game play). If a player selects a "flat rate" mode and a flat price is paid for the privilege of executing a plurality of game plays, the gaming device may then be operable to execute a gaming session or contract play as described herein.

Figure 29:
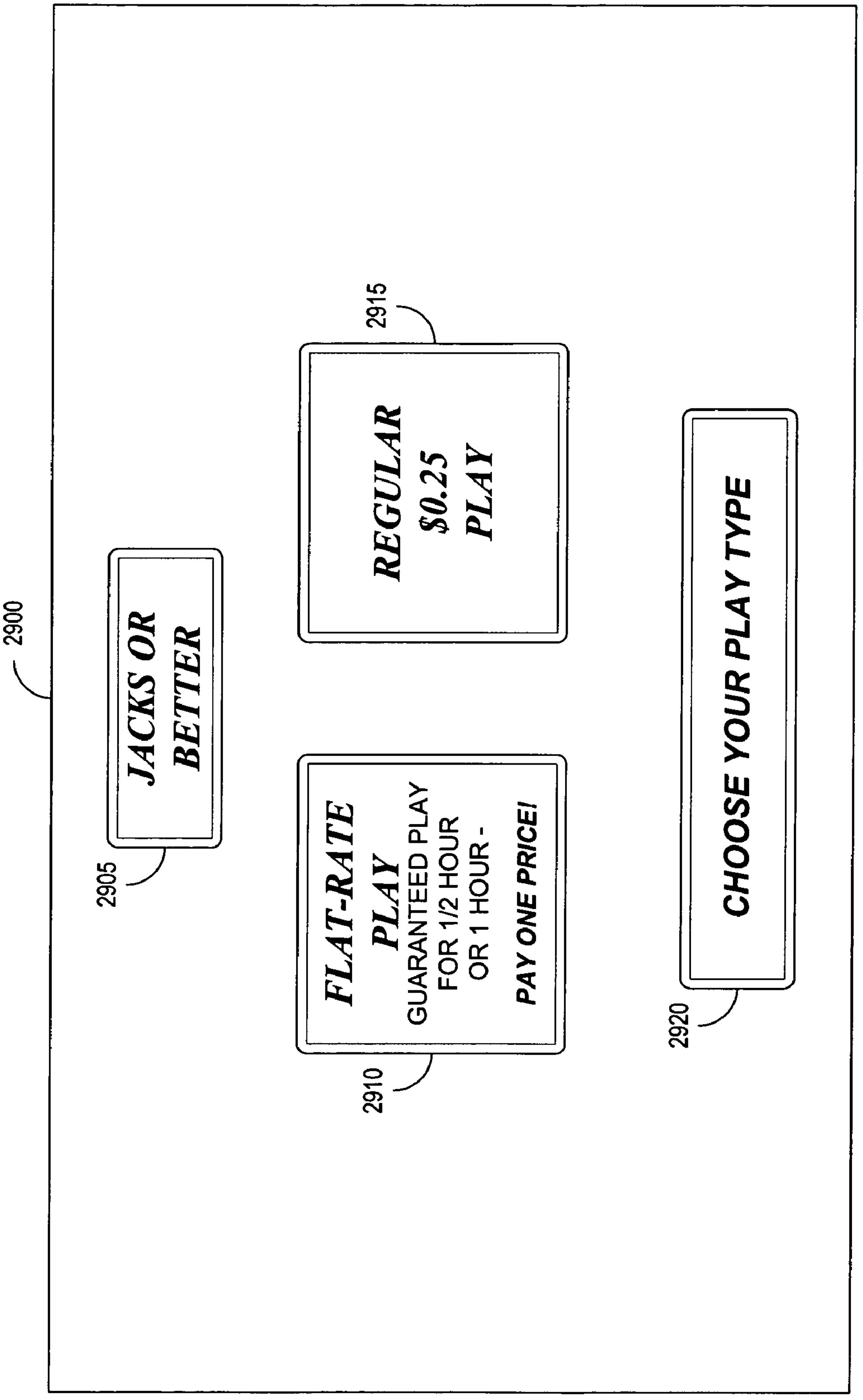
FIG. 29 is an example of information that may be presented via a display to a player who indicates a desire to purchase a contract in accordance with embodiments described herein.

In one example, a touch-sensitive display screen may be configured to output a prompt asking a player to select a mode of operation. FIG. 29, described below, illustrates one example screen that may be presented to a player as a means of allowing the player to select one of such two modes of operation. Such a prompt may be output in occurrence to various trigger conditions (e.g., coins, bills or tickets are inserted; a credit balance increases from zero to some other number; a player presses a "play" button; a player selects a denomination and/or game to play, a player inserts a player tracking card, a motion, weight, infrared or other sensor detects the presence of a player; etc.). Accordingly, a player may select a mode of operation (e.g., by pressing an appropriately labeled icon of a touch-sensitive display screen), and upon receiving the player's selection, the gaming device may be configured to operate in the selected mode. FIGS. 30-42, described below, illustrate various screens of information that may be output to a player who selects a "flat rate" play of operation, in accordance with some embodiments described herein.

In other embodiments, a peripheral device may be useful for implementing one or more embodiments of the present invention into the operation of a conventional gaming device. For example, in order to avoid or minimize the necessity of modifying or replacing a program already stored in a memory of a conventional gaming device, an external or internal module that comprises a peripheral device may be inserted in, connected to or otherwise associated with the gaming device.

In still further embodiments, rather than configure existing gaming devices to execute pricing logic by installing or connecting new hardware and/or software, such pricing logic may be downloaded into an existing memory of one or more gaming devices. U.S. Pat. No. 6,805,634 to Wells et al. teaches methods for downloading data to gaming devices in such a manner. The entirety of U.S. Pat. No. 6,805,634 is incorporated by reference herein for all purposes. Thus, in some embodiments, an existing gaming device may be reprogrammed to accommodate new pricing functionality of the present invention without the need, or by minimizing the need, to remove and replace hardware within the gaming device.

As described, in some embodiments, once prices have been determined in association with various contracts, such contracts may then be offered to players of gaming devices (e.g., players may peruse, using a menu output via a touch-sensitive display screen of a gaming device, various gaming contracts and prices associated therewith). Thus, an operator may program a gaming device such that players may review a variety of gaming contracts offered by the device. In one such example, a gaming device may output or otherwise display a "rate card," indicating various durations and wager amounts associated with a price (e.g., 30 minutes of play, wherein the customer wagers $0.25 per bet, has a retail price of $30; an hour of play, wherein the player wagers $1 per game play, has a retail price of $150; etc.).

In various embodiments, a player may alter the determined price of an operator-specified gaming contract without changing a contract parameter (e.g., the price changes, but the duration, active pay combinations and/or amount wagered per game play remain constant).

For example, in one embodiment, a customer may receive a discount by providing a promotional code. A promotional code may be received in a variety of manners (e.g., a player enters a code using an input device, a player inserts a promotional ticket into a ticket-in/ticket-out device, etc). Accordingly, in some embodiments, the present invention may comprise (i) determining a retail price associated with a contract or flat rate gaming session, (ii) receiving an identifier for a promotional discount, (iii) determining if the identifier is valid (e.g., a database indicates that the identifier has been issued and has not expired), (iv) determining a discount amount associated with the identifier (e.g., a flat or percentage discount amount), and (v) applying the discount to the retail price (e.g., decreasing the price of the contract or flat rate session by the discount amount). In further embodiments, promotional codes may enable free play as opposed to price discounts. For example, by entering a valid code, a player may be entitled to five extra minutes of video poker play along with any purchase of a flat rate session. In some embodiments, players may receive promotional codes for visiting a Web site (e.g., to experience trial play of games or gaming contracts), participating in a survey, etc. For example, a player may (i) visit a Web site, (ii) play a free, short-duration gaming contract (e.g., five minutes), (iii) receive a promotional code, and (iv) enter the promotional code at a gaming device within a casino to receive a discount on a gaming contract, begin a gaming session using a balance that was accumulated online, receive several minutes of bonus time when purchasing another gaming contract, etc.

In another embodiment, a player may receive a discount by purchasing the contract or flat rate session along with other goods or services. For example, a flat rate play session may have a retail price of $30, but the price may be decreased if the player agrees to eat at a restaurant, stay in a hotel room, purchase two show tickets, purchase another contract or flat rate session, and so on. In some embodiments, a gaming device and/or server of the present invention may communicate with an inventory or reservation management system (e.g., of a hotel, theatre, restaurant, etc.) to determine a level of utilization associated with another property within the casino, and offer the player a discount on a contract or flat rate session if the player, for example, buys tickets to a show that is expected not to sell out, purchases buffet passes good during off-peak hours, and so on.

In further embodiments, one or more players may receive a discount or other benefit for purchasing a contract along with another player. For example, if two players each desire to purchase a gaming contract with a retail price of $30, a casino may advertise the contracts at a discount (e.g., a "Husband and Wife package of two contracts for $50 total"). For example, two players may approach a desk or booth within a casino and indicate an interest in purchasing gaming contracts. A casino representative may then, after receiving payment for the contracts, provide means for enabling the players to execute the gaming contracts. Such means include, but are not limited to (i) codes that the players may enter using an input device of a gaming device when desiring to execute the contract, (ii) tickets that may be inserted into a ticket-in/ticket-out component of a gaming device, (iii) magneticstripe cards (e.g., comprising an identifier which may be read by a card reader device, such that a gaming device may determine whether or not the player is entitled to a gaming contract based on data stored on a server associated with the identifier), (iv) smart cards (e.g., comprising a memory storing session or contract data), and so on. In embodiments wherein contract or flat rate play session data of a central server must then be updated, the representative may utilize a computer device in communication with such a server. Thus, as described, in some embodiments, players may present alternate forms of payment (codes, tickets, cards, etc.) other than currency to initiate gaming sessions or contract play.

In another example, a player may visit a kiosk (or a desk within a casino staffed by casino personnel), purchase a gaming contract (e.g., by providing funds and selecting or otherwise agreeing to various contract parameters), and be provided with means for executing such a contract. For example, a kiosk may print a bar-coded ticket, which may be receivable by a "ticket-in/ticket-out" module of a gaming device, such that the gaming device may then scan the barcode of the ticket to determine various contract parameters (e.g., a duration, a wager amount per game play, active pay combinations, and so on). The gaming device may then be configured to execute a gaming session characterized by the indicated contract parameters (e.g., such that the player needn't provide funds or spend time choosing contract parameters at the gaming device, but rather insert a ticket and begin playing almost immediately thereafter). In yet another example, a player may visit a desk, booth or other location staffed by casino personnel, such that casino representative may (i) determine contract parameters desired by the player, (ii) receive payment for the contract, (iii) utilize a computer terminal in communication with a server and/or one or more gaming devices to indicate that the player is entitled to a contract characterized by certain parameters, and (iv) provide a card to the player that encodes various data (e.g., a plastic player tracking card with a magnetic strip encoding a player identifier, a smart card with an internal memory storing contract data, etc.) such that the player may insert the card into a reader device in communication with a gaming device and begin play under the associated contract parameters. It should be noted that, in some embodiments, such methods of purchasing gaming contracts may be utilized by players desiring to purchase contracts as gifts for others. Accordingly, in some embodiments, such tickets or cards may be personalized (e.g., when purchasing a contract from a kiosk, a player may enter a recipient's name using an input device of the kiosk, such that the recipient's name may be printed on a "gift ticket"), or may be accompanied by gift-oriented packaging (e.g., "To/from envelopes" and so on). It should be noted that in some embodiments, players may purchase "group" contracts comprising altered contract parameters. For example, two or more players may play gaming sessions simultaneously, and receive benefits based on the total balance accumulated by both players at the end of the session.

In another example, two or more players may simultaneously play a draw video poker tournament session. In one such example, each player may simultaneously be dealt the same starting hand during tournament play. In this manner, much like duplicate bridge play, luck may play a lesser role in determining the winner of the tournament. In some embodiments, players may be given a limited time period after being dealt a starting hand to determine which cards to hold, after which time the dealt hand may be declared void. In other embodiments, players may participate in a tournament by first participating in individual gaming sessions, and then having the results of those sessions ranked to determine tournament prizes and payouts (e.g., if a first player achieves a credit balance of 179 as the result of a gaming session, and a second play achieves a credit balance of 245 as the result of a gaming session, the second player may be awarded a benefit). It should be noted that one advantage of such an embodiment is that players may compete with one another in an asynchronous manner.

Various methods and apparatus for administering such group and tournament play embodiments are described in Applicant's U.S. Pat. No. 6,312,332, filed Jul. 1, 1998, entitled "METHOD AND APPARATUS FOR TEAM PLAY OF SLOT MACHINES"; U.S. Pat. No. 6,206,782, filed Sep. 14, 1998, entitled "SYSTEM AND METHOD FOR FACILITATING CASINO TEAM PLAY"; U.S. Pat. No. 6,142,872, filed Mar. 31, 1998, entitled "METHOD AND APPARATUS FOR TEAM PLAY OF SLOT MACHINES"; U.S. Pat. No. 6,712,699, filed Feb. 5, 2002, entitled "APPARATUS AND METHOD FOR FACILITATING TEAM PLAY OF SLOT MACHINES"; U.S. application Ser. No. 10/811,583, filed Mar. 29, 2004, entitled "APPARATUS AND METHOD FOR FACILITATING TEAM PLAY OF SLOT MACHINES"; U.S. application Ser. No. 10/842,405, filed May 10, 2004, entitled "METHOD AND APPARATUS FOR TEAM PLAY OF SLOT MACHINES"; U.S. application Ser. No. 10/254,831, filed Sep. 25, 2002, entitled "METHOD AND APPARATUS FOR LINKED PLAY GAMING"; U.S. application Ser. No. 10/414,934, filed Apr. 15, 2003, entitled "METHOD AND APPARATUS FOR LINKED PLAY GAMING WITH COMBINED OUTCOMES AND SHARED INDICIA"; and U.S. application Ser. No. 10/023,149, filed Dec. 18, 2001, entitled "AN ELECTRONIC GAMING DEVICE OFFERING A GAME OF KNOWLEDGE FOR ENHANCED PAYOUTS"; the entirety of each are incorporated herein by reference for all purposes.

Additionally, in some embodiments, before a player purchases a gaming contract (e.g., using a gaming device), the player may have an opportunity to purchase or select additional contract features. In one embodiment, a small fee may be associated with each feature the player selects. In one embodiment, a player may select a particular contract with operator-specified parameters. Before contract play begins, the player may be shown (e.g., via a touch-sensitive display device) a menu offering one or more additional contract features and associated fees (e.g., "For double Royal Flush payouts, add $5 to price seen above"). A variety of such additional contract features are contemplated, including but not limited to the following examples:

Increased payout amounts (e.g., for an extra fee, a player can receive 5,000 coins for hitting a Royal Flush instead of 4,000 coins);

Increased probabilities (e.g., for an extra fee, a player can add a "Wild" card to the deck);

A greater number of winning pay combinations (e.g., a player can add a "4-Card Royal Flush In Sequence" pay combination);

A progressive jackpot feature (e.g., for an extra fee, a player becomes eligible to receive a progressive jackpot);

Bonuses or features based on the player's credit balance during the contract and/or interval remaining in the contract. For example:

- Negative balance limit (e.g., for an extra fee, a player can ensure that the player's balance does not fall beneath −100 credits);
- "Start Over" option (e.g., for an extra fee, if the player's balance is lower than some threshold amount of credits after some interval has elapsed, the player may start the session over from the beginning at no additional cost);

"Booster" option (e.g., for an extra fee, if the player's balance is lower than some threshold amount of credits and there is only a small duration of the contract remaining, the player can "boost" the player's balance back to zero or some other predetermined level);

Thus, in some embodiments, the present invention may comprise, (i) receiving a selection of an additional contract feature, (ii) receiving payment for the feature, and (iii) enabling the feature.

It should further be noted that, as described, a gaming device and/or server of the present invention may alternately or additionally be configured to determine the price of a contract based on player-requested parameters. For example, a player may choose a particular payout table, contract duration and wager amount per game play, and a price may be determined accordingly. In other embodiments, a gaming device and/or server of the present invention may be configured to determine various contract parameters based on a requested price input by a player. For example, a player may simply approach a gaming device, enter (e.g., using a keypad) or select (e.g., by pressing an icon of a touch-sensitive display screen) a particular price, and a gaming device may then output a menu of available contracts based on the price. For example, for a retail price of $20, a casino may be willing to offer any contract with a contract cost of $15 or less. Further, in one example, based on the price requested by a player and an hourly profit rate specified by an operator, a gaming device and/or server of the present invention may be configured to determine appropriate parameters of a "custom" contract. For example, if a player enters a price of $17, and an operator has entered a desired hourly profit rate of $9, the player may be offered a variety of 30-minute contracts with associated costs of $4, one-hour contracts with associated costs of $8, 45-minute contracts with associated costs of $6, and so on.

In this manner, the retail price of a gaming contract or flat rate play session may be determined. A player may then purchase a gaming contract or flat rate play session in a manner described herein, and play within the contract or session may commence.

Various additional features may then be made available to players of flat-rate sessions. Several features will now be described with respect to a video poker gaming machine, though it should be appreciated that a variety of other types of gaming devices (e.g., slot machines, video keno machines, video blackjack machines, etc.) are contemplated as being within the scope of the present invention.

Figure 30:
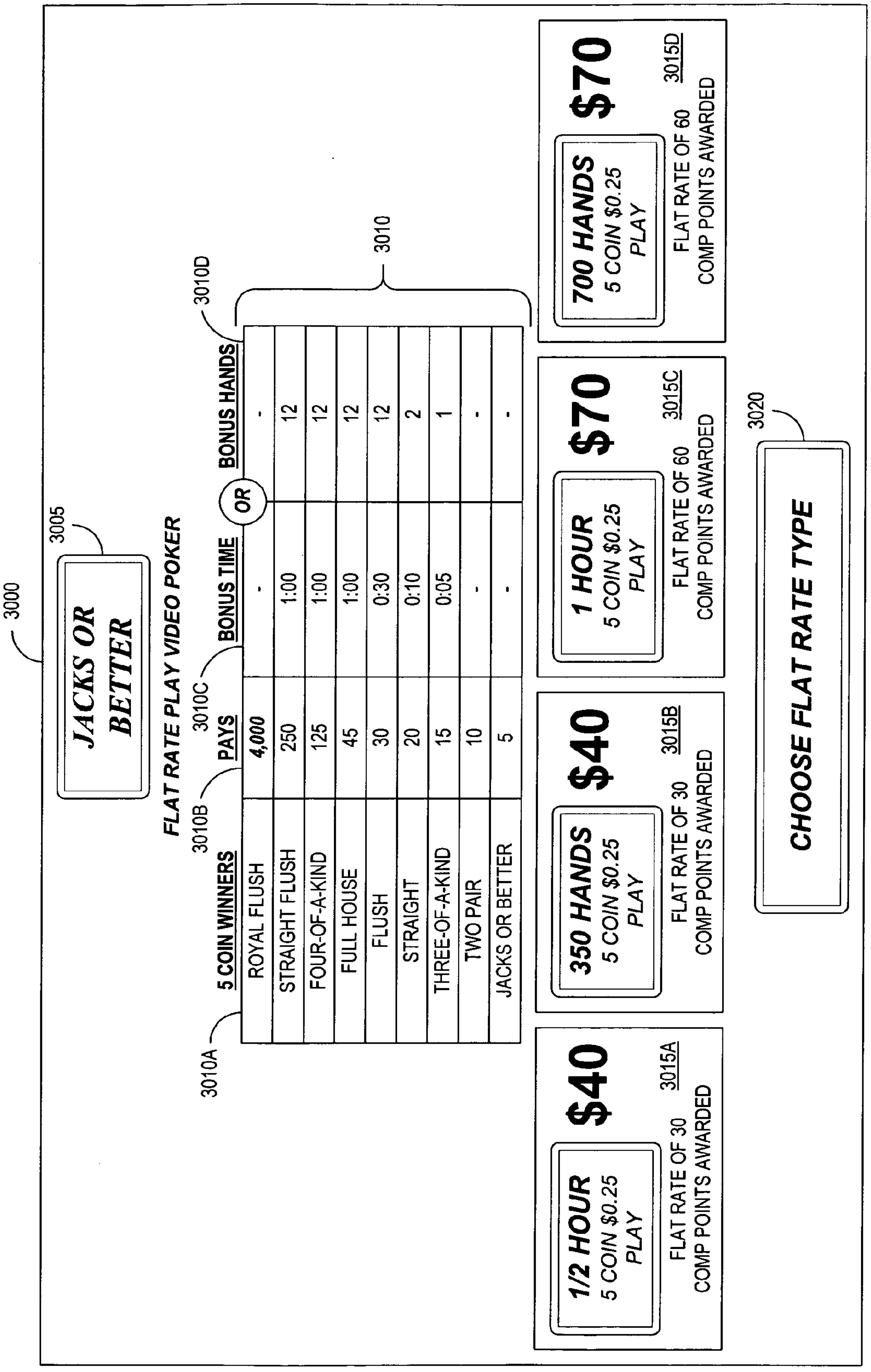
FIG. 30 is an example of information that may be presented via a display to a player who indicates a desire to purchase a contract in accordance with embodiments described herein.

In one example, wherein a contract's duration is measured in time (e.g., a 30-minute session), players may accumulate additional time by achieving certain outcomes during play or by satisfying one or more other predefined criteria. For example, a player may purchase a 30-minute session of a video poker game. The player may then, in addition to winning payout amounts when achieving certain outcomes, accumulate "bonus time." For example, as indicated by a paytable, an outcome of "Royal Flush" might pay "4,000 credits+2 minutes of Bonus Time," an outcome of "Full House" might pay "9 credits+30 seconds of Bonus Time," and so on. In another embodiment, a bonus associated with an outcome may comprise a number of bonus game plays or hands, in the case of a card game. A bonus game play may comprise, for example, a game play that a player may play, beyond the duration of the contract, without providing wagers therefore. FIG. 30, described below, illustrates one example of a paytable in which a payout for an outcome may include, in addition to a specified number of credits, one of a period of bonus time and a number of bonus hands.

In some embodiments, text and/or graphics may be output to indicate accumulated bonus time to a player (e.g., a separate clock icon keeps track of the bonus time the player wins). In one or more embodiments, players may then be allowed to utilize accumulated bonus time upon the conclusion of a gaming session (e.g., after 30 minutes expire, a player can then "play out" any bonus time). In other embodiments, players may be presented with an option to save or store bonus time for use at a later point. For example, by pressing an appropriately labeled icon of a touch-sensitive display screen, a player may choose to store any accumulated bonus time in an account associated with the player (e.g., such that an indication of bonus time owed to the player is stored as a record of a player database associated with the player). In another example, a player may request to receive a cashless gaming ticket, the indicia thereof encoding data indicating an amount of bonus time owed to the player. In further embodiments, players may be awarded bonus time for contract play when playing gaming devices without a contract or session (e.g., bonus time is awarded much like complimentary points when players place wagers using slot machines). In still further embodiments, bonus time may be rewarded to players who agree to perform some action requested by a casino (e.g., watch a commercial for a casino restaurant, take a survey, call an 800 number and become a member of a particular program, etc.).

It should be understood that, in other embodiments (e.g., wherein a contract's duration is measured in game plays), players may similarly accumulate bonus game plays. It should further be understood that redemption or utilization of such bonus game plays or hands, in the case of a card game, may be realized in any of the manners described above with respect to redemption or utilization of bonus time.

In another example of a feature available to a player, a gaming device and/or server may be operable to track a number of consecutive wins and losses achieved by a player during a session. Players may then receive benefits based on the totals of consecutive wins or losses achieved. For example, in one embodiment, an area of a display device may be dedicated to outputting a consecutive number of winning poker hands that a player has achieved. If the player achieves a threshold number of consecutive winning poker hands, the player may then win a progressive jackpot. In some embodiments, a gaming device may be configured such that a session cannot end on a winning hand (e.g., even if the player runs out of time/hands, the player may still have a chance to win the progressive if the player begins to amass a streak of winning outcomes toward the end of a session).

In another example, an area of a display screen may indicate a number of consecutive losing hands, and if a certain threshold number is reached, a player may be provided with a benefit (e.g., a clock indicating time remaining within the session is "frozen" or stopped until a player achieves a winning hand). It should be understood that various other benefits can be made available based on consecutive wins and losses achieved during a session (e.g., rather than "freezing" a clock, a clock is "slowed down," etc.). Additionally, various graphic indications of such benefits are contemplated (e.g., a clock icon appears "frozen"; as players accumulate consecutive winning hands, a thermometer rises; etc.).

Players might also receive benefits based on their credit balance during a gaming session. In one example, if during a gaming session a player's balance is sufficiently negative (e.g., beneath a threshold number of credits), the player may receive increased payout amounts associated with various outcomes (e.g., Full House pays triple when players are below −100 credits). Plays might also receive additional video poker hands (e.g., receive the ability to draw to three poker hands simultaneously) when a balance is low.

Such benefits may also be awarded based on the time that has elapsed during the session or that time that remains within the session (e.g., the interval remaining). For example, during the last minute of a flat rate video poker session, players may receive increased payout amounts associated with certain outcomes.

In some embodiments, players may receive benefits based on accumulated outcomes, cards, symbols, and so on. For example, during a 30-minute video poker gaming session, if a player is able to collect 40 "Ace" cards, the player may win a bonus payout. In another example, a player may be paid a bonus if the player achieves a plurality of various winning outcomes within a session (e.g., if the player achieves five each of flushes, straights, 3-of-a-kind, etc.). In another embodiment, a payout amount associated with an outcome may increase or decrease depending on how many times the outcome has been achieved during a session. For example, a player may be paid six coins the first time a flush is received, eight coins the second time it is received, and so on. In yet another example, if a player achieves a certain feat within the session (e.g., achieves a certain number of consecutive winnings hands, achieves a number of winning hands during a period of ten minutes, achieves a certain total payout amount at the end of the session, maintains a certain rate of play, etc.), the player may receive an opportunity to enter the player's initials such that they are output by a gaming device or peripheral device associated therewith (e.g., a large display screen above a bank of machines indicating "high scores"). In further embodiments, such data regarding player accomplishments (e.g., "high scores," "top players," "top hands," etc.) may be stored in a database, and may be "sortable" (e.g. upon player input) by (i) a given time period (e.g., "Top winners today" or "Top winners all-time"), (ii) one or more machines on which the accomplishment occurred (e.g., "Top hands on this machine"), (iii) wager amount per game play (e.g., "Top $0.25 players"), (iv) player (e.g., "Tom's best hands"), and so on. For example, a player may press an icon of a touch-sensitive display screen (e.g., "See top players all-time") such that certain data may be accessed and/or output.

In some embodiments, video poker players may also receive an option to "surrender" a starting hand or hand that is initially dealt in association with a game play (e.g., forfeit a starting poker hand, such that a payment is received and the hand eliminated before the hand is drawn to). For surrendering the hand, players may receive a payout amount. For example, a player may be dealt an initial hand of 2h-2c-10d-2s-Kc. Thus, before drawing, the player knows that at worst, by holding the 2h-2c-2s, he may be entitled to a payout for 3-of-a-Kind. However, the player also understands that by holding the 2h-2c-2s and drawing two more cards, the player also has an opportunity to attain 4-of-a-Kind or a Full House (which would result in greater payout amounts than the 3-of-a-Kind). However, there is also a chance that the player will draw two unhelpful cards, leaving the player only the payout for the 3-of-a-Kind. Accordingly, when the player is dealt the initial hand, the present invention contemplates an "Instant Pay" feature, which may provide a payout amount for the player to surrender the hand without drawing to it. The payout amount may be equal to the expected value of the starting hand. Thus, the payout amount associated with surrendering an initial hand may be larger than any payout amount the player is guaranteed to achieve in a final hand based on the initial hand (e.g., the surrender payout is greater than the payout for 3-of-a-Kind), but less than any payout amount the player might achieve if the player holds the appropriate cards and deals to the hand (e.g., the surrender payout is less than the payout for 4-of-a-Kind or Full House). It should be noted that one advantage of such an embodiment is that it may allow players to rapidly surrender hands when they feel the chances of improving the hand are unfavorable, and thereby play more hands per unit time.

In some embodiments of the present invention, as described, a parameter of a contract may comprise a standard wager amount per game play (e.g., a player buys 30 minutes of video poker play, wherein the player may wager only $0.25 each hand). In some embodiments of the present invention, a player may be allowed to alter an amount wagered per game play while in the middle of a contract.

For example, a player who has paid an up-front, flat price of $40 for 30 minutes of video poker play at $0.25 per hand may decide he wishes to increase his wager amount per game play for the remainder of the session (e.g., as is known in the art, by wagering more, the player may be entitled to win relatively larger payouts as indicated by a paytable). The player may be allowed to do so, so long as the player agrees to accept an offsetting change in another contract parameter that effectively retains the same contract cost. For example, if a player has 18 minutes of play remaining when the player requests an increase in the wager amount per game play from $0.25 to $0.50, the request may be approved, but only if the player agrees to a nine-minute reduction in session length. In some embodiments, even though the contract cost may remain constant should a player increase a wager amount per game play and accept a shortened contract term, such an arrangement may still be advantageous for a casino (e.g., because the gaming device may sooner become available for play of another flat-price contract). Accordingly, a gaming device may be configured to periodically offer to a player an opportunity to increase a wager amount per game play as described (e.g., every five minutes or once per session, a text message is output via a display screen). It should be noted that, conversely, a player may be allowed to decrease a wager amount per game play and in return receive an extension on the length of an outstanding contract.

Figure 36:
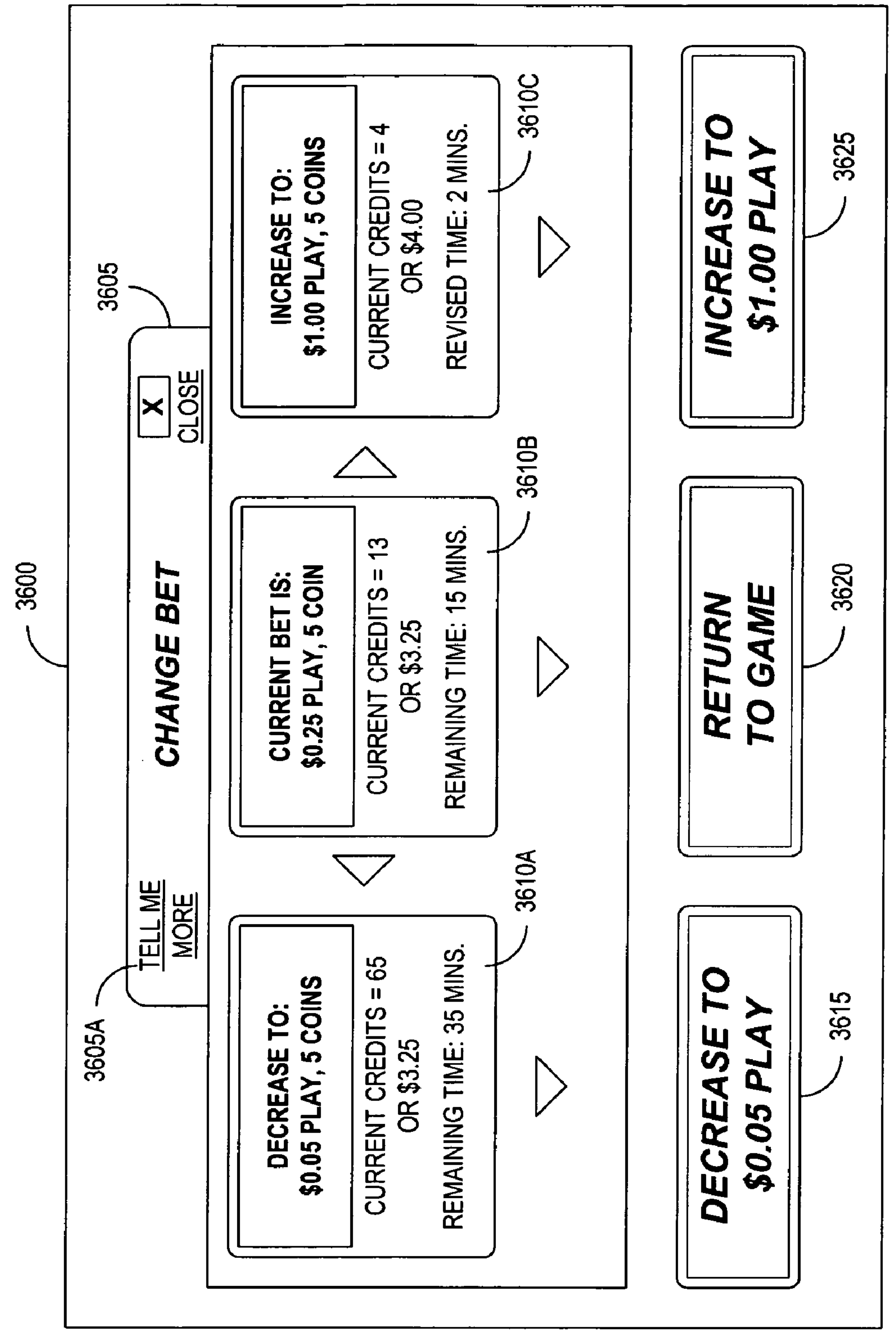
FIG. 36 is an example of information that may be presented via a display to a player who has purchased a contract in accordance with embodiments described herein.

FIG. 36, described below, illustrates an example screen that may be output to a player, via which screen the player may change a wager amount in the midst of executing a contract.

In another example, a player may wish to increase or decrease a wager amount in association with one hand only (e.g., similar to doubling down in Blackjack, a player may "double his bet" on a given hand). Accordingly, before the hand is dealt, a player may signal such a desire using an input device (e.g., a button labeled "Double bet this hand"). In some embodiments, a player may be allowed to increase a wager amount in such a manner a limited number of times during a gaming session, depending on the session's length (e.g., twice per thirty minutes, up to five times per hour, etc.).

As stated, in some embodiments, a player may be allowed to increase a wager amount by agreeing to an offsetting decrease in interval remaining; accordingly, in one embodiment, if a player would like to double his wager on a particular hand, he may do so, but an interval remaining might be decremented at a faster rate while the player plays the hand (e.g., a "time remaining" clock moves twice as fast during the hand, then resets to "normal speed" once the hand is complete).

It should be noted that a variety of other poker games besides 5-card draw poker may be available to players. For example, in one or more embodiments, players may purchase flat rate play sessions for stud poker games. For example, in one embodiment, players may elect to play a 7-card stud game (e.g., wherein players are dealt seven cards per game play, from which the best possible 5-card hand is constructed). In another embodiment, players may play a 5-card stud game. A 5-card stud game of the present invention may comprise various additional features or benefits available to players.

In one example of such a 5-card stud game, a "Royal Flush Helper" feature may be available. Accordingly, in some embodiments, a gaming device may be operable to (i) deal an initial 5-card hand (e.g., "Ac-Kc-Qc-8h-7s", (ii) determine whether or not the hand comprises a number of cards that may be used to achieve a Royal Flush (e.g., "Ac-Kc-Qc" are cards that might normally be held by a draw poker player if the player were attempting to draw toward a Royal Flush), (iii) retain the cards that may be used to achieve a Royal Flush (e.g., holding the "Ac-Kc-Qc"), (iv) draw to the retained cards in an attempt to create a Royal Flush, (v) determine whether or not a Royal Flush has been achieved, and if so (vi) providing a payout amount associated with the Royal Flush. Thus, a player may play a 5-card stud game, and receive payouts for various winning hands dealt to the player (e.g., a Full House). However, if the player is dealt a losing hand, and the losing hand contains at least a predetermined number of cards that may be used to achieve a Royal Flush (e.g., three or more of any Ace, King, Queen, Jack or 10 in the same suit), the cards may be held and drawn to in an attempt to achieve a Royal Flush. Thus, a stud poker game of the present convention may comprise a draw element (e.g., only certain dealt hands are ultimately drawn to, while others are not). It should be noted that various such "target" outcomes other than Royal Flush are contemplated (e.g., Straight Flush, etc.).

In some embodiments, a gaming device and/or server may be configured to detect a player exhibiting "advantage play" behavior (e.g., counting cards and/or making hold/discard decisions based on "perfect" strategy). Various player behavior may be considered advantage play, including but not limited to skillful or "perfect" play of a game such as video poker, frequent requests to pause a gaming session, volatile swings in wagering activity, and so on. Upon detecting such advantage play, a gaming device and/or server may be configured to (i) terminate a gaming session, (ii) output a warning indication to a player (e.g., text is output via a display screen), (iii) output a subtle warning indication that might be noted by a slot attendant or other casino staff member (e.g., a small green dot appears in the corner of a screen, the screen background changes slightly in color, or a light on the side of the machine's cabinet is actuated, such that a slot manager may take notice when walking by and take appropriate action), (iv) reduce the speed at which game play occurs (e.g., increase the time in between the dealing of hands), and/or (v) prevent the player from purchasing further play (e.g., by updating an appropriate record of a player database).

In various embodiments of the present invention, a gaming device may be configured to execute a number of game plays automatically (i.e., without receiving player input in association with one or more game plays of a gaming contract or session). Various methods for administering a plurality of game plays without receiving continuous input from a player are described in Applicant's U.S. Pat. No. 6,012,983, filed Dec. 30, 1996, entitled "AUTOMATED PLAY GAMING DEVICE"; U.S. Pat. No. 6,634,942, filed Jun. 12, 2002, entitled "SYSTEM AND METHOD FOR AUTOMATED PLAY OF MULTIPLE GAMING DEVICES"; U.S. application Ser. No. 10/635,986, filed Aug. 7, 2003, entitled "SYSTEM AND METHOD FOR REMOTE AUTOMATED PLAY OF GAMING DEVICES"; and U.S. application Ser. No. 10/331,438, filed Dec. 27, 2002, entitled "METHOD AND APPARATUS FOR AUTOMATICALLY OPERATING A GAME MACHINE"; the entirety of each are incorporated herein by reference for all purposes.

In some embodiments, a player may establish a gaming contract lasting a period of time (e.g., one hour). At some point during the contract, the player may indicate (e.g., using an input device, such as a physical button or icon of a touch-sensitive display screen) a desire that a plurality of game plays are to be executed automatically (e.g., a gaming device and/or server should initiate and/or resolve at least one game play without the player pressing a "deal," "draw" and/or "hold" button).

In some embodiments, a player may set a gaming device on automatic play indefinitely. For example, while playing out a video poker gaming contract that entitles the player to an hour of unlimited hands of video poker, the player may decide he no longer wishes to press a deal button, select hold cards, press a draw button, and so on, yet still remain seated in front of the gaming device to watch game play occur. The player may actuate an input device to indicate such a desire (e.g., the player presses a button labeled "Activate Cruise Control" or "Activate Automatic Play"). Accordingly, the gaming device may be configured to continually execute game plays until (i) an input is received indicating that automatic play should be deactivated, or (ii) the number of game plays or amount of time associated with the gaming contract are used or expire. In some embodiments, such a feature may be disengaged when any area of a touch-sensitive display screen is pressed (e.g., text indicating such a condition may be output to a user during automated play). In other embodiments, certain portions of the screen may be excluded from such a disengagement feature (e.g., a small box in the corner of the screen may be pressed by a user to toggle the speed of a "cruise control" feature, such that touching anywhere else on the screen deactivates the feature).

Further, in some embodiments wherein a player may configure a gaming device to play automatically on his/her behalf indefinitely, periodic reminders may be output to the player reminding the player that such an automated play feature is engaged. Further, in some embodiments, such reminder messages may be accompanied by a prompt asking players to confirm their desire that automated play remain activated (e.g., "Cruise Control has been active for 10 minutes. Your money is still being wagered. Continue with Cruise Control?"). It should be noted that one advantage to such functionality may be the appeasement of regulatory concerns regarding automated play.

In some embodiments (e.g., embodiments involving a draw video poker game), the player commonly makes strategy decisions when the gaming device is not set for automatic play. For example, the player is typically responsible for deciding which cards of a dealt 5-card hand to hold in an attempt to improve the hand with a draw. Accordingly, in some embodiments, when a gaming device is configured to play automatically on the player's behalf, the gaming device may be operable to hold or discard certain cards of a dealt hand in accordance with strategy protocol stored within a memory of the gaming device and/or server. For example, "perfect strategy" rules may indicate, based on tested mathematical simulations, which cards of a dealt 5-card draw poker hand should be held so as to maximize the expected value of the hand.

It should be noted that in some embodiments of the present invention, perfect strategy may alter depending upon the player's credit balance. For example, if the player has a sufficiently negative credit balance, and very little time remaining in a session, the only strategy that may yield a positive credit balance may be to draw exclusively toward a high-paying outcome, such as a Royal Flush or 4-of-a-Kind (e.g., as only a substantial payout will bring the player's balance above zero credits, whereby the player would be able to collect some amount of currency at the end of the session).

Thus, in some embodiments, when a request is received to execute a number of game plays in association with automatic play, the present invention may comprise executing hold/discard decisions of a video poker game based on stored strategy rules. In some embodiments, only one preset strategy may be available (e.g., maximize expected value). In other embodiments, a player may choose from a number of strategy options for automated play (e.g., "Always maximize expected value," "Always maximize my chances of getting a winning hand" or "Always draw for the Royal Flush," etc.). Accordingly, a gaming device may execute a number of game plays, while a player watches the machine perform strategy decisions and receives payouts for winning hands. Winning outcomes may be accompanied by additional animations or sound effects to call the player's attention to the device. Various input devices may then enable the player to regain control, change the speed with which outcomes are presented, and so on.

It should also be noted that such stored strategy protocol may also be used to offer strategy hints to players, rather than be used to automatically decide which cards to hold and discard for a player when automatic play is activated. For example, various strategy recommendations may be output to a player when automatic play is not activated. Various methods of outputting such recommendations are contemplated, including but not limited to written recommendations (e.g., text is output via a display screen); auditory recommendations (e.g., a voice recording is output via audio speakers); highlighting, shading, outlining an other graphical alterations (e.g., the recommended "hold" cards are automatically outlined for the player); and so on.

In other embodiments, the player may specify a length of time or number of game plays during which automatic play should be utilized (e.g., the player sets the gaming device on "Auto-Play" for 10 minutes, 60 hands, the remainder of a contract, etc.).

In a specific example, a player in the middle of a video poker gaming contract may select a "Fast-Finish" option (e.g., by actuating an appropriately labeled input device), such that the remainder of the contract may be resolved in an expedited manner (e.g., a number of remaining hands are automatically played in rapid secession or simultaneously). In various embodiments, a number of remaining game plays associated with a contract may be determined in various manners. For example, if the duration of a contract is measured by a specific number of game plays, a gaming device may simply subtract the number of game plays that have already been initiated from the total number of game plays available to the player to determine the number of remaining game plays. In another example, if the duration of a contract is measured in time, an estimated number of remaining game plays may be determined based on the time remaining from the point at which a player selects a Fast-Finish option. In various embodiments, the estimation may be based on (i) a predetermined, fixed number of game plays per unit time (e.g., players requesting Fast-Finish are automatically rewarded seven poker hands per minutes remaining), (ii) an average number of game plays per unit time based on the player's rate of play (e.g., if the player averaged five hands per minute before requesting Fast-Finish, the player may be given five hands for each minute remaining), (iii) the greater of the fixed number and the player-specific average number, and so on.

Accordingly, a player who desires to conclude a gaming contract before it is scheduled or otherwise likely to finish may still receive at least an approximate number of game plays that the player may be entitled to. However, it should be noted that, as demonstrated by other embodiments described herein, a player who desires to leave a gaming device before a gaming contract is scheduled or otherwise likely to finish may possess a variety of options for continuing, pausing or terminating the contract.

In various embodiments, a player may leave a gaming device, and the gaming device may continue automatic play on the player's behalf. For example, a player may actuate a "Walk-Away" feature (e.g., by actuating an appropriately labeled input device) at any time during a gaming session, such that the gaming device may then be configured to continually execute game plays without further player input until (i) an input is received indicating that Walk-Away should be deactivated, (ii) the number of game plays or amount of time associated with the gaming contract are used or expire, (iii) a particular outcome is reached (e.g., a Royal Flush), etc.

In various embodiments, activating a Walk-Away feature may comprise (i) receiving a request from a player to activate a Walk-Away feature, (ii) determining a code or password which may be used to activate/deactivate a Walk-Away feature, (iii) activating the Walk-Away feature (e.g., receiving the code and automatically executing game plays thereafter), and (iv) outputting an indication that a Walk-Away feature is active (e.g., a display screen outputs a message such as, "This machine in use by Player 8160916"). As stated, a Walk-Away feature may then be deactivated upon a variety of conditions, including but not limited to (i) an input indicating that Walk-Away should be deactivated is received (e.g., a code or password is entered by a player or casino representative), (ii) the number of game plays or amount of time associated with the gaming contract are used or expire, (iii) a particular outcome is reached (e.g., a Royal Flush), and so on. Thus, a player may not be present while a gaming device executes a plurality of game plays in association with an automatic play feature.

The player may then return to the gaming device at some later point while the feature is activated, and deactivate the feature using a code or password. Thus, the player may rest assured that though the player may not be present at the machine, no other player may approach the gaming device and execute a number of game plays in association with the gaming contract (e.g., the code may be provided only to the first player, chosen by the first player as a private password, etc.).

In some embodiments, a gaming device may provide a code to a player upon the player's request of a WalkAway or other automated play feature. For example, in one embodiment, a random number may be generated or otherwise determined by a gaming device and/or server (e.g., between a range of random numbers, such as 00001-99999). The number may then be assigned to a particular player (e.g., the number is stored as a database record associated with the player), and output to the player (e.g., via a printer, display screen, etc.). In another example, a gaming device may store or otherwise communicate with a database storing a number of non-numeric (e.g., "dinosaur") or partially-numeric passwords (e.g., "purple47"), from which one may be randomly chosen, assigned and output to a player.

In other embodiments, a player may enter a desired password. In one such embodiment, a gaming device may specify (output to a player) various limitations associated with possible passwords players may choose. Various such examples are contemplated, including but not limited to: (i) each password must contain at least one numeric character, (ii) each password must be between four and eight characters in length, (iii) the password is not "Vegas," "lucky," "1234" or any other password deemed unacceptable (e.g., due to its commonality), and so on. In one example, a gaming device may store or otherwise communicate with a database containing a list of various unacceptable passwords (e.g., as specified by an operator).

In further embodiments, a player may activate a WalkAway or other automated play feature and choose not to disengage the feature (e.g., the player does not return) until after the gaming session is complete.

In either case, a player returning to a gaming device after a Walk-Away feature had been enabled may review any game plays that had occurred during the player's absence. For example, a gaming device and/or server of the present invention may be configured to store game play data in association with a particular session or contract (e.g., a database maintained within the memory of a gaming device and/or server may store game play data in association with a player identifier, session identifier, contract identifier, etc.). Such game play data may comprise, for example, an indication of (i) an outcome that was received (e.g., for a draw video poker game, a dealt five-card hand, as well as cards that were subsequently drawn to the dealt hand after a number of indicated cards were held), (ii) a payout amount associated with the outcome (e.g., 0 coins, 5 coins, etc.), and (iii) a timestamp associated with the outcome (e.g., the outcome occurred at 5:17:05 p.m.). Such data may be accessed in a variety of manners. For example, a player may indicate, using an input device of a gaming device, a desire to review such data, and the data may then be output (e.g., in the form of text and graphics) via a display device. In another example, a session may end without a player returning after activating a Walk-Away feature, and a casino representative may "cash the player out" by, for example, (i) entering an override code to gain access to the machine, and (ii) printing a cashless gaming receipt. Indicia printed upon the cashless gaming receipt may store (e.g., in a dense-pack barcode) various data regarding the session, including but not limited to various game play data described above, an indication of a credit balance or amount of currency owed to the player, etc. Accordingly, the player may then retrieve the cashless gaming receipt at a later time (e.g., by visiting a particular location within the casino and providing proper identification), and use the receipt to (i) receive funds owed to the player (e.g., by presenting the receipt at a cashier or inserting the receipt into a kiosk as is known in the art), and/or (ii) review game play data (e.g., by inserting the receipt into a gaming device, kiosk or other device operable to read the barcode, determine game play data, and output the determined game play data). In further embodiments, game play data may be sent electronic to a player (e.g., to a player's e-mail address).

It should also be noted that such game play data may be made available to any player of a gaming session or contract, regardless of whether or not the player enabled any automatic play feature.

In some embodiments, as described, a player needn't be present at the start of a gaming session or contract utilizing automatic play. For example, as described, a player may contract a casino to execute an entire gaming session on the player's behalf. For example, a player may purchase for a flat rate a gaming contract entitling the player to any net winnings after 5,000 hands of automatic video poker play. In one example, the player may specify a particular gaming device on which the contract is to be executed, and agree to a time when the contract should be completed (e.g., the following day at 9 a.m.).

A casino representative may then execute the gaming contract on the player's behalf by (i) approaching a gaming device (e.g., a device requested by a player), (ii) entering a code (e.g., using an input device such as a keypad and/or touch-sensitive display screen) enabling the representative to access a game play mode that may be unavailable to consumers, (iii) executing a number of game plays (e.g., the game plays may be executed in rapid secession or simultaneously), and (iv) executing the transmission or storage of an indication of the session results and game play data (e.g., the results are stored on a casino server, encrypted within a barcode of a cashless gaming receipt, etc.). Thus, the player may return to review the results of the contract and receive any winnings due to the player (e.g., net winnings). It should be noted that such an embodiment may be advantageous in that it may allow for a casino to administer large gaming contracts during off-peak periods when machine usage is low, and potentially provide lower contract pricing for customers.

As described, options other than those utilizing automatic play may be made available to players who wish to leave a gaming device before a contract or session is concluded. For example, in some embodiments, players may be allowed to cash out of a prepaid, flat rate session at any time, keeping any positive balance of credits, or owing nothing if a balance is negative. In other embodiments, as described, players terminating sessions early may be provided with a payout equivalent to the value of interval remaining associated with the contract (e.g., an amount a player is expected to win based on the time remaining in the contract).

Figure 34:
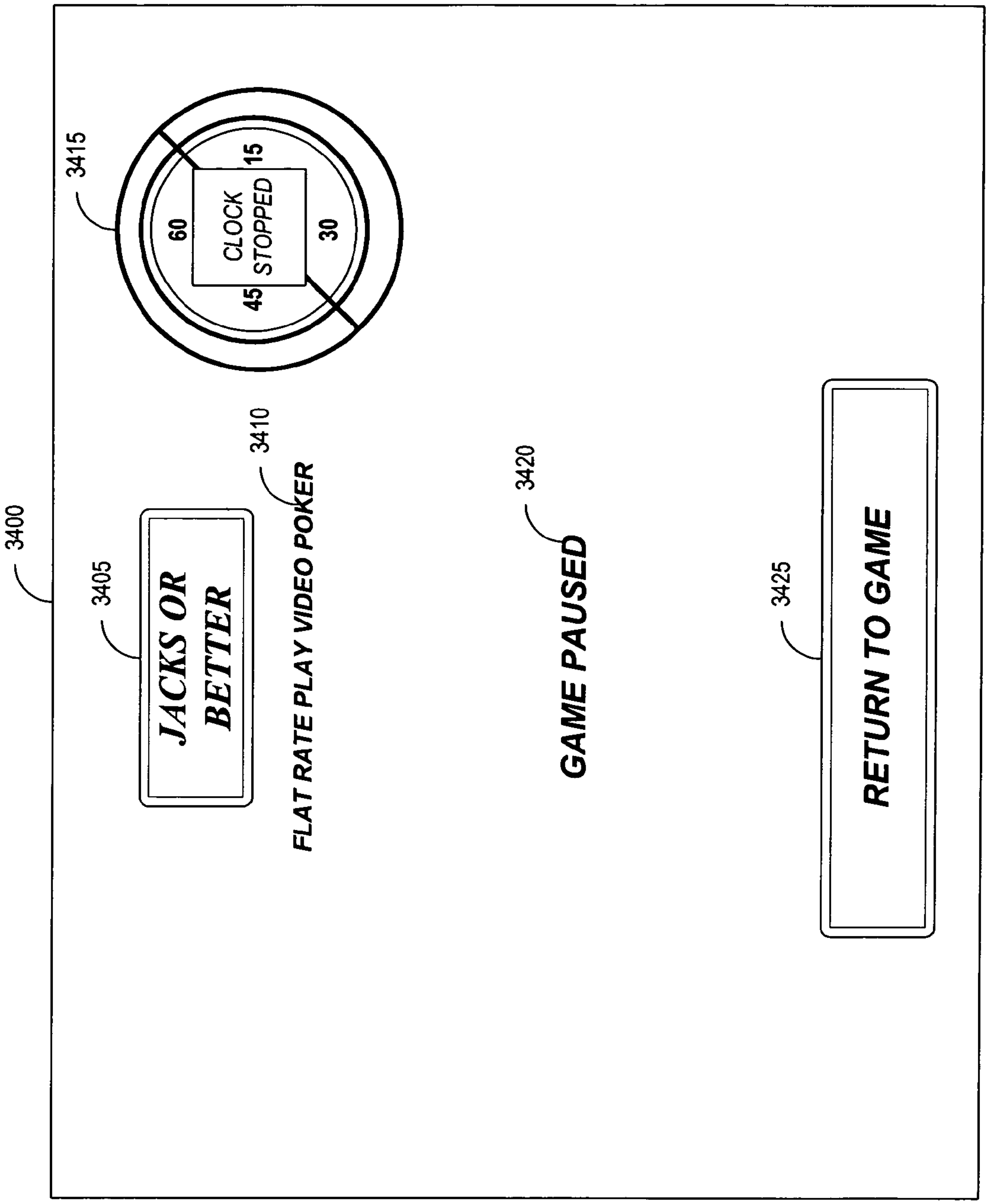
FIG. 34 is an example of information that may be presented via a display to a player who has purchased a contract in accordance with embodiments described herein.

As described above, in some embodiments wherein the interval of a gaming session is denoted in time (as opposed to game plays), players may be allowed to pause a gaming session such that an interval remaining may not be decreased (e.g., a graphic depiction of a clock stops). In some embodiments, players may request a pause by actuating an input device, but may do so only a limited number of times during a gaming session (e.g., five times per half hour). Further, such pauses may be temporary (e.g., a pause lasts only one minute). Similarly, a player might actuate an input device to "unpause" a game. FIG. 34, described below, illustrates an example screen that may be output to a player upon the player pausing a game in the midst of executing a contract.

Figure 38:
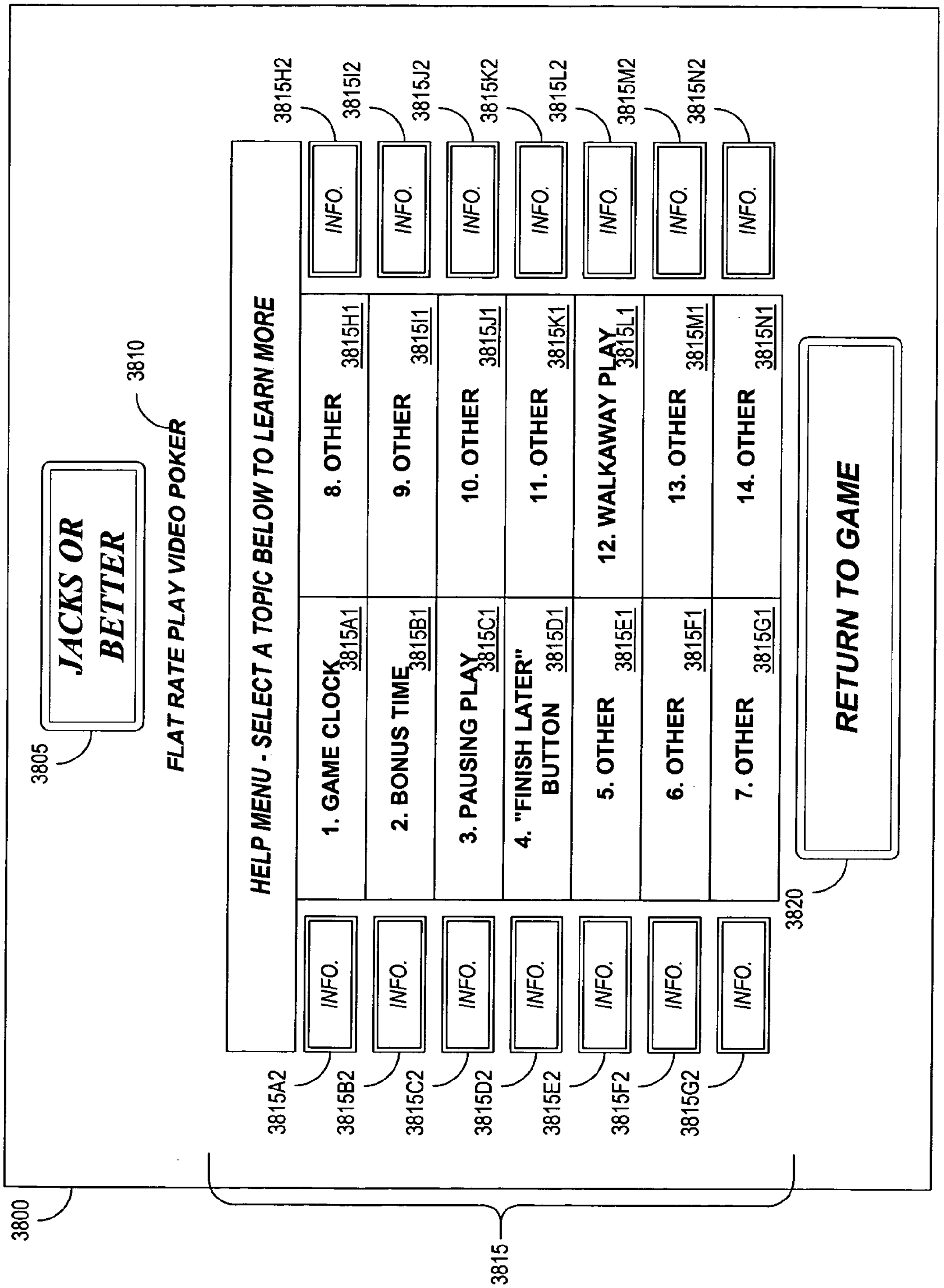
FIG. 38 is an example of information that may be presented via a display to a player who has purchased a contract in accordance with embodiments described herein.

In some embodiments wherein the interval of a contract is measured by time (e.g., a player buys 30 minutes of play), various activities other than specifically requesting time stoppage (e.g., pressing a pause button) may have the effect of suspending, temporarily or otherwise, the decrementing of an interval remaining associated with a contract (e.g., such that the time remaining is not decreased). For example, a player may access a "help" menu, or press an icon of a touch-sensitive display screen labeled "see pays" to view a pay table. Accordingly, in response to receiving such an input, a gaming device may be configured to suspend a time remaining value. In some embodiments, such a suspension may be temporary (e.g., each time a player accesses a help screen, the game pauses for 15 seconds, after which the help screen is replaced by a main game screen). FIG. 38, described below, illustrates an example screen that may be output to a player who accesses a help menu.

Further, in some embodiments, a player may be enabled to request and receive extended pauses of a gaming session by requesting a "Time Out Ticket" or other token that enables the player to subsequently resume play. For example, upon receiving such a request, a gaming device may be operable to output (e.g., using a thermal printer that may additionally print standard cashless gaming receipts) a ticket that may enable a player to resume a gaming session at a later time.

Figure 35:
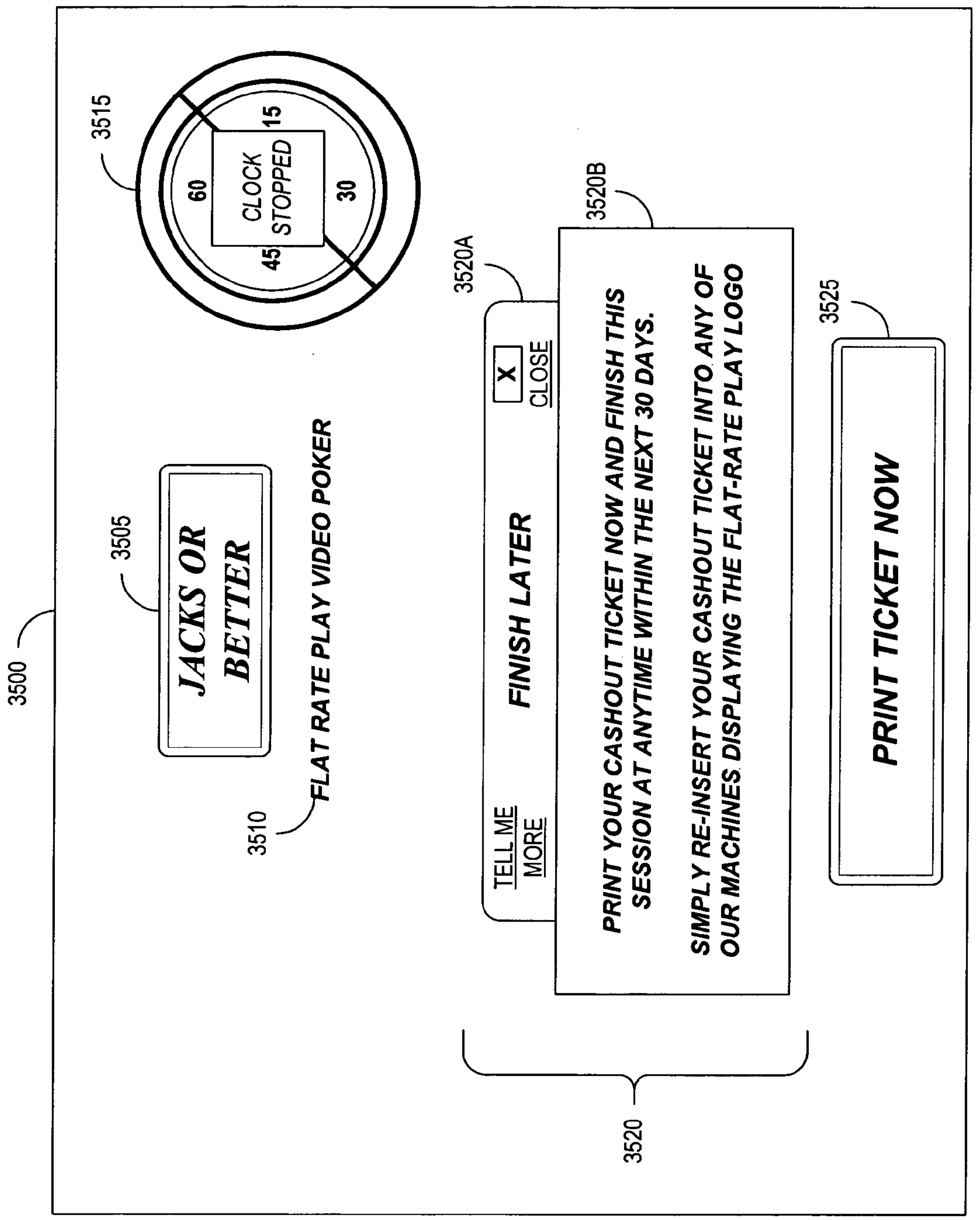
FIG. 35 is an example of information that may be presented via a display to a player who has purchased a contract in accordance with embodiments described herein.

This may be facilitated in a variety of manners. For example, in one or more embodiments, indicia of the ticket may be encrypted with session data (e.g., a credit balance, an interval remaining, etc.), such that a gaming device receiving the ticket may be operable to reconfigure various settings such that the player may resume a gaming contract from where the player left off (e.g., a clock on the screen is set to a certain time, the player's balance is set to a certain amount, etc.). The gaming device may then output a prompt requesting the player to confirm the player's desire to resume a gaming session with the indicated parameters. In another example, the indicia of the ticket may not encrypt all session data, but rather a session identifier or other identifier, such that a gaming device receiving the ticket may read the indicia, determine the identifier, and access session data associated with the identifier (e.g., data stored within a database maintained on a server). FIG. 35, described below, illustrates an example screen that may be output to a player who elects to finish a session at a later time.

In an alternate embodiment, such data (e.g., session data, a session identifier, etc.) may be stored within the memory of a smart card provided to a player. Further still, players desiring extended pauses may simply request an extended pause, and associate a PIN code with the session. Session data may then be stored within a gaming device and/or server, such that a player may enter a PIN and resume the session at any time.

In some embodiments, players completing gaming sessions (e.g., playing an entire 30-minute, pre-paid session of video poker) may be presented with a variety of options. For example, after a session expires, a gaming device may output a menu screen offering a player the opportunity to (i) cash out any balance of credits the player may be entitled to (e.g., any net winnings), (ii) exchange the credits for an alternate payment offer (e.g., an amount of merchandise, food, hotel or entertainment credit), (iii) purchase a contract extension, (iv) purchase another contract, (v) store preferences or other settings, (vi) request to be added to an e-mail list to receive promotional offers, etc. Several of these options will now be described in further detail.

In some embodiments, a player may elect to exchange a number of credits for a non-cash alternate payment offer. Alternate payment offers may be constructed such that players perceive the offers to be of a relatively high value in comparison to the monetary amount due to the player. For example, the player might be offered $20 in buffet credit instead of an $11.25 cashout value (though the provision of the buffet to the player may cost the casino less than $11.25). Various systems and methods for administering such payment offers are described in Applicant's U.S. Pat. No. 6,186,893, filed Dec. 18, 1996, entitled "SLOT MACHINE ADVERTISING/SALES SYSTEM AND METHOD"; U.S. application Ser. No. 09/570,335, filed May 15, 2000, entitled "SYSTEM TO DETERMINE CASINO OFFERS"; U.S. application Ser. No. 10/156,576, filed May 24, 2002, entitled "METHOD AND APPARATUS FOR GAMING WITH ALTERNATE VALUE PAYOUTS"; and U.S. Application No. 60/581,085, filed Jun. 18, 2004, entitled "APPARATUS, SYSTEMS AND METHODS FOR FACILITATING ALTERNATE GAMING DEVICE PAYMENTS"; the entirety of each are incorporated herein by reference for all purposes.

In other embodiments, a player may elect an extension of an expired contract. An extension may be similar to the gaming contract the player has completed, though the following elements may be dissimilar: (i) the extension may be of shorter duration (e.g., a 10-minute extension may be available after a 30-minute contract concludes), (ii) the extension may have a different price (e.g., if the duration is shorter, the price may be lower), and/or (iii) the player may be allowed to begin the extension period with the credit balance (positive or negative) carried over from the previous contract. Thus, the duration and starting balance of the extension may influence its price. For example, if a player's balance at the end of a contract is considerably negative (e.g., −200 credits), the extension duration is short (e.g., five minutes), and the extension stipulates that the player must begin with the ending balance of the previous contract, the extension may be provided at a relatively low price (or even for free). In another example, if the player's balance at the end of a contract is considerably negative (e.g., −200 credits), and the extension duration is short (e.g., five minutes), the player may be sold an extension with a starting balance of zero (e.g., "resetting" the player's balance), but for a higher price. In a further example, a player with a positive balance may be given the option of (i) keeping the winnings, and purchasing an extension for a first price, or (ii) forfeiting the winnings, and purchasing an extension for a reduced price. The contract cost and prices of such extensions may then be calculated in a manner similar to that described previously.

A player may also request that various settings or preferences may be stored (e.g., as a record of a database maintained within the memory of a gaming device and/or server). Any type of customizable parameter of a gaming device may be stored as a preference, including but not limited to colors, card or symbol themes, preferred payout structures, the speed with which reels spin or cards are drawn, preferred automatic play settings, music or sound options, language, and so on. Methods for customizing gaming devices are described in Applicant's U.S. Pat. No. 6,068,552, filed Mar. 31, 1998, entitled "A GAMING DEVICE AND METHOD OF OPERATION THEREOF"; U.S. Pat. No. 6,110,041, filed Dec. 30, 1996, entitled "METHOD AND SYSTEM FOR ADAPTING GAMING DEVICES TO PLAYING PREFERENCES"; and U.S. application Ser. No. 10/361,201, filed Feb. 7, 2003, entitled "A GAMING DEVICE AND METHOD OF OPERATION THEREOF"; the entirety of each are incorporated herein by reference for all purposes.

In some embodiments, a video poker game may offer a bonus feature to players who purchase flat rate sessions. A variety of such bonus games and bonus features are contemplated.

In one example of a video poker game with a bonus feature, a bonus feature may persist or run in parallel to a primary poker game. For example, in addition to a common five-card draw game, such as "Jacks or Better" or "Double Double Bonus Poker," one or more display screens continuously depict a bonus feature.

In various such examples, the bonus feature may be collection-based. For example, the goal of the game may be to collect certain indicia or groups of indicia (e.g., in a video poker game, to collect certain cards or groups of cards). Several embodiments are contemplated in this regard. For example, the goal of the game may be to collect as many "hearts" as possible during a course of a session, and a bonus payout at the end of the session may be based on the number of hearts collected (e.g., a player collecting a number of hearts within a first range may receive a first payout amount, a player collecting a number of hearts within a second range may receive a second payout amount, and so on). Any type, group or designation of cards may be collected in this regard (e.g., players collect "hearts," "face cards," "Aces," "odd-numbered-cards," "Queen of Diamonds and so on). In some embodiments, players may be required to collect a target number of cards to receive a bonus payout, and this may occur several times during the course of a session (e.g., each time a player collects 50 spades, the player is awarded a payout, and a collection total is reset to 0). In other embodiments, players must collect various combinations of cards in order to receive a payout (e.g., players must assemble a royal flush in spades, collect all four Ace cards, collect every diamond card, etc.).

Various methods of "collecting" cards are contemplated. In one or more embodiments, each card dealt to a player may be considered "collectable" (e.g., if the goal of a collection-based bonus feature is to collect hearts, each heart card dealt to a player may be duplicated and displayed as a collected card or otherwise added to a collection total). In other embodiments, only drawn or held cards may be considered collectable (e.g., in order to have a dealt 8c "collected," the player must decide to hold the card). In further embodiments, only cards dealt or drawn to a certain position or in a certain order may be considered collectible (e.g., in order to be collected, a particular card must be dealt or drawn to the fourth of five card positions). In still further embodiments, only discarded cards may be considered collectible (e.g., to collect an Ace, a player must discard it). In still further embodiments, only cards that are part of a winning hand may be considered collectible.

Various methods of displaying collected cards or collection totals are also contemplated. In some embodiments, a "collected card area" or "collection area" of a display screen may display graphic images or text indicating one or more collected cards (e.g., as demonstrated by FIG. 25). In other embodiments, an area of a display screen or an LED meter may depict a "collection total" associated with one or more cards (e.g., a meter or counter adjacent to text reading "Collected Hearts Total" reads "27").

In some embodiments, collected cards may last a limited duration during a session before they "expire" or are otherwise removed from a collection area and/or decremented from a collection total. Methods of tracking collected game symbols (such as playing cards) and associating expiration conditions therewith are described in commonly-owned U.S. patent application Ser. No. 10/772,837, filed Feb. 10, 2004, entitled "ELECTRONIC AMUSEMENT DEVICE AND METHOD FOR ENHANCED SLOT MACHINE PLAY"; and commonly-owned U.S. Pat. No. 6,203,430, filed Oct. 1, 1998, entitled "ELECTRONIC AMUSEMENT DEVICE AND METHOD FOR ENHANCED SLOT MACHINE PLAY"; the entirety of each are incorporated herein by reference for all purposes.

For example, the goal of a collection-themed feature may be for a player to collect a number of Aces by discarding them during the course of a primary poker game as described. For example, during a 30-minute session, the goal of a collection-themed bonus feature may be for a player to discard 12 Aces in six consecutive hands (e.g., such that each discarded Ace is sent to a collection area, where it remains for only six hands after it has been discarded, at which time it "expires" and is removed from the collection area). An exemplary display screen outputting a screenshot from such a game is depicted by FIG. 25.

In such a game, a player may be awarded a relatively substantial payout for achieving a goal of collecting a certain number of cards, for several reasons. First, because collected cards expire after a particular duration (e.g., this duration may be fixed or variable, as described in Applicant's previously referenced material), it may become challenging for players to amass enough cards to earn a payout, as collected cards will frequently be expiring. Secondly, a gaming device may fund a lucrative bonus payout and still maintain a desired house edge and primary game payout structure, because players must choose whether to hold Aces to play for payouts in the primary game (e.g., if a player is dealt three Aces, the player holds the Aces to earn a payout for an outcome of 3-of-a-Kind, 4-of-a-Kind or Full House), or discard Aces to play for larger payouts via the collection bonus feature (e.g., if a player is dealt three Aces, the player may also discard the three Aces in an attempt to collect a target amount). In other words, the existence of the bonus feature may serve to substitute for payouts from the primary game, as players may discard cards that otherwise may have been held to produce winning outcomes.

Figure 25:
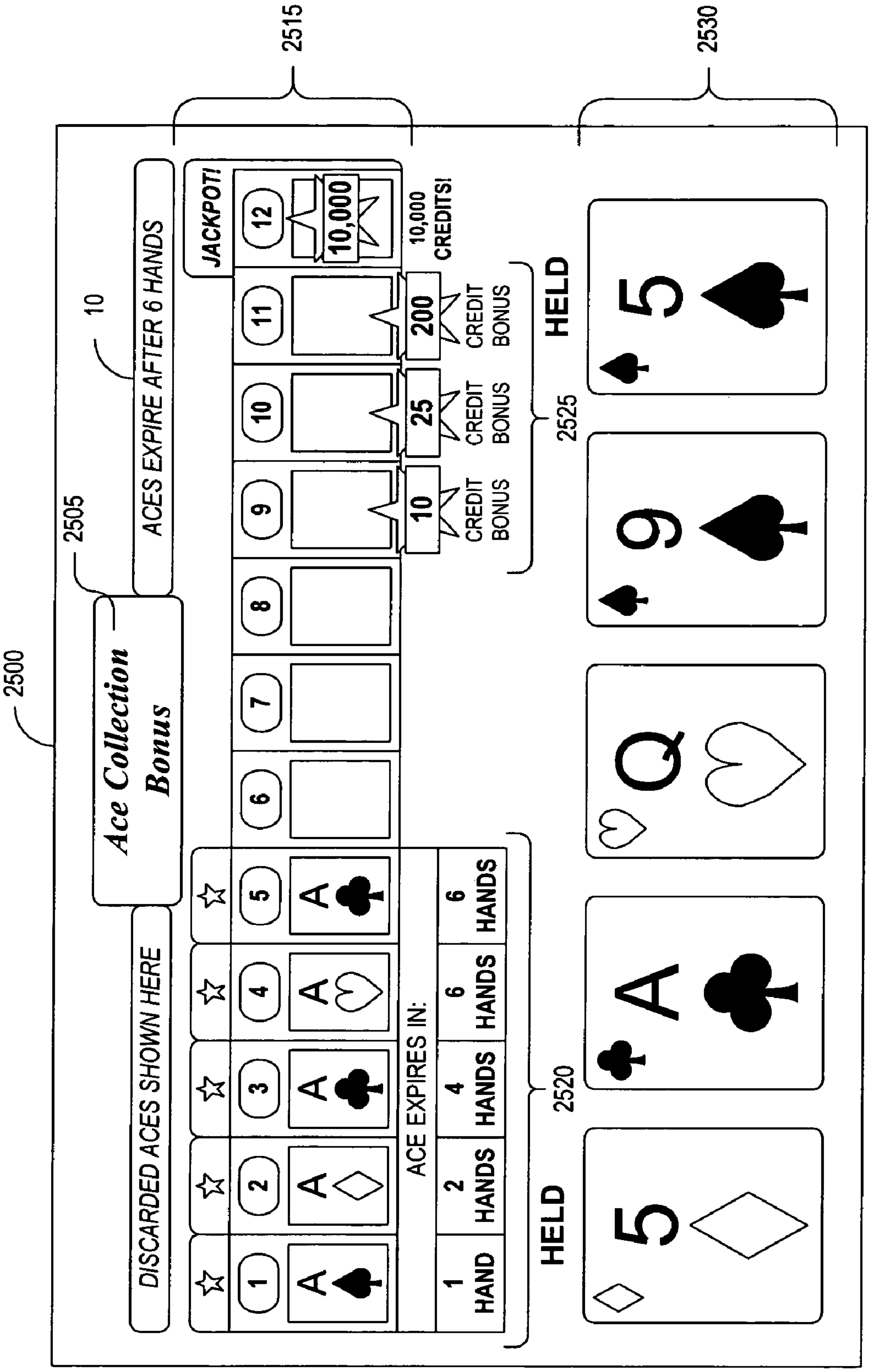
FIG. 25 is a plan view of a game screen according to some embodiments of the present invention.
Figure 26:
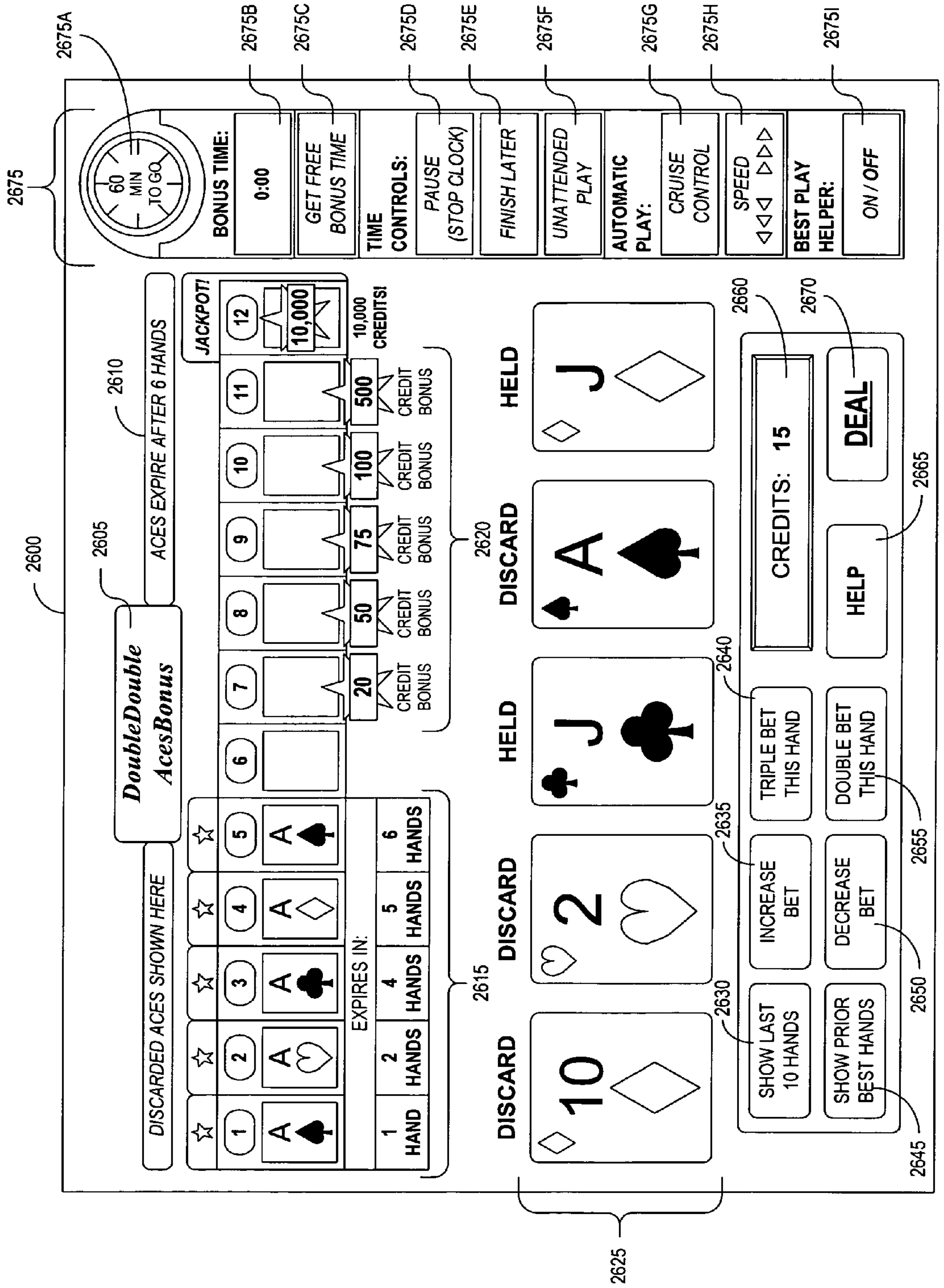
FIG. 26 is an exemplary output of a game screen according to some embodiments of the present invention.

Additionally, as depicted by FIG. 25, payouts may be awarded in "tiers" for achieving various goals. For example, a player may be awarded a jackpot of 10,000 coins for collecting 12 discarded Aces in six hands, or smaller payouts of 200 coins for collecting 11, 25 coins for collecting 10, and so on.

In one or more embodiments, a gaming device may be configured to analyze and/or store player decisions with respect to holding and discarding cards. For example, if on one or more instances a player is dealt a single ace along with a number of other suited cards (e.g., the player is dealt Ah-7h-Jh-5c-10d), such that the player has "three cards to a flush," and the player chooses to hold the suited cards (rather than discard the ace), a gaming device may be configured to store an indication of the player's choice given the particular hand (or type of hand). A historic decisions database in communication with the gaming device may be used to store such historic hold/discard decisions in association with a player. For example, a database may indicate possible combinations of cards that a player may initially be dealt (e.g., Ah-7h-Jh-5c-10d is one combination). The database may also indicate possible "hold choices" along with each initial hand dealt to a player (e.g., in association with Ah-7h-Jh-5c-10d, the player may choose to hold Ah-7h-Jh, etc.). Further, such a database may indicate a number of instances which a player elected to pursue a particular strategy (e.g., when dealt Ah-7h-Jh-5c-2d, the player held Ah-7h-Jh 12 times and Ah three times, as indicated by an "actual held cards" field of such a database). An exemplary data structure of such a database follows.

PLAYER P-102737

| INITIAL/DEALT HAND | HELD CARDS CHOICE 1 | HELD CARDS CHOICE 2 | HELD CARDS CHOICE N | ACTUAL HELD CARDS |
|---|---|---|---|---|
| Ah-7h-Jh-5c-10d | Ah-7h-Jh | Ah | (no cards held) | 1 |
| Ah-7h-Jh-5c-2d | Ah-7h-Jh | Ah | (no cards held) | 1 (×12), 2 (×3) |
| Ah-7h-Jh-5c-3d | Ah-7h-Jh | Ah | (no cards held) | — |
| Ah-7h-Jh-5c-4d | Ah-7h-Jh | Ah | (no cards held) | — |

It should of course be understood that rather than various "initial/dealt hands" may be considered substantially similar in their nature, such that it may be assumed that if a player made a strategic hold/discard decision in association with a first hand (e.g., Ah-7h-Jh-5c-4d), the same decision may apply to a second hand (e.g., Ah-7h-Jh-5c-3d). In some embodiments, a database may store indications of such "like hands."

In this manner, historic play decisions may be stored in association with a particular player. In some embodiments, automated play may then be based on such historic play decisions. For example, if a player executes a "cruise control" feature as described, a gaming device may be configured to (i) deal an initial hand, (ii) determine whether or not historic play decision data exists in association with the hand (or one or more similar hands), and if so (iii) execute hold/discard decisions automatically based on the data. In some embodiments, if no data exists in association with the hand (or one or more similar hands), the gaming device may execute hold/discard decisions automatically based on stored default "perfect strategy" rules.

In further embodiments, a variety of other parameters may be measured and/or stored when a play decision is stored, including but not limited to (i) a number of collected cards, (ii) an expiration value associated with one or more collected cards, (iii) a current credit balance, (iv) an interval remaining in association with a session, and so on. For example, when a player is dealt an initial hand of Ah-As-Ad-5c-4d, and the player has collected eight out of 12 aces necessary to receive a substantial bonus payout, the player may discard the three dealt aces. However, if the player is dealt an initial hand of Ah-As-Ad-5c-4d (or a comparable hand) and the player has only seven aces collected, the player may decide to hold the aces. Additionally, a player may be more or less likely to discard such aces depending on an expiration value associated with one or more cards already collected by the player (e.g., if three of the player's aces expire on the next hand, and the player isn't "close" to getting a bonus payout, the player may choose not to discard the cards). In another example, if the player has a sufficiently negative credit balance, and little time remaining in a session, the player may be more likely to make an aggressive play for a larger payout amount (e.g., discarding three aces). Thus, in some embodiments, historic play decision data may consider the hold/discard decisions a player has made with respect to certain game conditions, including (i) an initial hand dealt to a player, (ii) a number of collected cards, (iii) an expiration value associated with one or more collected cards, (iv) a current credit balance, (v) an interval remaining in association with a session, and so on.

Additionally, a gaming device of the present invention may be configured to detect a player's tendency to play toward payouts from the primary game (e.g., the player almost always holds Aces) or payouts from the bonus feature (e.g., the player frequently discards Aces, even when dealt three or more). In one embodiment, in response to detecting that a player seems to be disregarding the bonus feature, a gaming device may be configured to output a message to the player promoting the bonus feature. Along with the promotional message, an additional benefit may be offered to entice the player to interact with the bonus feature by discarding cards (e.g., "Discard this Ace and get credit for two aces instead of one," "Discard these Aces and they'll last for eight hands instead of six," etc.).

A gaming device may measure whether or not a player is utilizing such a bonus feature in a variety of manners. In one example, a gaming device and/or server may monitor a "discard percentage" in association with a player, which may be determined by the following function:

$$\text{DISCARD PERCENTAGE} = \frac{\text{TOTAL ACES DISCARDED/}}{\text{TOTAL ACES DEALT}}$$

In some embodiments, it may then be determined to output a message based on the discard percentage (e.g. if the discard percentage is less than 40%, output a message). In some embodiments, the determination of whether or not to output a message may also be based on the number of total Aces dealt. For example, if the player has been dealt more than 20 Aces, and this discard percentage is less than 50%, then a message may be output to a player.

As described, a discard percentage may be associated with a player. Players may be identified in a variety of manners. In one example, it may be assumed that a single player is associated with each flat-rate play session (e.g., a discard percentage is associated with each session, and thereby with an individual player). In non-session embodiments, a player might be identified by player tracking means as known in the art, or, for example, by detecting a sustained break between consistent game plays (e.g., such that it can be assumed a new player has engaged with a gaming device if the device had been idle for a period of time).

Example Screens of Gaming Device

Reference will not be made to FIGS. 27 through 42, each of which is an example screen that includes information that may be output in accordance with some embodiments of the present invention. It should be noted that any and all of the screens, and any and all information depicted thereon, may be output via a device other than a gaming device. For example, in one embodiment a kiosk may output the screens of FIGS. 27 through 31 while a gaming device may output the screens of FIGS. 32 through 42. It should further be noted that although the screens of FIGS. 27 through 42 are depicted as touch screens, wherein a player may make selections by touching an appropriate area of the touch screen, in other embodiments information may be output via in another manner. For example, audio may be used to output available selections to the player and the player may indicate a selection by speaking into a microphone. In another example, one or more buttons of a keypad or keyboard may be associated with selections available on a screen and the player may make selections by actuating the appropriate button(s).

Figure 27:
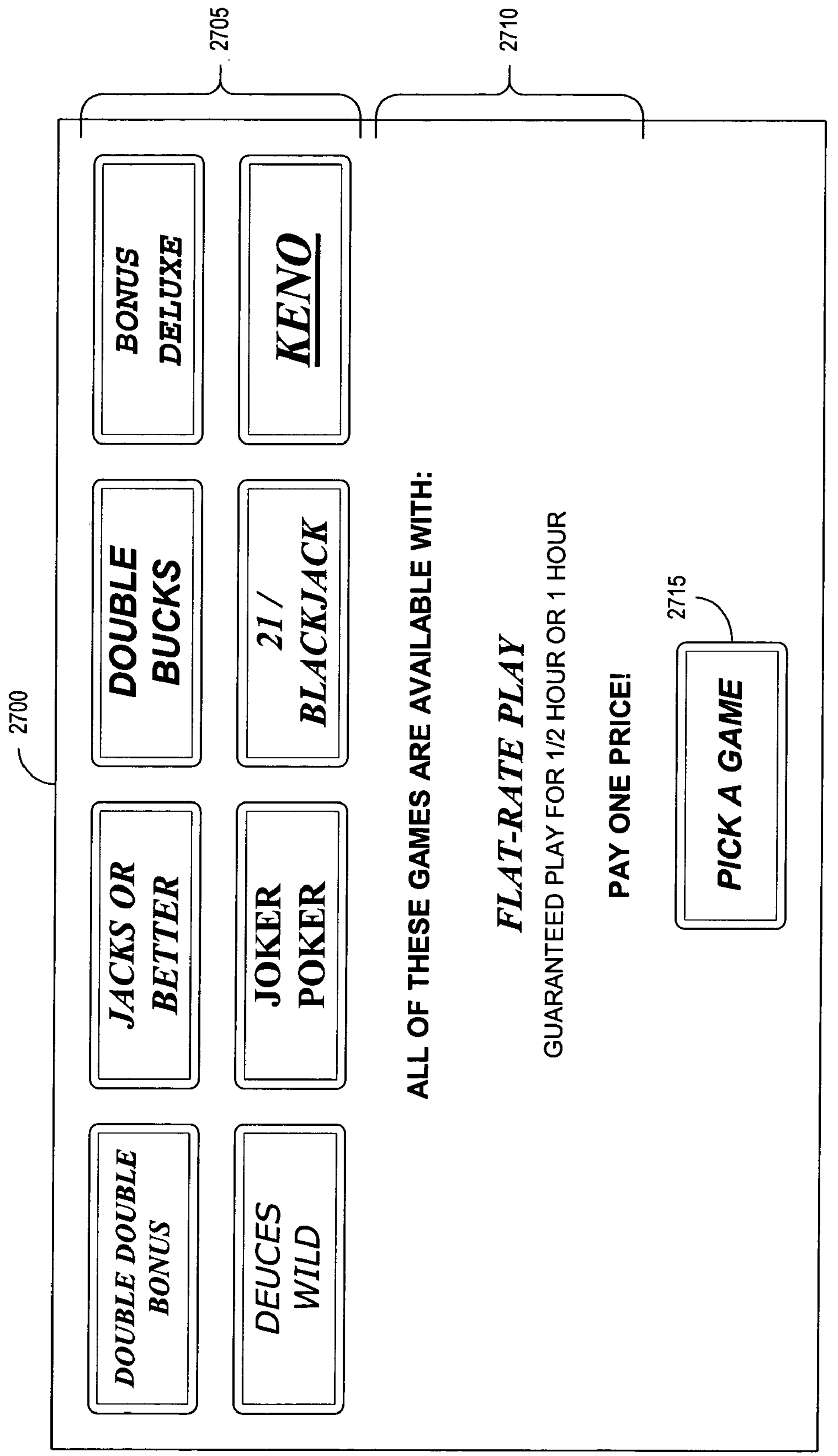
FIG. 27 is an example of information that may be presented via a display to a player who is considering purchasing a contract in accordance with embodiments described herein.

Referring now to FIG. 27, illustrated therein is an example screen 2700 depicting exemplary information that may be output to a player contemplating playing a game on a gaming device. As can be seen, the screen 2700 illustrates, in area 2705, a plurality of games that are available for play in a flat rate play mode (e.g., by purchasing a contract in accordance with embodiments described herein). It should be understood that any number of games may be made available. It should further be understood that any and all of the games made available to a player for flat-rate play may be downloadable games, in the sense that the games may be downloaded from a server device. Area 2710 of the screen informs the player that any of the depicted games are available in a flat-rate play context. Area 2715 of the screen invites the player to select one of the available games (e.g., by touching the appropriate game name in area 2705). Assuming a player selects the "Jacks or Better Game", the player may be presented with the example information of the example screen of FIG. 28.

Figure 28:
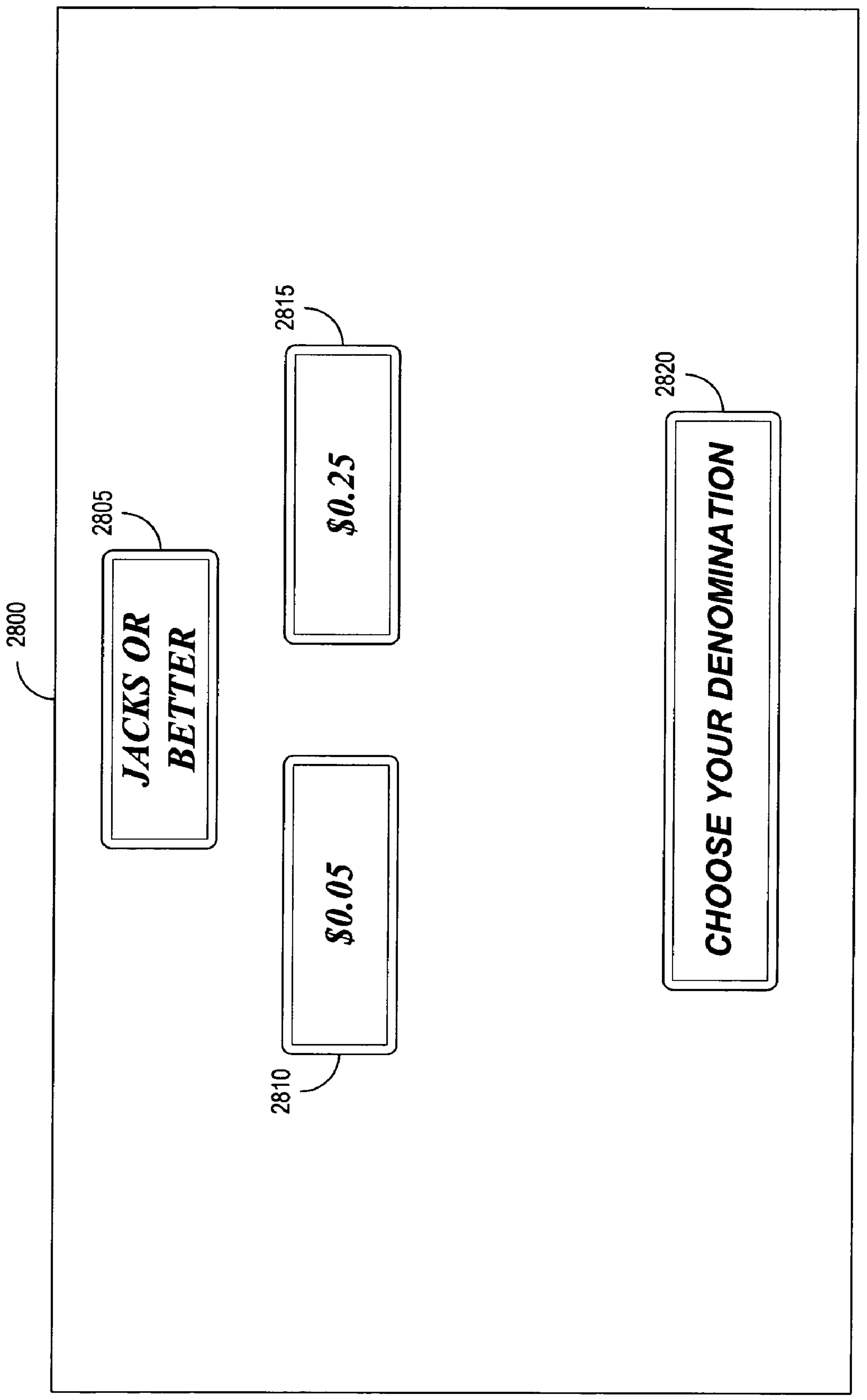
FIG. 28 is an example of information that may be presented via a display to a player who is considering purchasing a contract in accordance with embodiments described herein.

As can be seen, the screen 2800 of FIG. 28 provides to a player a choice of denominations for wagering on the selected game. The screen 2800 also informs the player, in area 2805, of the game the player selected in the previous screen 2700. The particular example denominations from which the player may choose in the illustrated example are (i) five cent play (by touching area 2810); and (ii) twenty-five cent play (by touching area 2815). Area 2820 invites the player to select an available denomination. In some embodiments, a player may be able to provide a customized denomination. It should be understood that any number of denominations may be made available to a player. Assuming a player selects twenty-five cent play, the player may be presented with the example information on the example screen of FIG. 29.

The screen of FIG. 29 outputs a choice of modes of play to a player via a screen 2900. As described herein, in one or more embodiments a gaming device may be operable to operate in both a conventional pricing mode, in which a player provides a wager per game play, and a flat rate price mode. The player may elect to participate in (i) "regular twenty-five cent play", in which the player provides a distinct wager for each game play in a conventional manner and does not play in accordance with a contract as described herein; or (ii) flat rate play, in which mode the player is provided with a guaranteed amount of time, a guaranteed number of game plays, or a guaranteed number of qualifying game plays (e.g., 50 winning game plays) for a contract price the player typically pays prior to initiating the session under the contract. In accordance with the example of screen 2900, a player may indicate a desire to participate in flat rate play, and in particular in one of the flat rate price packages indicated on the screen (i.e., guaranteed play for a half-hour or one-hour) by actuating area 2910 of the screen or a desire to participate in regular $0.25 play by actuating area 2915 of the screen. Area 2920 invites the player to select a mode of play. As described, in some embodiments, a "pricing module" may be installed in an existing gaming device (e.g., a video-reel slot machine, a video poker machine, etc.), such that when the module is installed, players of the device may elect (i) to play a game offered by the gaming device without purchasing a flat rate session or contract, or (ii) to play a game offered by the gaming device by means of purchasing a flat rate session or contract. Accordingly, in some embodiments, a gaming device equipped with such a module may feature a screen similar to screen 2900.

It should be noted that the screens of FIGS. 27 through 42 may be output in an order other than the order in which they are described in the present application. For example, a player may be presented with a choice of "flat rate play" versus "regular play" prior to selecting a game and/or prior to selecting a denomination for wagers. If, based on the information depicted in FIG. 29, a player elects to participate in "flat rate play", the player may be presented with the example information of the example screen of FIG. 30.

In the screen 3000 of FIG. 30, a player may be presented with a plurality of contracts or flat rate play packages. Each package may be associated with a respective price and respective terms or parameters of play. Area 3005 of the screen informs the player of the game that the player previously selected (Jacks-or-Better) and to which the presented flat rate price package applies. Area 3010 outputs to the player the payout schedule associated with each of the respective flat rate play packages. In particular, (i) sub-area 3010A informs the player of the respective winning sets of indicia that may be obtained in playing the selected game; (ii) sub-area 3010B informs the player of the respective amount of credits that will be paid for obtaining a corresponding set of indicia; (iii) sub-area 3010C informs the player of a respective amount of bonus time, if any, that will be awarded to the player for obtaining a corresponding set of indicia; and (iv) sub-area 3010D informs the player of an amount of additional game plays, if any, that will be awarded to the player for obtaining a corresponding set of indicia. It should be noted that, in the example embodiment depicted in screen 3000, the payout schedule indicates that a player may be awarded either an amount of bonus time (e.g., the player's flat rate play session may be extended by the indicated amount of bonus time the player wins as a result of obtaining a corresponding set of indicia) or an amount of bonus game plays (bonus hands in the case of video poker) for obtaining certain sets of indicia. However, in other embodiments, a player may be awarded both a bonus number of bonus hands and a bonus period of time by which a flat rate play session may be extended.

The screen 3000 depicts a plurality of flat rate play sessions or contracts that a player my purchase for the "Jacks-or-Better" game. For example, one of the contracts, depicted in area 3015A, defines a price of $40.00, for which price the player will receive one-half hour of play of the game "Jacks-or-Better" utilizing the pay table illustrated in area 3010, in which time each game play would be for a five-coin, twenty-five cent wager. In accordance with this flat rate play session, the player would also be provided with thirty comp points upon purchasing or completing the contract (the event based on which the comp points are awarded may vary, based on the preferences of the casino, manufacturer of the gaming device, and/or designer of the game, contract or flat rate play mode).

In another example, the contract depicted in area 3015B also defines a price of $40.00, but under the terms of this contract the player would receive 350 game plays or hands of the Jack-or-Better game using the pay table depicted in area 3010, at a five-coin, twenty-five cent wager per hand (i.e., a total wager of $1.25 per game play). The player would also be provided with thirty comp points upon purchasing or completing this contract.

In yet another example, the contract depicted in area 3015C defines a price of $70.00, in exchange for which the player would receive one hour of play of the game "Jacks-or-Better", using the pay table illustrated in area 3010, at a five-coin, twenty-five cent wager per hand (i.e., a total wager of $1.25 per game play). Under the terms of this contract, the player would receive 60 comp points upon purchasing or completing the contract.

In still another example, a fourth available contract depicted in area 3015D defines a price of $70.00 for 700 hands of the "Jacks-or-Better" game using the pay table illustrated in area 3010, at a five-coin, twenty-five cent wager per hand. Under the terms of this contract, the player would be provided with 60 comp points upon purchasing or completing this contract.

Although the same pay table is illustrated as corresponding to each of the presented available contracts, in some embodiments some of the available contracts may correspond to different pay tables.

It should be noted that the pay table depicted in area 3010 is an example pay table that defines, for a plurality of possible outcomes, not only an amount of credits to be provided upon an obtainment of an outcome, but also a bonus that corresponds to the outcome. The bonus may be either a period of time or a number of game plays or hands. A bonus period of time is a period of time beyond a period of time or number of game plays defined by the contract, during which period the player may play the game without providing payment or wagers therefore. Similarly, a bonus game play is a game play a player may play, beyond a period of time or number of game plays defined by a contract, for which the player need not provide a payment or wager.

It should be noted that, if a player obtains a bonus period of time or bonus number of game plays as a result of an outcome, the player may utilize or redeem that bonus (i) immediately upon obtaining it (e.g., the clock for the contract may be paused while the player utilizes or redeems bonus); (ii) immediately upon an ending or completion of the contract during the execution of which the bonus was obtained; (iii) at another specified time (e.g., an hour after the player completes play under the terms of the contract); and/or (iv) another time. The time at which a bonus may be utilized or redeemed may be based on one or more rules specified by a casino, player, game designer and/or gaming machine manufacturer. In one embodiment, a player may be required to satisfy one or more conditions in order to redeem or utilize the bonus (e.g., play at a predetermined rate).

It should be noted that in one embodiment both a bonus period of time and a bonus number of game plays or hands may correspond to an outcome.

It should further be noted that, in some embodiments, a bonus period of time and/or a bonus number of game plays may correspond to an outcome to which no amount of credits corresponds.

It should still further be noted that, in one embodiment, whether a player is provided with a bonus period of time or a bonus number of game plays may depend on whether the player is currently playing under a contract that defines a period of time as a duration of the contract or a number of game plays. For example, if a player purchases the contract indicated in area 3015A, that defines one-half hour of play for $40.00, and the player obtains a "straight", the player may be provided with a bonus of ten seconds of time under the pay table depicted in area 3010. If, on the other hand, the player purchases the contract indicated in area 3015B, that defines 350 game plays or hands for $40.00, and the player obtains the "straight", the player may instead be provided with two bonus game plays or hands. Of course, in other embodiments, a player playing under a contract that defines a period of time as a duration of the contract may be provided with a bonus of bonus hands and vice versa.

In one embodiment, different contracts may include different additional benefits, products and/or services to be provided to a player upon purchase and/or successful completion of a contract. For example, in one embodiment a first contract includes a discount for a show at the casino, a second contract includes a free dinner at a casino restaurant, and a third contract includes a defined number of free spins at a specified gaming device or on a specified game (e.g., a new game currently being promoted). Thus, the additional benefit, product or service included in the contracts may be a factor in the decision making process for a player contemplating which contract to purchase. For example, a casino may steer players towards purchasing a particular contract by including in it a benefit, product or service of a high perceived value (e.g., a free ticket to a very popular and typically sold out show, a guaranteed reservation at a sought-after but difficult to get into casino restaurant or hotel, etc).

Area 3020 of screen 3000 invites a player to select one of the available contracts (e.g., by touching one of the areas 3015A, 3015B, 3015C or 3015D).

Figure 31:
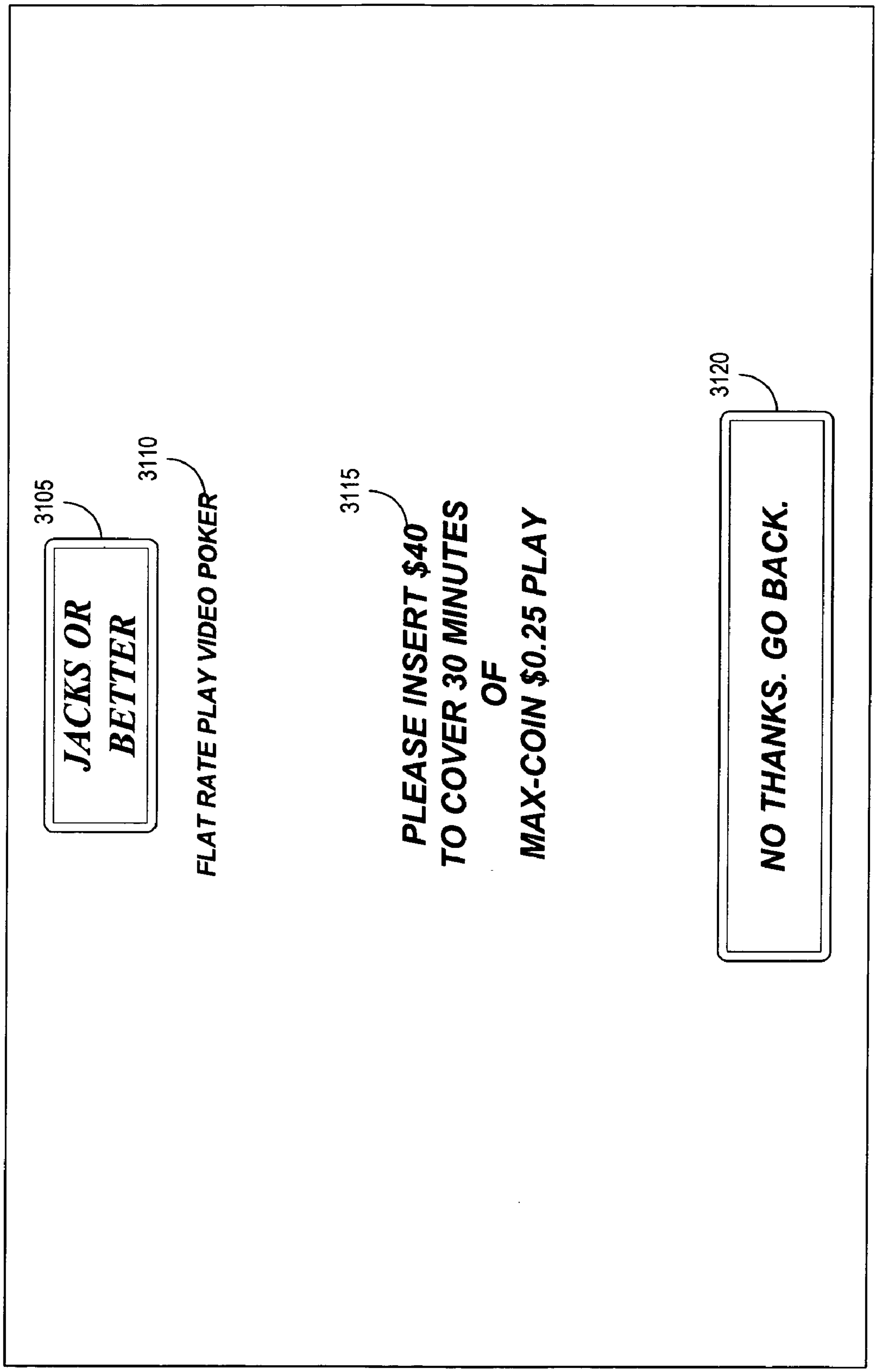
FIG. 31 is an example of information that may be presented via a display to a player who indicates a desire to purchase a contract in accordance with embodiments described herein.

Referring now to FIG. 31, an example screen 3100 is depicted that illustrates example information that may be output to a player who elects to purchase the contract in area 3015A of FIG. 30, which defines a half-hour of play of the game Jacks-or-Better for $40.00. Screen 3100 confirms/reminds the player, in area 3105, that the flat rate play session the player is about to purchase is for a Jacks-or-Better game. Area 3110 confirms/reminds the player that the player is about to enter into a flat rate mode of the gaming device. In area 3115 of the screen, the player is prompted to insert the appropriate payment for the selected contract (in this example, $40.00). The screen also enables the player, via area 3120, to change his mind and go back to select another contract.

Figure 32:
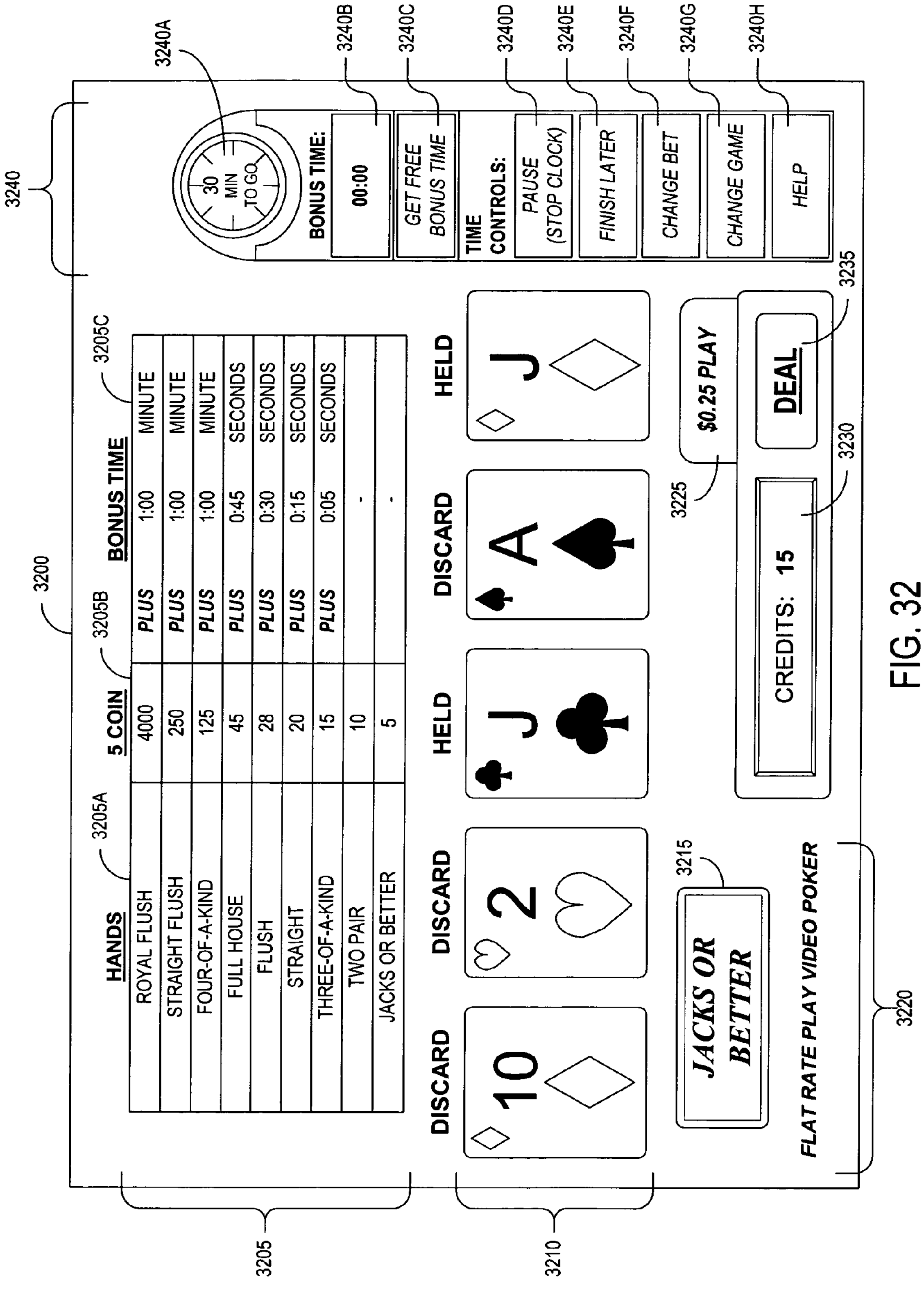
FIG. 32 is an example of information that may be presented via a display to a player who has purchased a contract in accordance with embodiments described herein.

Referring now to FIG. 32, depicted therein is an example screen 3200 illustrating example information that may be output to a player who inserts the $40.00 in response to the prompt in area 3115 of FIG. 31.

It should be noted that, in accordance with one embodiment and as illustrated in area 3230, the credit meter balance is set at the beginning of the play session to an amount different from the amount of credits corresponding to the payment for the contract. As described, in some embodiments a credit meter balance may be set to zero at the beginning of a flat rate play session despite the player having provided payment for the flat rate play session. As also described, in some embodiments, the credit meter balance may be allowed to track and reflect amounts below zero, as the player's effective wagers for each game play are subtracted from a current credit meter balance.

In some circumstances, a player may already have credits in a credit meter balance when initiating a flat rate play session. For example, a player may engage a gaming device in conventional play and, when the player happens to still have eight (8) credits remaining in the credit meter balance, the player may decide to engage in flat rate play. The player may, for example, purchase a flat rate play session for $40.00. In such circumstances, the eight (8) credits remaining in the credit meter balance needs to be dealt with appropriately. For example, upon the player indicating a desire to initiate a flat rate play session, the eight (8) credits may be dispensed to the player and the credit meter balance may be set to zero. The credits may be dispensed, for example, as coins or casino tokens via a coin tray of the gaming device, as a cashless gaming receipt, by being transferred to a player account on a casino server and/or by being stored in a temporary memory or another meter of the gaming device until the end of the flat rate play session being initiated.

It should further be noted that a clock is depicted in area 3240A of the upper right-hand corner of the screen, informing the player of the amount of time left under the purchased contract. If the player had purchased a contract that defines a number of game plays as a duration, the player may instead be informed of the number of game plays left under the contract, in a similar manner. The screen also depicts, under the clock, an indication of the amount of bonus time the player has accumulated thus far (area 3240B). Below the indication of the amount of bonus time accumulated under the contract is a plurality of touch-screen buttons 3240D through 3240H, each button corresponding to a function and menu that that player may access while executing the contract. Each of these is explained below, with reference to FIGS. 34 through 38.

Area 3205 outputs the pay table applicable to the flat rate play session. Area 3210 illustrates the current indicia for a game play and, in the case of video poker in which the indicia comprises cards, an indication of which cards are to be held and which are to be discarded (e.g., based on a player decision). Area 3215 informs the player of the game being played and area 3220 once again reminds the player that the player is operating the gaming device in a flat rate play mode. Area 3225 indicates the effective wager amount per game play (even though the player is not actually providing payment during the flat rate play session, beyond the payment the player initially provided for the flat rate play session). Area 3235 allows the player to request a dealing of cards.

Figure 33:
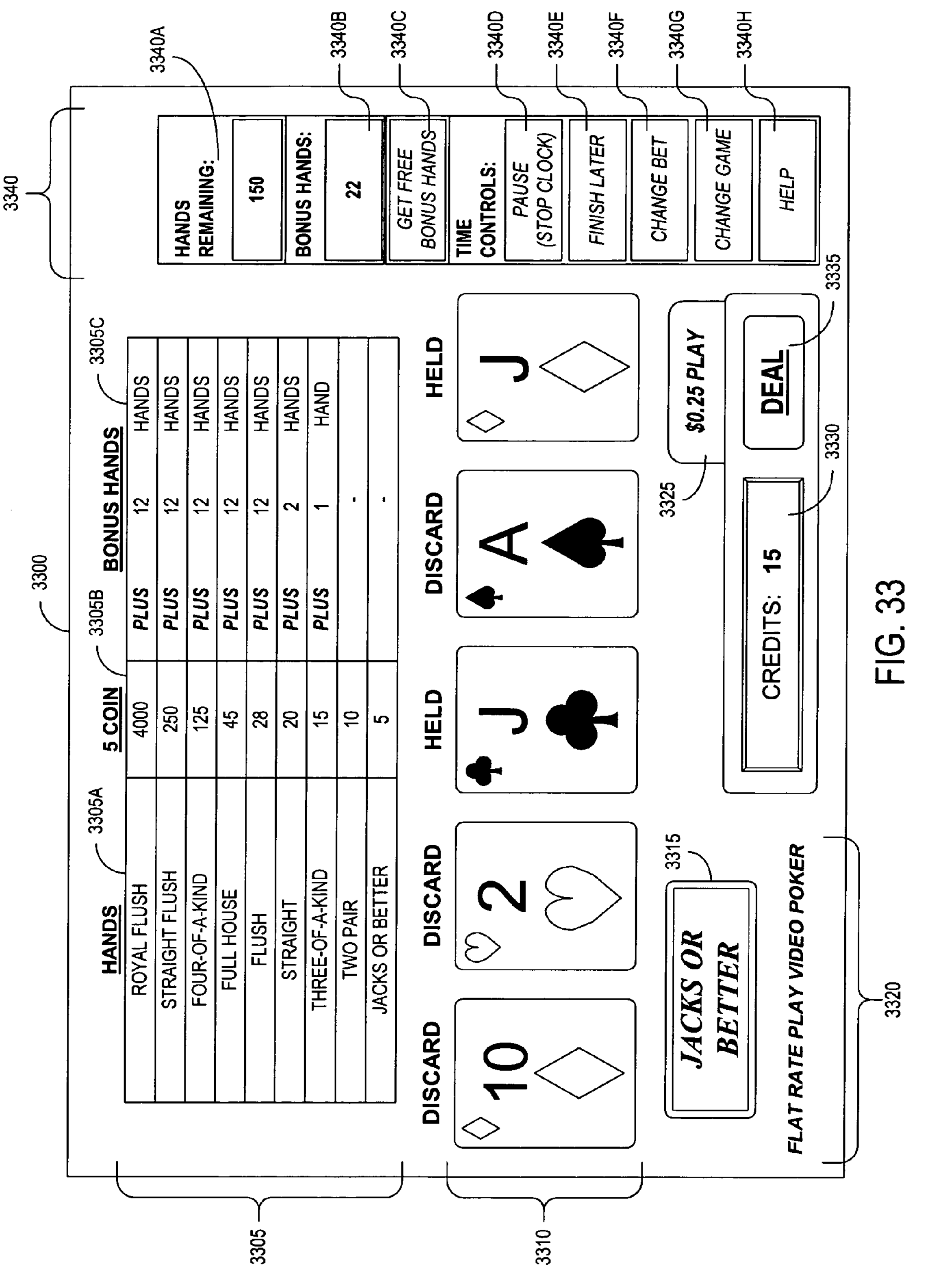
FIG. 33 is an example of information that may be presented via a display to a player who has purchased a contract in accordance with embodiments described herein.

Referring now to FIG. 33, illustrated therein is an example screen 3300 (similar to screen 3200 of FIG. 32) that may be output to a player who purchases a contract that defines a duration in terms of a number of game plays rather than a period of time. Most of the elements of screen 3300 correspond to those of screen 3200 (e.g., area 3325 illustrates a credit meter balance, as did area 3230 of screen 3200). However, the screen 3300 depicts, in area 3340A, a number of game plays or hands remaining (rather than an amount of time remaining, as was depicted in area 3240A of screen 3200) as well as, in area 3340B, a number of bonus game plays or hands being accumulated and tracked, rather than a bonus period of time (as was done in area 3240B of screen 3200).

Referring now to FIG. 34, illustrated therein is an example screen 3400 that may be output to a player who actuates the "pause" touch screen button of either area 3240D of screen 3200 (FIG. 32) or area 3340D of screen 3300 (FIG. 33). As can be seen, the screen indicates to a player, via area 3415, and area 3420, that the game has been paused. The screen 3300 also allows the player to return to the game, by actuating area 3425. As described herein, in some embodiments it may be desirable to allow a player to pause a game in order to, for example, talk with a friend, eat a snack, etc. In one embodiment, a game being played under a contract may only be paused up to a maximum amount of time. At the end of the maximum amount of time, the play session may be automatically resumed.

Area 3405 reminds the player of the game that is being played and paused. Area 3410 reminds the player that the player is operating the gaming device in a flat rate play mode.

Referring now to FIG. 35, illustrated therein is an example screen 3500 that may be output to a player who actuates the "finish later" touch-screen button in either area 3240E of screen 3200 (FIG. 32) or area 3340E of screen 3300 (FIG. 33). Area 3520 informs the player that this screen allows the player to finish the flat rate play session at a later time and sub-area 3520A allows the player to obtain further information regarding such an option. For example, a player may desire to discontinue a play session in order to use a restroom or have dinner. As illustrated by the example information output in areas 3520 and 3525 of the screen, in accordance with one embodiment a cashless gaming ticket or other indicia may be output to a player, the cashless gaming ticket or other indicia being recognizable by a gaming device such that the player may input the cashless gaming ticket or other indicia into a gaming device at a later time in order to continue the play session. As also illustrated by the example information output in sub-area 3520B of the screen, in one embodiment a time limit may be imposed upon the time during which the player may continue the play session. For example, the cashless gaming ticket or other indicia may expire if not used to continue the play session within thirty days from the time at which the player discontinues the play session. In one embodiment, such an expired cashless ticket may be redeemable for a product or service even if it is not usable to continue the session. For example, a player may exchange such an expired ticket for dinner (or a discount off dinner) at a casino restaurant or a discount off a purchase of another contract.

Area 3505 reminds the player of the game being played. Area 3510 reminds the player that the gaming device is being operated in a flat rate play mode. Area 3515 indicates to the player that the clock for the game is currently stopped. By actuating area 3525, a player may cause a cashout ticket usable for re-initiating the flat rate play session. It should be noted that, in some embodiments, other means of allowing a player to discontinue and later re-start flat rate play session may be used. For example, in one embodiment (in addition to or in lieu of printing a ticket, receipt or other document with the information), the current information regarding the player's progress in the flat rate play session (e.g., current credit meter balance at the time the session is stopped, remaining duration of the flat rate play session, bonus time and/or bonus game plays earned, etc.) may be stored (e.g., in association with a player identifier) on a server operable to communicate with one or more gaming devices, within a database maintained by a particular gaming device, and so on.

Referring now to FIG. 36, illustrated therein is an example screen 3600 that may be output to a player who actuates the "change bet" touch-screen button in either area 3240F of screen 3200 (FIG. 32) or area 3340F of screen 3300 (FIG. 33). Area 3605 informs the player that this screen allows the player to change his bet under the terms of the flat rate play session and sub-area 3605A allows the player to obtain further information regarding such an option. As illustrated, in accordance with one or more embodiments a player may be allowed to change a wager per game play under the terms of a contract, while in the midst of executing the contract. In one embodiment, the player may indicate any desired amount that the player desires the wager be changed to and the gaming device or controller may calculate (i) whether such a change is acceptable; and (ii) any adjustments to any other parameters of the contract that may be necessary and/or desirable to offset the change in the wager amount. For example, a change in a wager may only be allowed if the profit on the contract may be maintained within a desired range without decreasing the time remaining under the contract by more than 50%.

In another embodiment, as illustrated in the screen 3600 of FIG. 36, a player may be provided with a limited number of specified options as to what amount a current wager may be changed to, and the corresponding changes in any other parameters that would accompany such a change. In one embodiment, a database of such options may be stored and accessed in response to a request to change the wager amount. In one embodiment, the changes to any other parameters that would accompany the change in the wager amount may be precalculated and stored for retrieval, rather than calculated in response to a request to change the wager amount. In other embodiments, any changes to any other parameters as a result of the change in the wager amount may be calculated in response to the request to change the wager amount (e.g., based on the current credit meter balance, original price paid for the contract and time or game plays remaining). For example, the gaming device or controller in communication with the gaming device may store a sub-routine and/or algorithm for such a calculation. It should be noted that such a calculation may be performed in an iterative fashion until an acceptable combination of changed parameter values is determined.

As illustrated by the information of the screen of FIG. 36, in one embodiment a change in wager amount may result in a change in the number of credits in the credit meter balance and a change in the time remaining under the contract. Of course, if the contract being executed were one that defined a duration in terms of a number of game plays remaining, a change in the wager amount may be accompanied by a change in the number of game plays remaining.

For example, area 3610B informs the player that the current bet is $0.25, five coin play and that there are thirteen (13) credits (equivalent to $3.25) available on the credit meter balance and the remaining duration of the flat rate play session is fifteen (15) minutes. If the player desires to maintain these parameters, the player may actuate the "return to game" button of area 3620. Alternatively, the player may change his current bet, and thus the parameters of the flat rate play session, in accordance with the information in either area 3610A or area 3610C.

Area 3610A informs the player that the player has the option of changing the bet to $0.05 five-coin play, which would result in sixty-five (65) credits being available in the credit meter balance (equivalent to $3.25) and that remaining duration of the flat rate play session would be extended to thirty-five (35) minutes (rather than the fifteen at which it currently is). If the player desires to change the bet to $0.05, five-coin play, the player may actuate the button depicted in area 3615. The player may select this option, for example, if the player desires to extend the length of the flat rate play session.

Area 3610C informs the player that the player has the option of changing the bet to $1.00 five-coin play, which would result in four (4) credits being available in the credit meter balance (equivalent to $4.00) and that remaining duration of the flat rate play session would be decreased to two (2) minutes (rather than the fifteen at which it currently is). If the player desires to change the bet to $1.00, five-coin play, the player may actuate the button depicted in area 3625. The player may select this option, for example, if the player desires to finish the flat rate play session sooner.

It should be noted that, in some embodiments, a pay table may be adjusted or another pay table may be selected based on changes to a bet amount. For example, if the player selects area 3625 and thus increases his bet from $0.25, five-coin play to $1.00, five-coin play, the player may be eligible for higher payouts.

Figure 37:
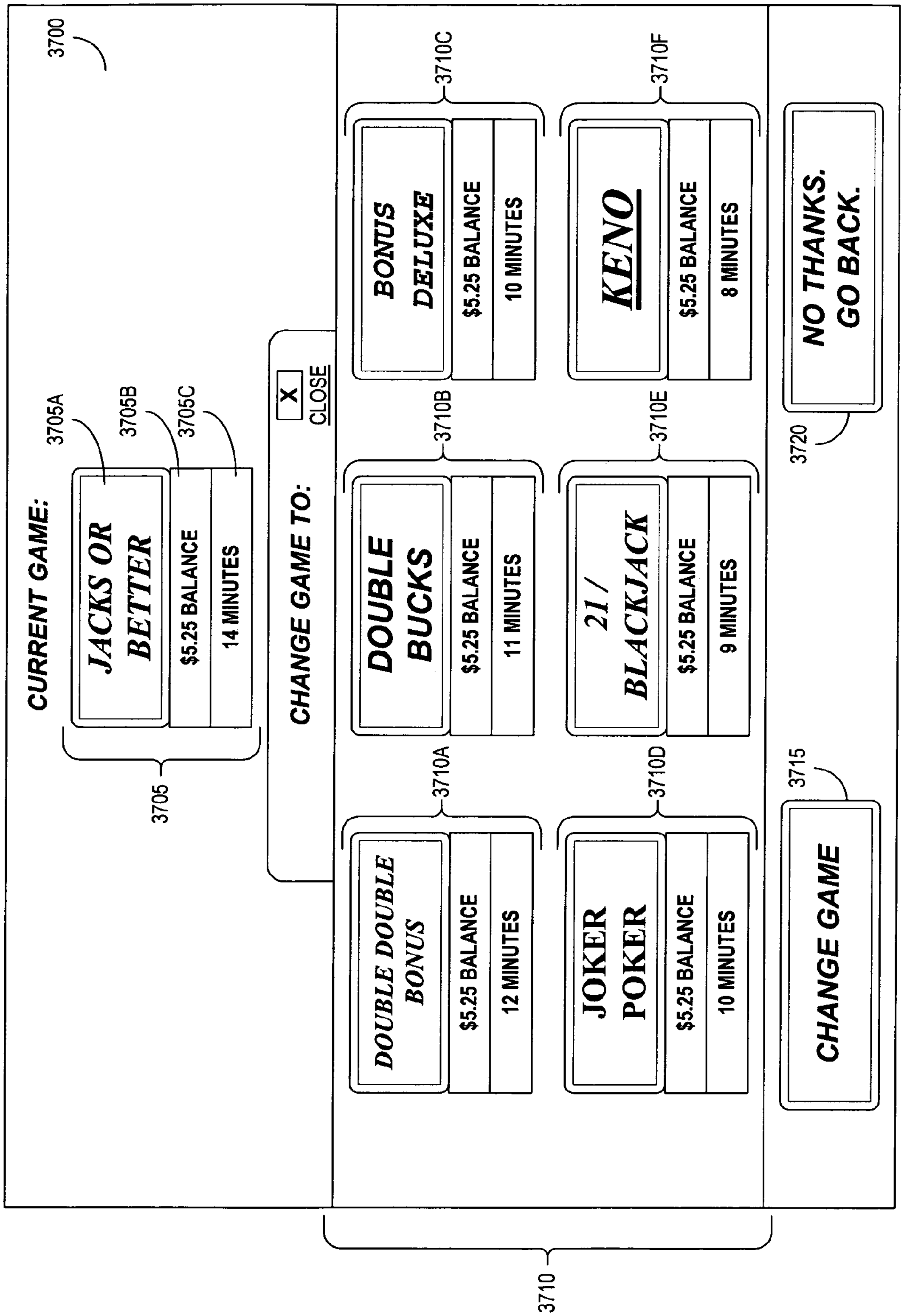
FIG. 37 is an example of information that may be presented via a display to a player who has purchased a contract in accordance with embodiments described herein.

Referring now to FIG. 37, illustrated therein is an example screen 3700 that may be output to a player who selects the "change game" touch-screen button of either area 3240G of screen 3200 (FIG. 32) or area 3340G of screen 3300 (FIG. 33). In accordance with one embodiment, a player may be allowed to change the game being played under a contract while in the midst of executing the contract. As with the "change bet" feature described with respect to FIG. 36, it should be understood that a change in the game being played may result in adjustments to one or more other parameters of a contract (e.g., time or game plays remaining, credit meter balance, additional requirement payment, etc). It should further be noted that such adjustments to the other parameters as a result of the change in game may be calculated in response to the request to change game (e.g., the gaming device or controller in communication with the gaming device may store a sub-routine and/or algorithm for such a calculation). In other embodiments, such calculations may be performed beforehand and store in memory for retrieval in response to a request to change the game.

In the example illustrated in screen 3700, a player is presented with information regarding his current game in area 3705. Sub-area 3705A indicates to the player the game currently being played as Jacks-or-Better. Sub-area 3705B indicates to the player that the current credit meter balance has a $5.25 equivalent of credits. Sub-area 3705C indicates to the player that there are currently fourteen (14) minutes remaining in the flat rate play session under the current parameters. Area 3710 presents the player with a variety of games (and respective sets of parameters) that the player may elect to switch to. For example, sub-area 3710A provides the player with an option to switch to a Double Double Bonus game, in which case the player would maintain the $5.25 worth of credits but the remaining duration of the session would be reduced to twelve (12) minutes. Sub-area 3710B provides the player with an option to switch to a Double Bucks game, in which case the player would maintain the $5.25 worth of credits but the remaining duration of the session would be reduced to eleven (11) minutes. Sub-area 3710C provides the player with an option to switch to a Bonus Deluxe game, in which case the player would maintain the $5.25 worth of credits but the remaining duration of the session would be reduced to ten (10) minutes. Sub-area 3710D provides the player with an option to switch to a Joker Poker game, in which case the player would maintain the $5.25 worth of credits but the remaining duration of the session would be reduced to ten (10) minutes. Sub-area 3710E provides the player with an option to switch to a 21/Blackjack game, in which case the player would maintain the $5.25 worth of credits but the remaining duration of the session would be reduced to nine (9) minutes. Sub-area 3710F provides the player with an option to switch to a Keno game, in which case the player would maintain the $5.25 worth of credits but the remaining duration of the session would be reduced to eight (8) minutes. A player may elect to switch to one of the games available by actuating area 3715. Alternatively, the player may elect to remain playing the current game by actuating area 3720.

Referring now to FIG. 38, illustrated therein is an example of a help menu 3800 that may be output to a player who actuates the "help" touch-screen button of either area 3240H of screen 3200 (FIG. 32) or area 3340H of screen 3300 (FIG. 33). The help menu 3800, as illustrated, may provide links to additional information on each of a plurality of topics or features (listed in area 3815) available via flat rate play at the gaming device being played. Of course, the topics/features illustrated on the help menu of FIG. 38 are exemplary only and not exhaustive. Each topic/feature 3815A1 through 3815N1 corresponds a one of the areas 3815A2 through 3815N2. Thus, for example, if a player desires to obtain additional information on the "Game Clock" topic/feature 3815A1, the player actuates the corresponding "info" button in area 3815A2.

Area 3805 reminds the player that the player is currently playing a Jacks-or-Better game. Area 3810 reminds the player that the gaming device is currently being operated in a flat-rate play mode. A player my return to the current game from the help menu 3800 by actuating area 3820.

Figure 39:
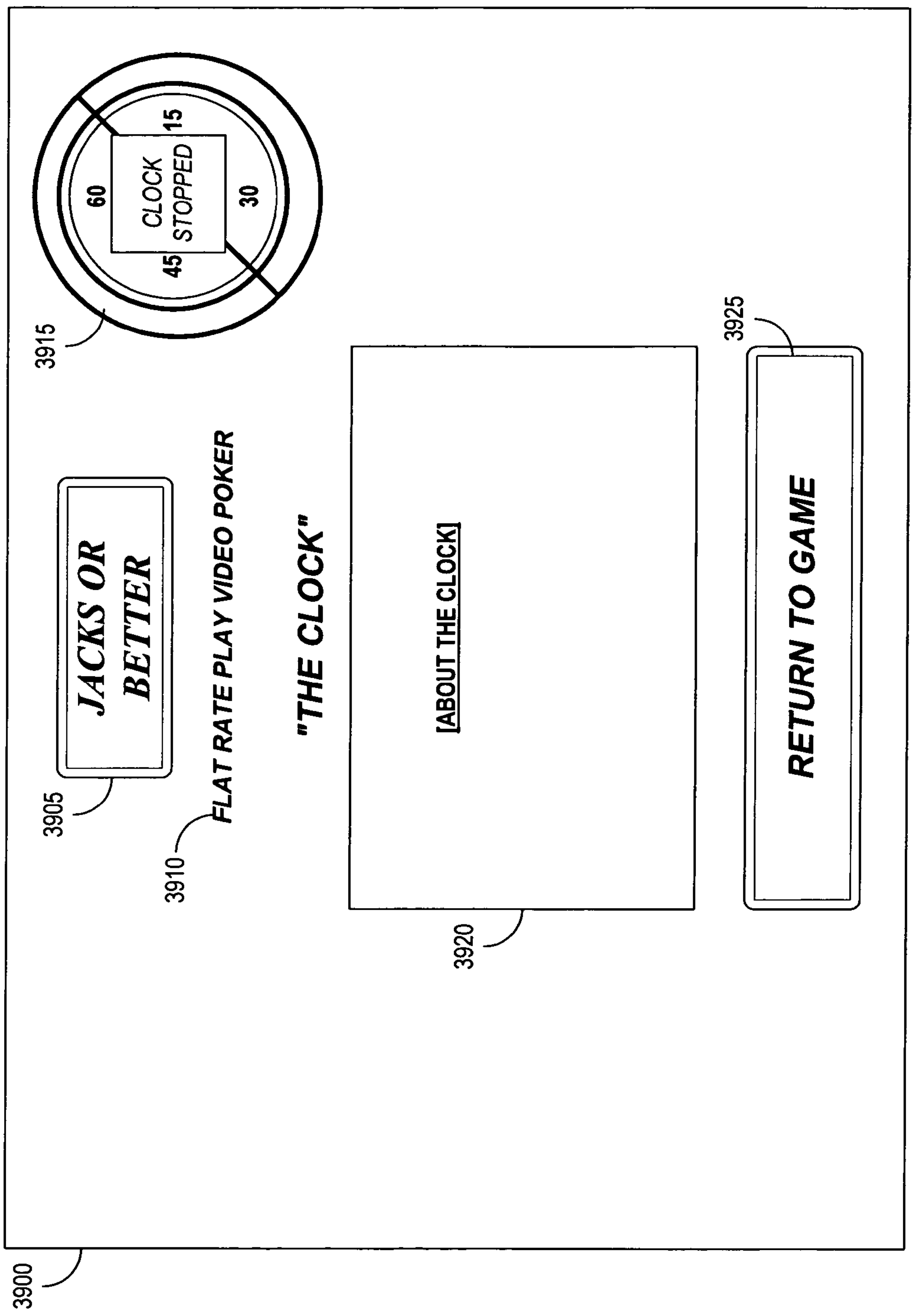
FIG. 39 is an example of information that may be presented via a display to a player who has purchased a contract in accordance with embodiments described herein.

Referring now to FIG. 39, illustrated therein is an example screen 3900 that may be output to a player who requests information on the clock 3240A of FIG. 32. For example, a player may desire to learn how the clock may be paused, how time may be added to the clock, etc. Area 3915 illustrates to the player that the clock is stopped while the player is reviewing information about the clock. Area 3920 may include a description of features, information and explanations respecting the clock. Area 3905 reminds the player that the game currently being played is a "Jacks-or-Better" game while area 3910 reminds the player that the gaming device is currently operating in flat rate play mode. A player may return to playing the game by actuating area 3925.

Figure 40:
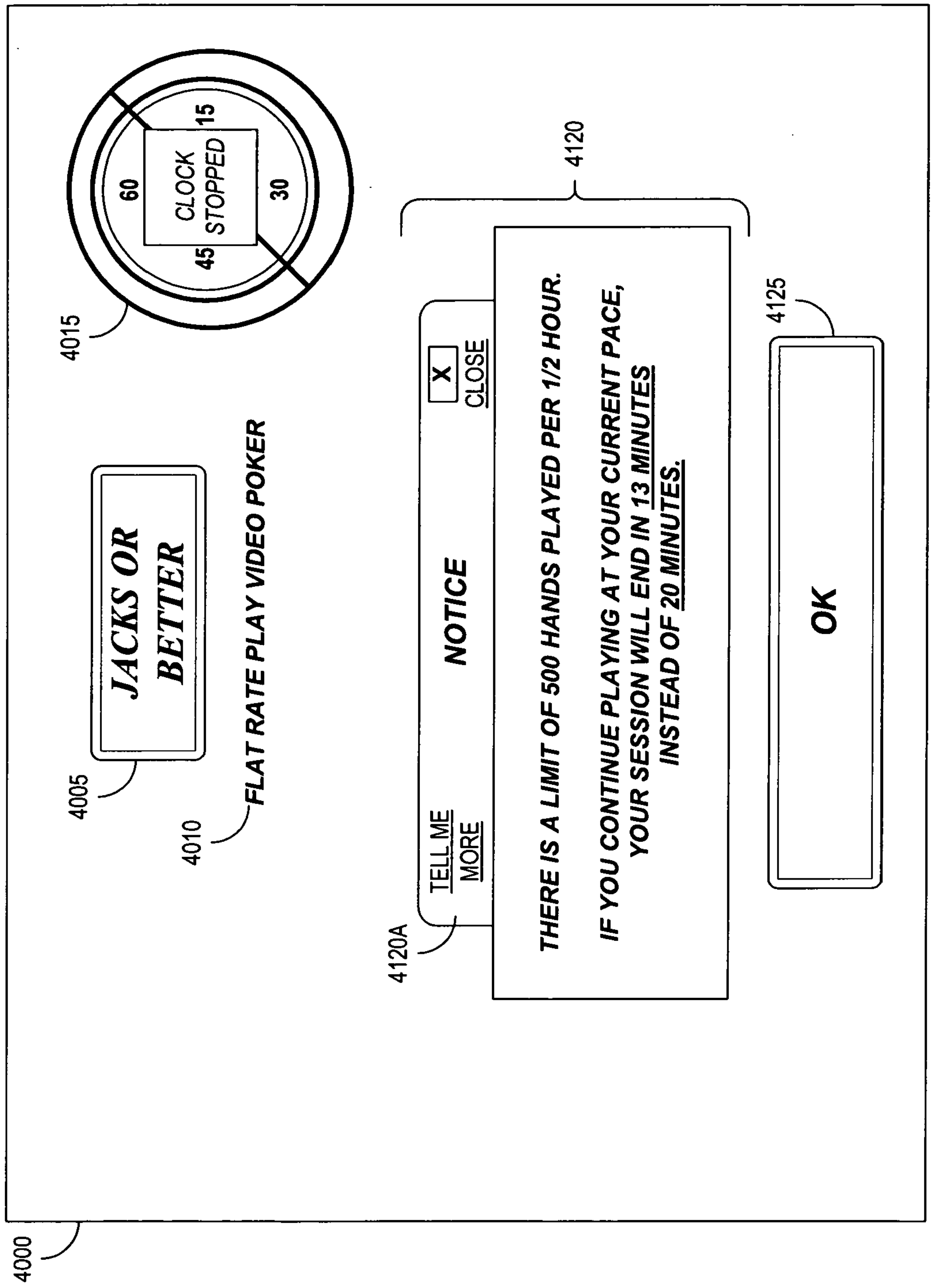
FIG. 40 is an example of information that may be presented via a display to a player who has purchased a contract in accordance with embodiments described herein.

Referring now to FIG. 40, illustrated therein is an example warning screen 4000 that may be output to a player who, based on his rate of play during a session, may cause the session to end earlier than the anticipated end time. Area 4120 informs the player of why the warning screen is being output (e.g., of the condition(s) of the flat rate play session that the player is violating, will violate, and/or that will cause the flat rate play session to end early). A player may actuate area 4020A to obtain further information on this warning or notice.

For example, as described herein, in one embodiment a contract that defines a duration as a period of time, the period of time may be a maximum period of time but may only be guaranteed if the player satisfies or abides by certain conditions. For example, if a player purchases a contract that allows the player to play a game for a half-hour in exchange for $40.00, the half-hour of play may only be guaranteed provided the player does not exceed a specified rate of play during the session and/or does not play more than a maximum number of game plays. In one embodiment, for example, the duration of the session may be defined as (i) 30 minutes or (ii) 500 game plays, whichever occurs first. The maximum number of game plays may be defined such that, provided the player plays at a normal rate of play (or even a reasonably faster than normal rate of play), the player's session should still end based on the maximum amount of time (30 minutes in the current example) rather than the maximum number of game plays. In one embodiment, if the manner in which the player is playing the game somehow may cause the player's session under the contract to end earlier than the half-hour defined by the contract, a warning message may be output to the player informing him of the possibility of the early ending of the session. It should be noted that the example warning message depicted in FIG. 40 informs the player, based on his current rate of play, of how many minutes are left before the end of the session if the player continues his current rate of play, as well as a comparison to the number of minutes the player would otherwise be entitled to under the contract. It should further be noted that, as indicated in FIG. 40, the clock is stopped during the output of the warning message such that the player does not lose any time on his contract in viewing the message.

Area 4005 reminds the player that the game currently being played is a Jacks-or-Better game. Area 4010 reminds the player that the gaming device is currently operating in a flat rate play mode. Area 4015 informs the player that a countdown of the duration of the session (whether in minutes or number of game plays) has been paused while the warning screen 4000 is output. A player may acknowledge the warning and return to playing the game by actuating area 4025.

Figure 41:
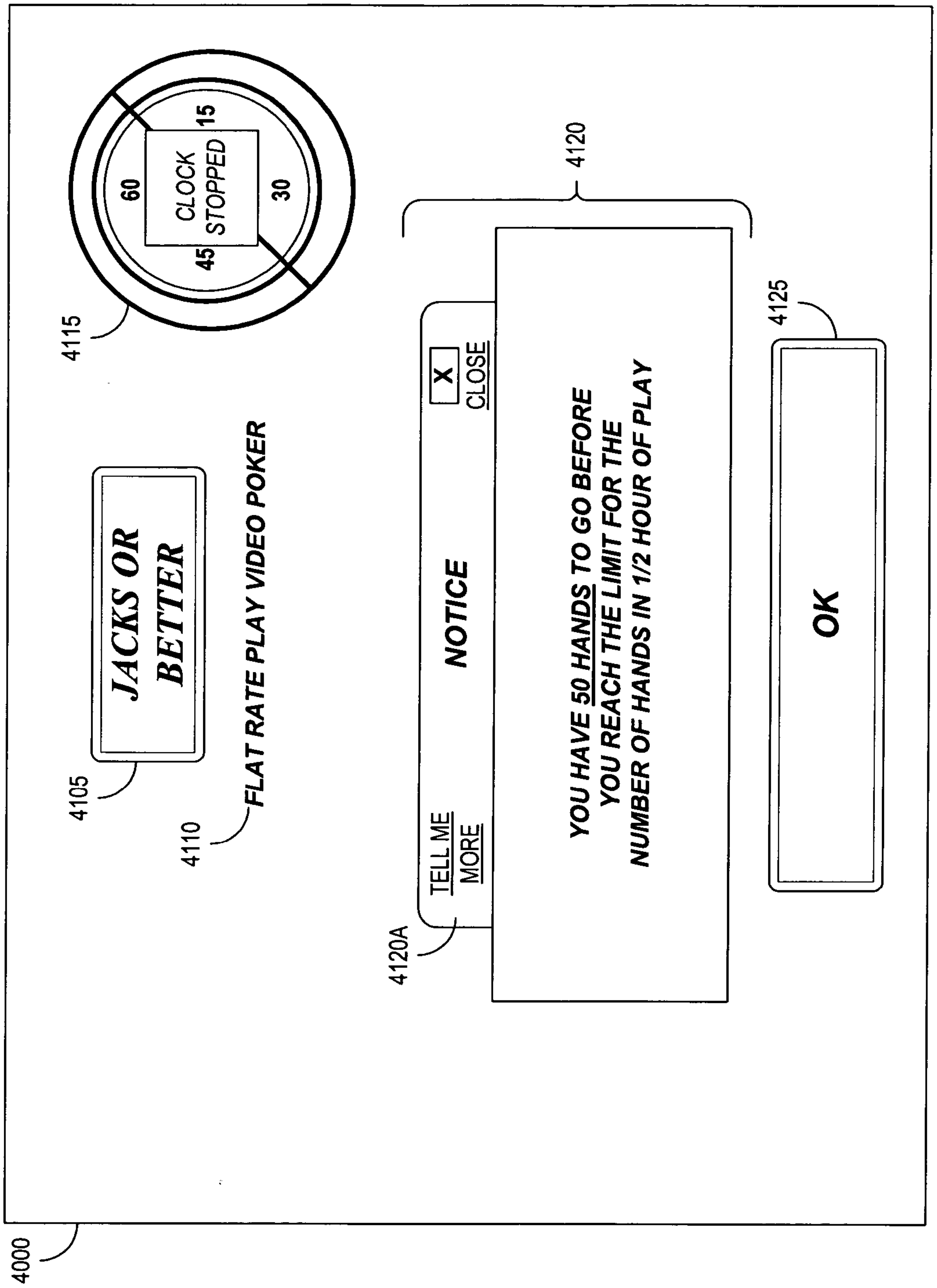
FIG. 41 is an example of information that may be presented via a display to a player who has purchased a contract in accordance with embodiments described herein.

Referring now to FIG. 41, illustrated therein is a screen 4100 depicting another example warning message that may be output to a player whose manner of play may cause his play session to end earlier than he might expect. The warning is output in area 4120 and the player may obtain further information about the warning by actuating area 4120A.

In the example warning message of FIG. 41, the player is informed of how many hands or game plays the player may complete before reaching the maximum number of game plays allowed under the contract. The output of such a manner may allow the player to determine how best to pace his play such that he obtains the full 30 minutes of play under the contract (e.g., the player may slow his rate of play if he has a lot of time left until the end of the contract but not a lot of game plays). Again, it should be noted that the clock is stopped during the output of the message. The clock may be restarted again, for example, when the player actuates the "OK" touch-screen button on the screen, indicating that he has read the message and would like to return to playing the game.

Area 4105 reminds the player that the game currently being played is a Jacks-or-Better game. Area 4110 reminds the player that the gaming device is currently operating in a flat rate play mode. Area 4115 informs the player that a countdown of the duration of the session (whether in minutes or number of game plays) has been paused while the warning screen 4100 is output. A player may acknowledge the warning and return to playing the game by actuating area 4125.

Figure 42:
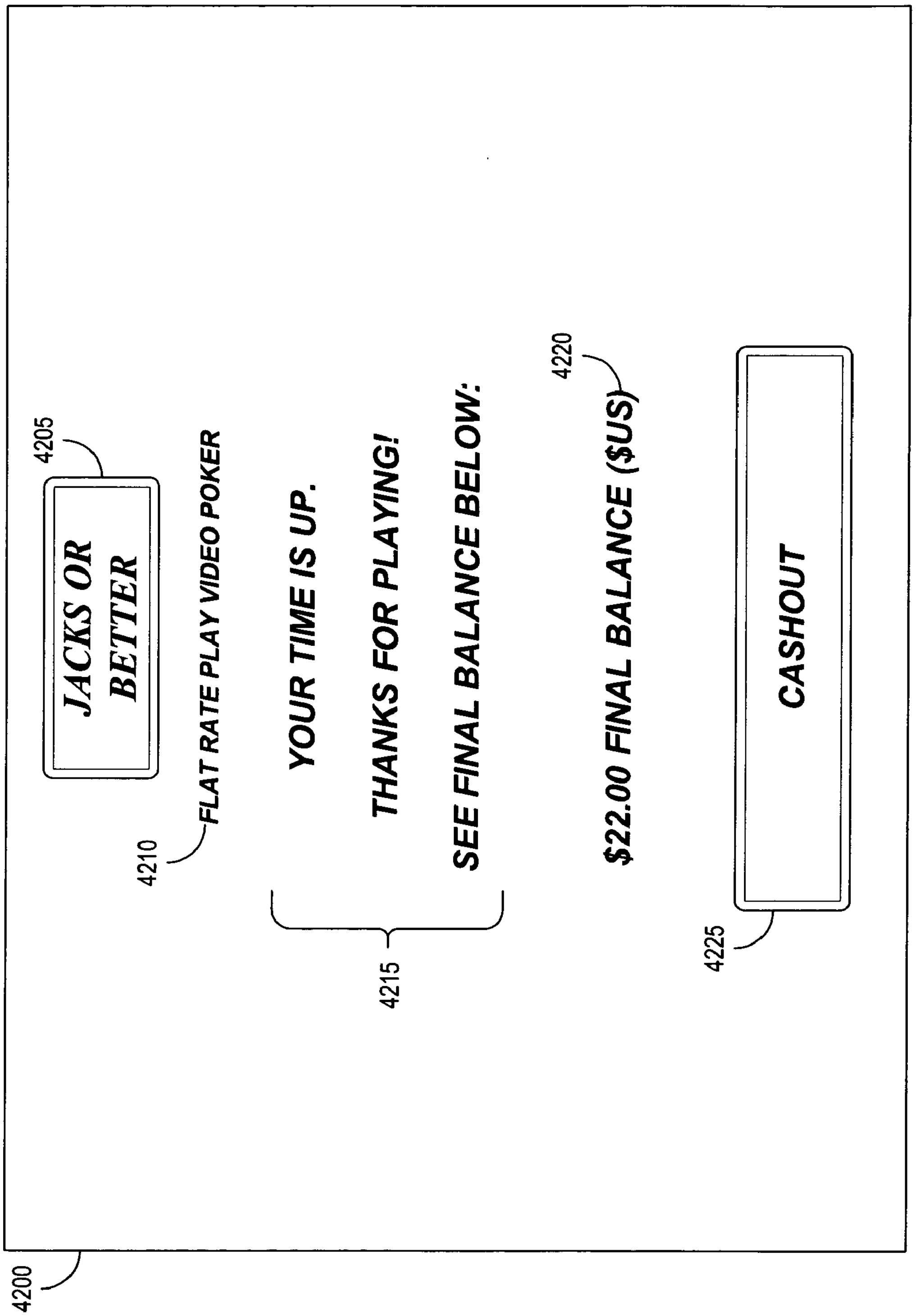
FIG. 42 is an example of information that may be presented via a display to a player who has purchased a contract in accordance with embodiments described herein.

Referring now to FIG. 42, illustrated therein is an example screen 4200 that may be output to a player whose session under a contract has ended. The example information of this screen may be output upon, for example, an occurrence of an event triggering the end of the session. For example, the maximum amount of time defined by the contract may have passed since an initiation of the play session (e.g., the clock of screen 32 reads "0 minutes to go") or the maximum number of game plays defined by the contract may have been played (e.g., the "hands remaining" indictor of FIG. 33 reads "0"). Area 4215 informs the player of the reason for the termination of the flat rate play session. As indicated by the screen, the player may be informed of the credit meter balance (e.g., in dollars) at the end of the session (in area 4220) and be allowed to cash out the amount (by actuating area 4225). In one embodiment, the credit meter balance may be negative at the end of the contract. As described herein, in one embodiment in such a circumstance, the player may not be responsible for paying the negative amount and may not be allowed to cash out the negative amount (i.e., the player may simply walk away from the device at the end of the play session, having received satisfying entertainment for 30 minutes without worrying about running out of money during the 30 minutes of play or incurring unpredictable or large losses during the 30 minutes).

Area 4205 reminds the player that the game played during the flat rate play session had been a "Jacks-or-Better" game. Area 4210 reminds the player that the gaming device is operating in a flat rate play mode.

CONCLUSION

Although the foregoing embodiments employ slot machines and video poker machines, it is within the scope of the present invention to employ other types of gaming devices, such as video roulette machines, video blackjack machines and the like.

Thus, while the present invention has been described in terms of certain preferred embodiments, other embodiments that are apparent to those of skill in the art are also intended to be within the scope of the present invention. For example, the present invention may be practiced by an online casino utilizing only software and not involving traditional slot machines. Accordingly, the scope of the present invention is intended to be limited only by the claims appended hereto.

What is claimed is:

1. A method for determining a price, comprising:

determining a specified duration of a flat rate play session for a wagering game comprising at least a primary game;

determining one of a house edge or information conveying the house edge, to be applied in determining outcomes during the flat rate play session;

determining a value of a price parameter for the wagering game, wherein the duration spans a plurality of rounds of the primary game of the wagering game and wherein the price parameter is other than the house edge or the information conveying the house edge;

simulating, by a processor of a computing device via an algorithm comprising a Monte Carlo simulation, a play of the flat rate play session for the specified duration of the flat rate play session, using the value of the price parameter and the one of the house edge or the information conveying the house edge;

determining, by the processor and based upon the simulation, a simulated payout amount for the flat rate play session;

adding a profit margin amount to the simulated payout amount; and determining a price for the flat rate play session of the specified duration based on the simulated payout amount and the profit margin, the price comprising a price at which the flat rate play session is to be offered to players and wherein each round of the plurality of rounds of the primary game is offered to players for a respective predetermined wager amount if purchased outside of the flat rate play session and further wherein the price for the flat rate play session is determined to be less than a sum of the respective predetermined wager amounts of the plurality of rounds comprising the flat rate play session.

2. The method of claim 1, wherein the simulation comprises a plurality of simulations and the simulated payout amount comprises an average simulated payout amount for the plurality of simulations.

3. The method of claim 1, wherein the simulation is conducted via a gaining device.

4. The method of claim 1, wherein the simulation is conducted via a software program.

5. The method of claim 1, wherein the profit margin amount is equal to zero.

6. The method of claim 1, wherein the profit margin amount is less than zero.

7. The method of claim 1, wherein the price parameter comprises a plurality of price parameters and the value of the price parameter comprises a value for each price parameter from the plurality of price parameters.

8. The method of claim 1, further comprising:

receiving an indication of the value of the price parameter.

9. The method of claim 1, further comprising:

receiving an indication of a request for a price for the flat rate play session.

10. The method of claim 1, wherein the price parameter comprises at least one of:

(i) a time of a day;
(ii) a clay of a week;
(iii) a day of a month;
(iv) a day of a year;
(v) a week of a month;
(vi) a week of a year;
(vii) a month of a year;
(viii) a type of gaming device;
(ix) a player status rating;
(x) an availability of a gaming device;
(xi) a forecasted availability of a gaming device;
(xii) a number of active jackpots;
(xiii) a number of winning plays;
(xiv) a time between plays;
(xv) a traffic of potential players;
(xvi) stakes of play; and
(xvii) an external event.

11. A method for determining a price, comprising:

determining a specified duration of a flat rate play session of a wagering game comprising at least a primary game;

determining one of a house edge or information conveying the house edge, to be applied in determining outcomes during the flat rate play session;

determining a value of a price parameter for the wagering game, wherein the duration spans a plurality of rounds of primary game of the wagering game and wherein the price parameter is other than the house edge or the information conveying the house edge;

simulating, by a processor of a computing device via an algorithm comprising a Monte Carlo simulation, play of the flat rate play session for the duration of the flat rate play session, using the value of the price parameter and the one of the house edge or the information conveying the house edge;

determining, by a processor of the computing device and based upon the simulation, a simulated payout amount for the flat rate play session;

adding a profit margin amount to the simulated payout amount, thereby determining an initial retail price; and determining a final retail price for the flat rate play session of the specified duration based on the initial retail price, the final price comprising a price at which the flat rate play session is to be offered to players and wherein each round of the plurality of rounds of the primary game is offered to players for a respective predetermined wager amount if purchased outside of the flat rate play session and further wherein the final price for the flat rate play session is determined to be less than a sum of the respective predetermined wager amounts of the plurality of rounds of the primary game comprising the flat rate play session.

12. The method of claim 11, wherein determining the final retail price comprises rounding the initial retail price to the next lowest whole dollar.

13. A non-transitory computer-readable medium storing instructions which, when read by a processor of a computing device, cause the processor to perform a method comprising:

determining a specified duration of a flat rate play session for a wagering game comprising at least a primary game;

determining one of a house edge or information conveying the house edge, to be applied in determining outcomes during the flat rate play session;

determining a value of a price parameter for the wagering game, wherein the duration spans a plurality of rounds of the primary game of the wagering game and wherein the price parameter is other than the house edge or the information conveying the house edge;

simulating via an algorithm comprising a Monte Carlo simulation a play of the flat rate play session for the specified duration of the flat rate play session, using the value of the price parameter and the one of the house edge or the information conveying the house edge;

determining based upon the simulation, a simulated payout amount for the flat rate play session;

adding a profit margin amount to the simulated payout amount; and determining a price for the flat rate play session of the specified duration based on the simulated payout amount and the profit margin, the price comprising a price at which the flat rate play session is to be offered to players and wherein each round of the plurality of rounds of the primary game is offered to players for a respective predetermined wager amount if purchased outside of the flat rate play session and further wherein the price for the flat rate play session is determined to be less than a sum of the respective predetermined wager amounts of the plurality of rounds comprising the flat rate play session.

* * * * *